(12) United States Patent
Byers et al.

(10) Patent No.: US 7,753,161 B2
(45) Date of Patent: Jul. 13, 2010

(54) LOW CENTER-OF-GRAVITY CHASSIS FOR A MODEL VEHICLE

(75) Inventors: Brent Whitfield Byers, Plano, TX (US); Jon Kenneth Lampert, Garland, TX (US)

(73) Assignee: Traxxas LP, Plano, TX (US)

( * ) Notice: Subject to any disclaimer, the term of this patent is extended or adjusted under 35 U.S.C. 154(b) by 1029 days.

(21) Appl. No.: 11/349,322

(22) Filed: Feb. 6, 2006

(65) Prior Publication Data

US 2006/0292966 A1    Dec. 28, 2006

Related U.S. Application Data

(63) Continuation-in-part of application No. 11/102,008, filed on Apr. 7, 2005, now abandoned, and a continuation-in-part of application No. 29/227,305, filed on Apr. 7, 2005, now Pat. No. Des. 567,886.

(60) Provisional application No. 60/669,664, filed on Apr. 7, 2005.

(51) Int. Cl.
*B62D 21/00* (2006.01)

(52) U.S. Cl. .................. 180/312; 180/69.1; 296/204

(58) Field of Classification Search .............. 180/69.1, 180/312, 380; 296/25, 204; 446/431, 470
See application file for complete search history.

(56) References Cited

U.S. PATENT DOCUMENTS

| | | | | |
|---|---|---|---|---|
| 2,226,790 A | * | 12/1940 | Valletta | 296/204 |
| 2,256,885 A | * | 9/1941 | Bruss | 280/797 |
| 2,856,226 A | * | 10/1958 | Purdy | 296/204 |
| 3,149,856 A | * | 9/1964 | Schilberg | 180/89.2 |
| 4,081,197 A | * | 3/1978 | Ackel | 296/204 |
| 4,187,637 A | | 2/1980 | Nielsen | |
| 4,353,578 A | * | 10/1982 | Knapp | 280/781 |
| 4,597,468 A | | 7/1986 | Friedrich | |
| 4,696,655 A | | 9/1987 | D'Andrade et al. | |

(Continued)

FOREIGN PATENT DOCUMENTS

JP    10 40082    2/1989

(Continued)

OTHER PUBLICATIONS

Associated Electrics; "Monster GT User Guide—User Guide for the Monster GT Truck"; 2003; Associated Electrics, Inc., Costa Mesa, California; (admitted prior art).

(Continued)

*Primary Examiner*—Paul N. Dickson
*Assistant Examiner*—Timothy D Wilhelm
(74) *Attorney, Agent, or Firm*—Carr LLP

(57) ABSTRACT

A method of configuring components on a chassis of a model vehicle is provided, comprising providing a vehicle chassis, mounting an engine to the vehicle chassis such that the engine crankshaft is positioned at a first height relative to the chassis, and mounting a transmission to the vehicle chassis such that the transmission output shaft is positioned at a second height, and wherein the first height of the crankshaft is no less than about 3 mm and no more than 15.5 mm higher than the second height of the output shaft.

7 Claims, 75 Drawing Sheets

U.S. PATENT DOCUMENTS

| | | |
|---|---|---|
| 4,764,150 A | 8/1988 | Uchino |
| 4,892,502 A | 1/1990 | Hesse |
| 5,002,333 A * | 3/1991 | Kenmochi et al. ........... 296/204 |
| 5,085,025 A * | 2/1992 | Gaddis ........................ 296/204 |
| 5,193,879 A | 3/1993 | Chen |
| 5,265,690 A | 11/1993 | Amundsen et al. |
| 5,322,469 A | 6/1994 | Tilbor |
| 5,338,246 A | 8/1994 | Suto |
| 5,338,247 A | 8/1994 | Miles |
| 5,343,973 A | 9/1994 | Lanker |
| 5,466,005 A * | 11/1995 | Kohlmeier et al. ........... 280/781 |
| 5,849,122 A * | 12/1998 | Kenmochi et al. ........... 156/182 |
| 6,149,226 A * | 11/2000 | Hoelzel et al. ........... 296/181.1 |
| 6,234,866 B1 | 5/2001 | Ben-Yakar et al. |
| 6,394,878 B1 | 5/2002 | Wang |
| 6,582,275 B1 | 6/2003 | Lai |
| 6,641,457 B1 | 11/2003 | Lai |
| 6,679,753 B1 * | 1/2004 | Motosko ..................... 446/454 |
| 6,692,333 B2 | 2/2004 | Kislevitz et al. |
| 6,761,372 B2 * | 7/2004 | Bryant ................ 280/124.179 |
| 6,764,376 B2 | 7/2004 | Agostini et al. |
| 6,782,965 B2 | 8/2004 | Sztykiel et al. |
| 6,881,122 B2 | 4/2005 | Bloch et al. |
| 7,207,600 B2 * | 4/2007 | Beckmann et al. ........... 280/781 |
| 2002/0137428 A1 | 9/2002 | Tilbor et al. |
| 2002/0163173 A1 | 11/2002 | Ruehl et al. |
| 2003/0121711 A1 | 7/2003 | Chiu |
| 2004/0069556 A1 | 4/2004 | Chernoff et al. |
| 2004/0082268 A1 | 4/2004 | Choi |
| 2004/0092206 A1 | 5/2004 | Lynders et al. |
| 2004/0092208 A1 | 5/2004 | Weiss et al. |
| 2004/0094350 A1 | 5/2004 | Bogatay, Jr. et al. |
| 2004/0108158 A1 | 6/2004 | Rondeau et al. |
| 2004/0198170 A1 | 10/2004 | Tilbor et al. |

FOREIGN PATENT DOCUMENTS

| | | |
|---|---|---|
| JP | 2001 246175 A | 9/2001 |

OTHER PUBLICATIONS

Associated Electrics; "Monster GT" model truck; Associated Electrics, Inc., Costa Mesa, California; 3 pages of photographs (admitted prior art).

Horizon Hobby; "Team Losi LST Super Truck—Drive Train Assy" exploded view; Horizon Hobby, Inc., Champaigne, Illinois; (admitted prior art).

Horizon Hobby; "Team Losi LST Super Truck—Operations Guide"; Horizon Hobby, Inc., Champaigne, Illinois; (admitted prior art).

Horizon Hobby; "Team Losi LST Super Truck" model truck; Horizon Hobby, Inc., Champaigne, Illinois; 3 photographs (admitted prior art).

HPI Racing; "Savage 21—4WD Giant Monster Truck—Instruction Manual," p. 58-59 exploded views; Hobby Products International, Foothill Ranch, California; (admitted prior art).

HPI Racing; "Savage 21" model truck; Hobby Products International, Foothill Ranch, California; 3 photographs (admitted prior art).

Milliken, William F. et al.; "Race Car Vehicle Dynamics," 1995; SAE Publications Group, SAE International, Warrendale, Pennsylvania.

Tamiya; "Parts Breakdown, Terra Crusher Chassis"; Tamiya America, Inc., Aliso Viejo, California; (admitted prior art).

Tamiya; "Parts Breakdown, Terra Crusher Front End"; Tamiya America, Inc., Aliso Viejo, California; (admitted prior art).

Tamiya; "Parts Breakdown, Terra Crusher Rear End"; Tamiya America, Inc., Aliso Viejo, California; (admitted prior art).

Tamiya; "Terra Crusher" model truck; Tamiya America, Inc., Aliso Viejo, California; 3 photographs (admitted prior art).

Traxxas; "Nitro Rustler Chassis Assembly" exploded view; Traxxas LP, Plano, Texas; (admitted prior art).

Traxxas; "T-MAXX, Chassis Assembly" exploded view; Traxxas LP, Plano, Texas; (admitted prior art).

Traxxas; "T-MAXX" model truck; Traxxas LP, Plano, Texas; 1 photograph (admitted prior art).

* cited by examiner

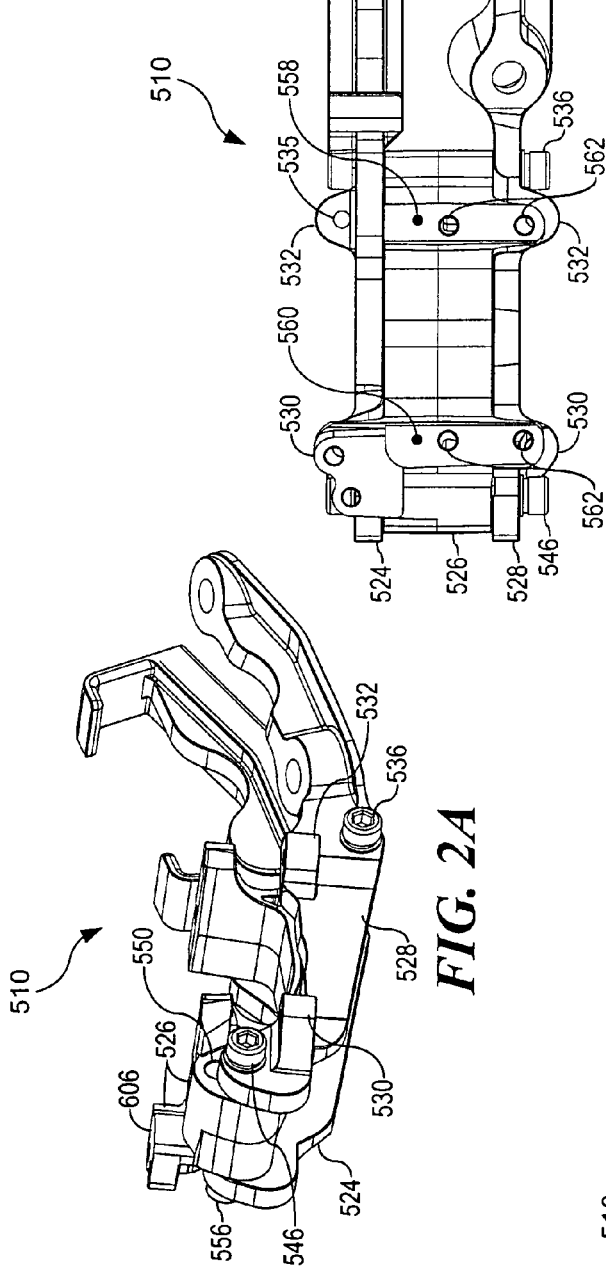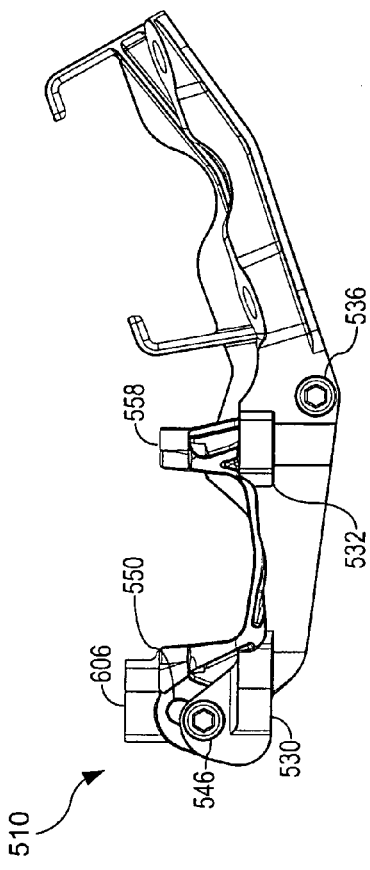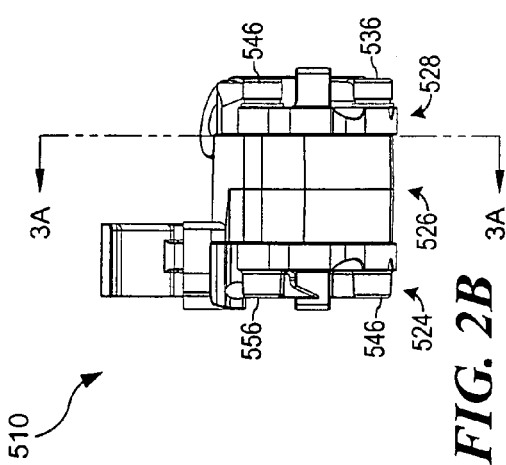

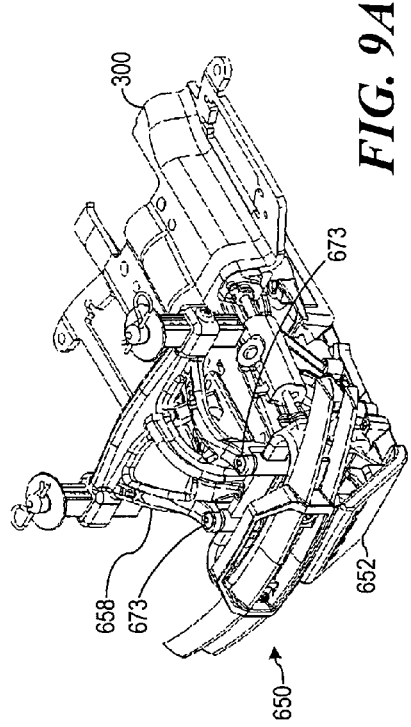
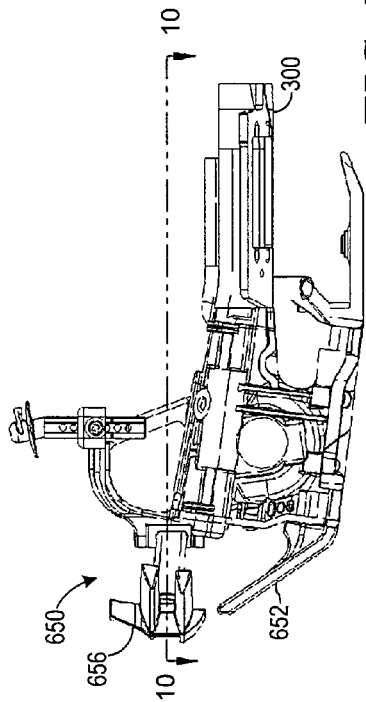
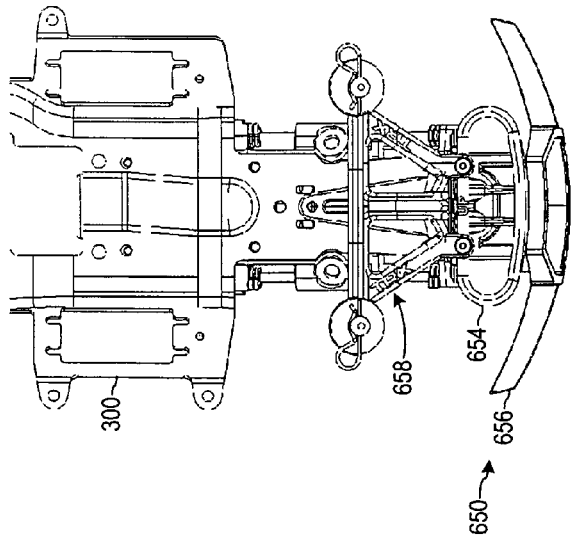
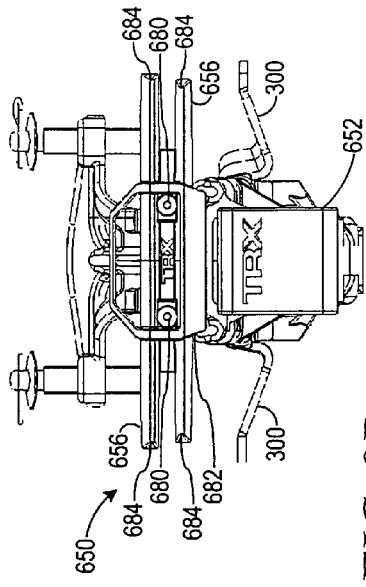

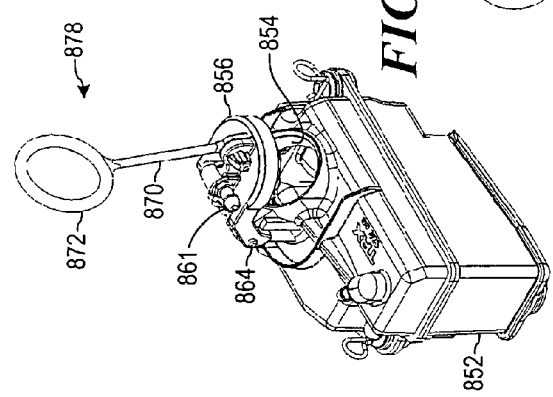
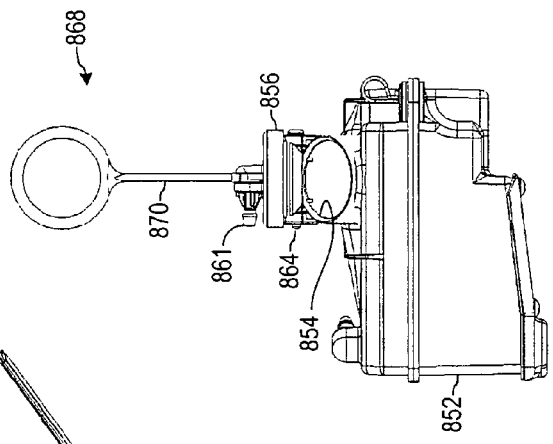
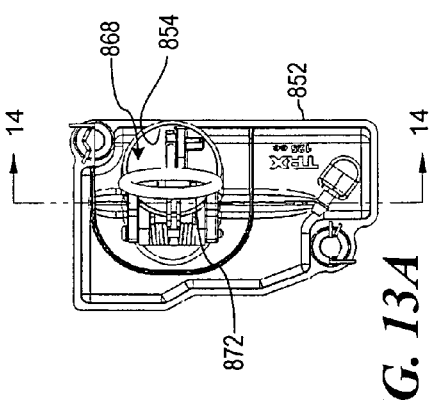
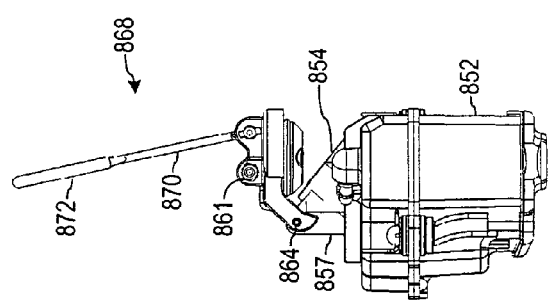
FIG. 13A
FIG. 13B
FIG. 13C
FIG. 13D

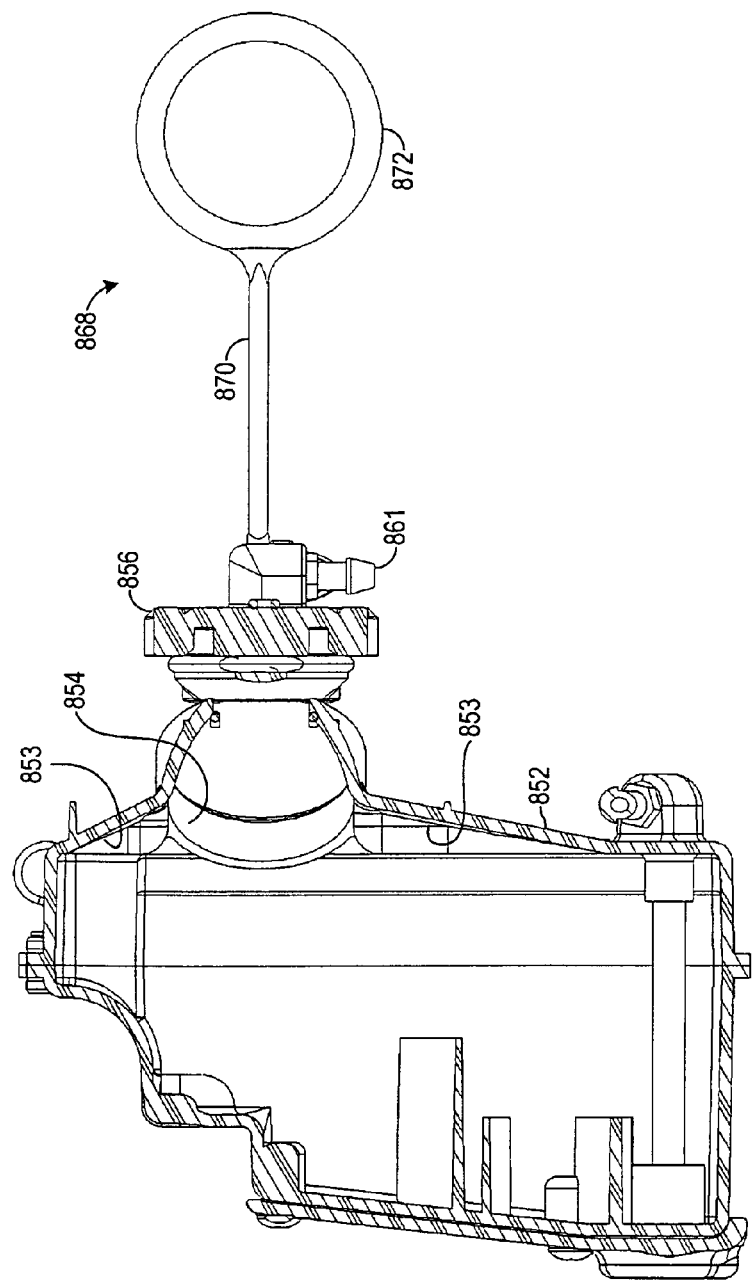

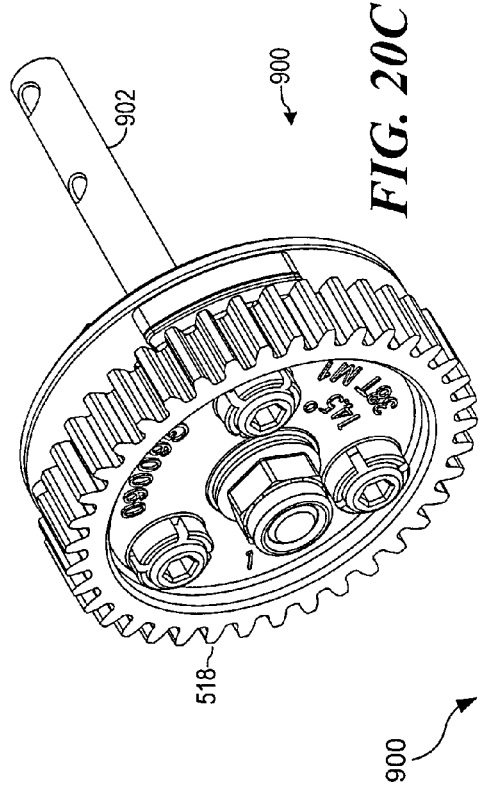
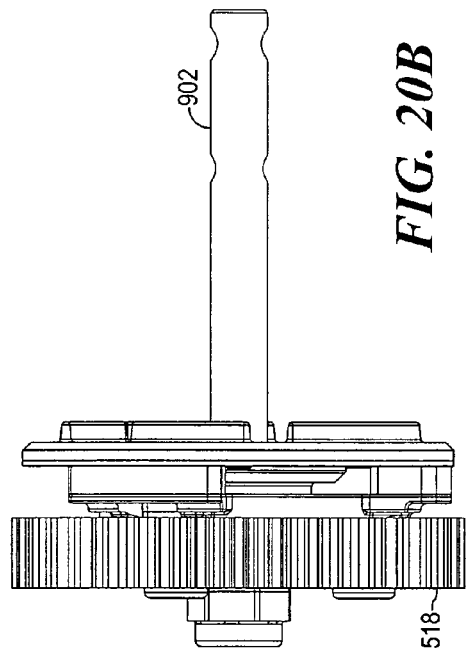
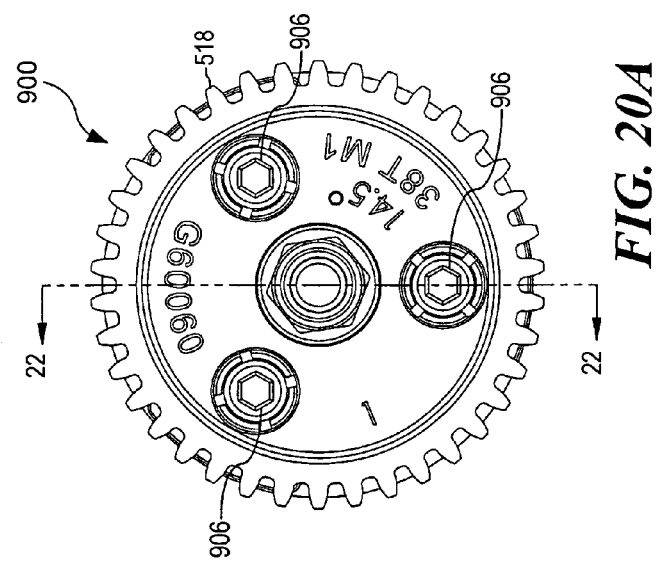
FIG. 20A
FIG. 20B
FIG. 20C

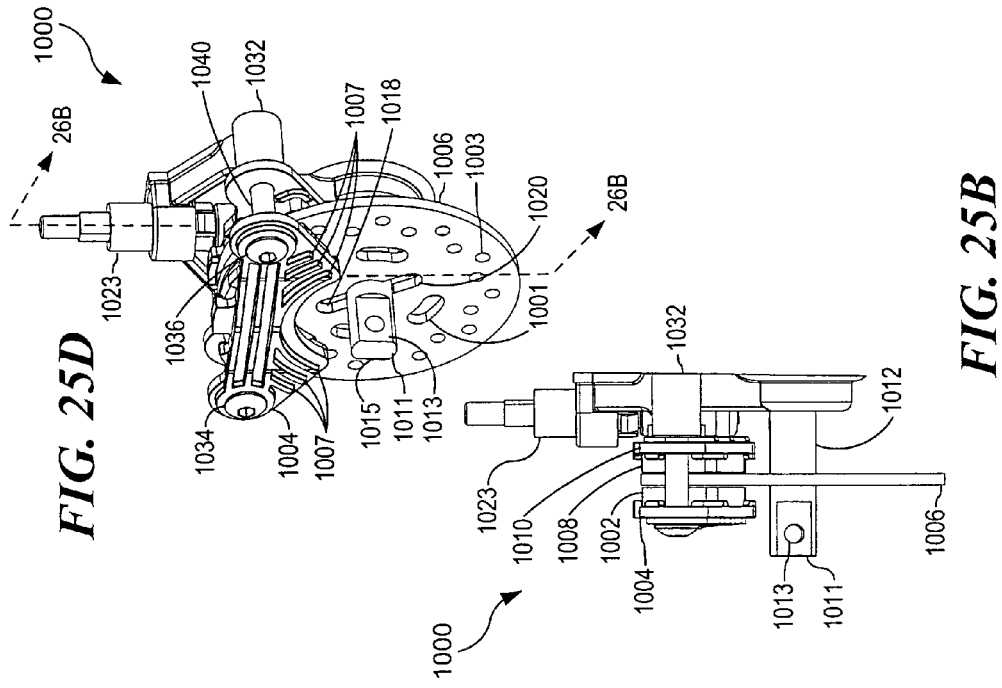
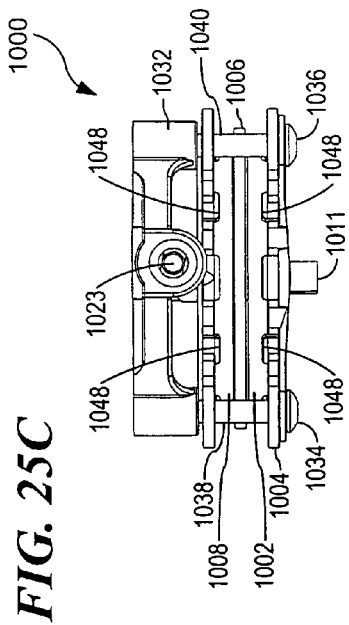
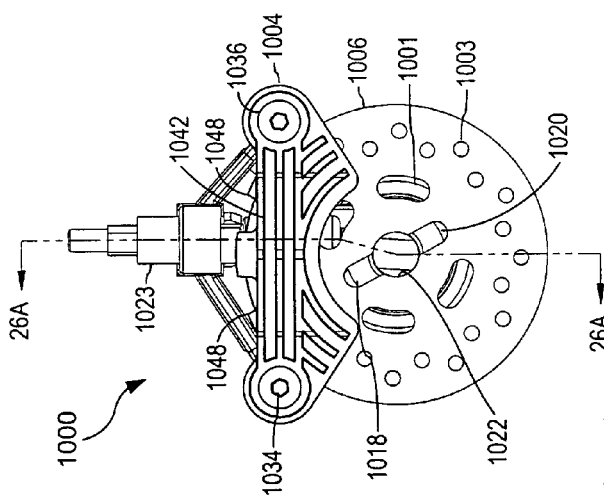

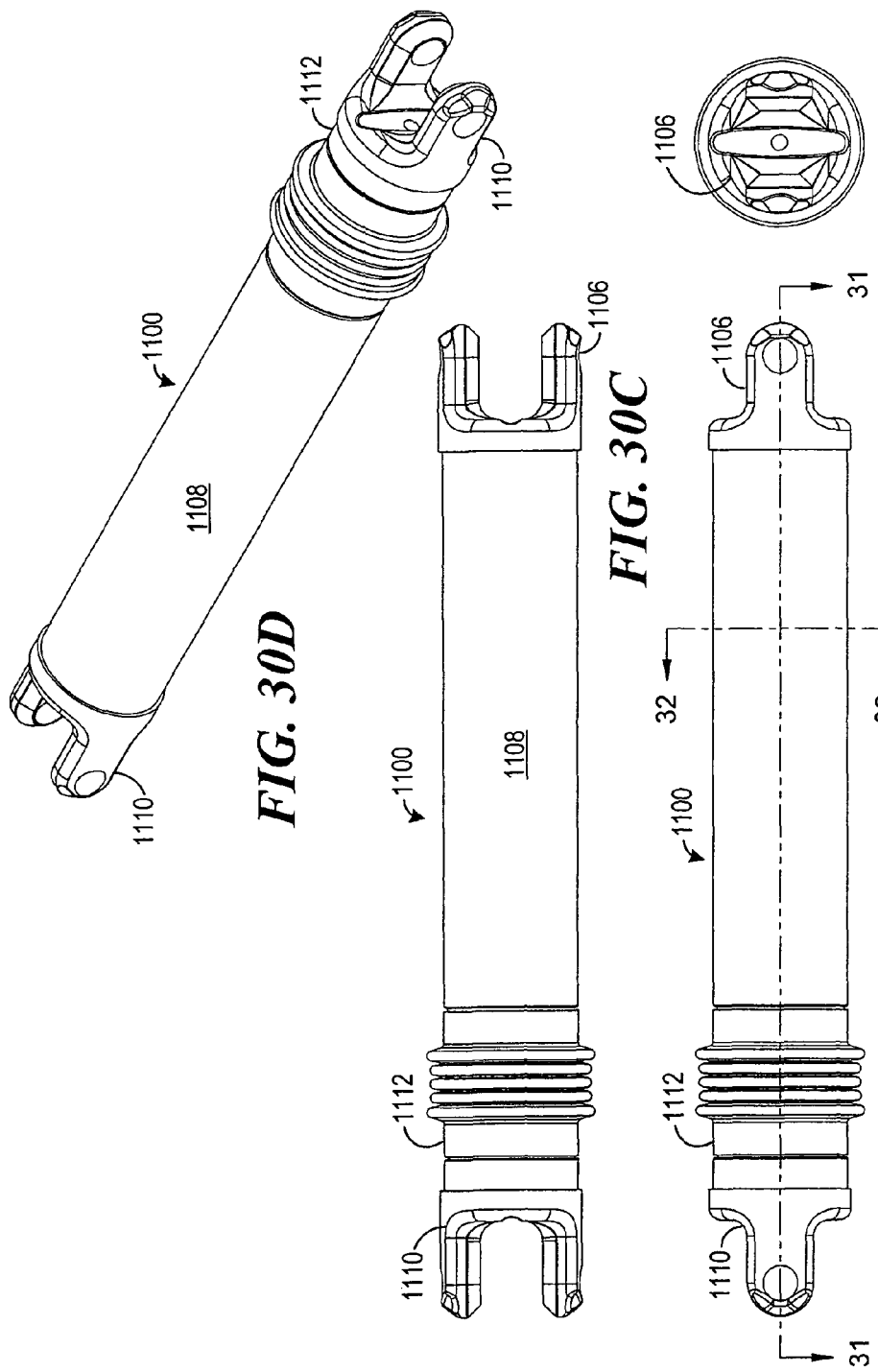

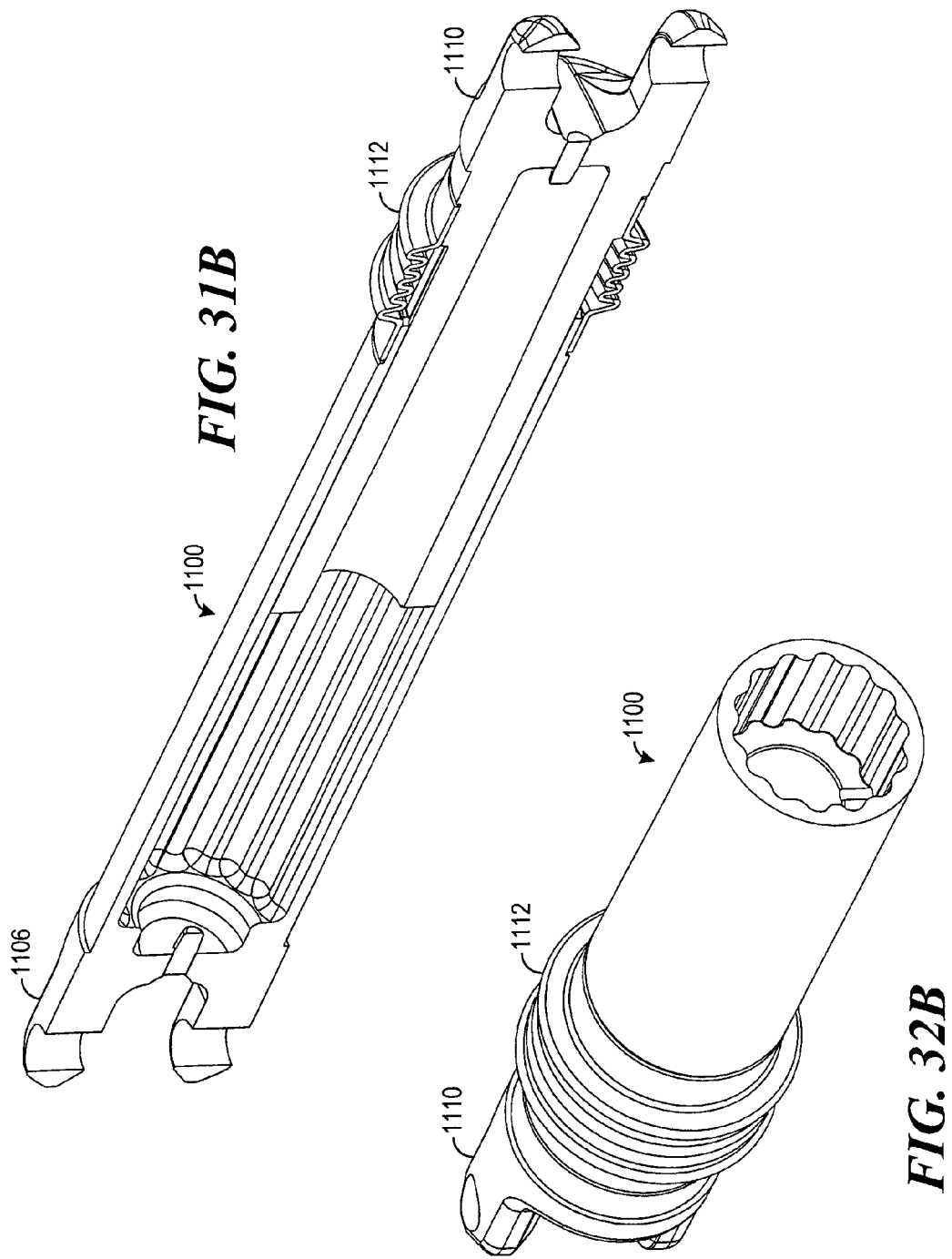

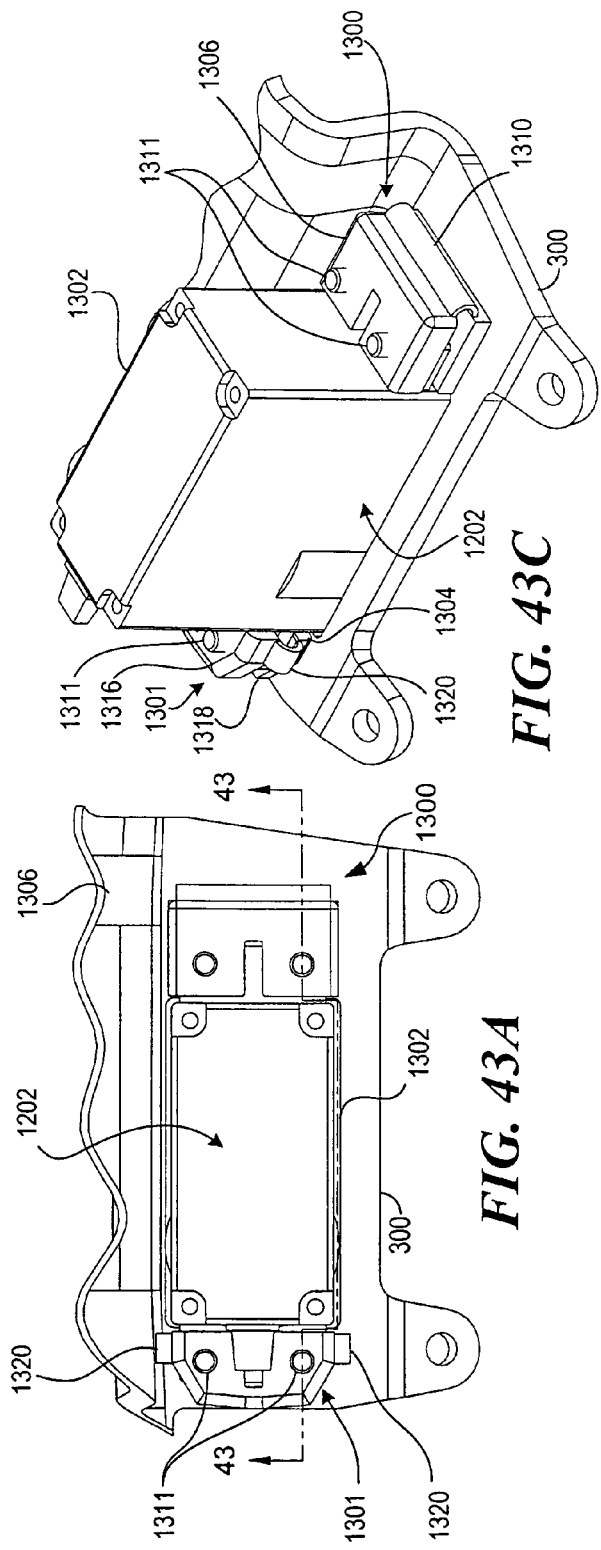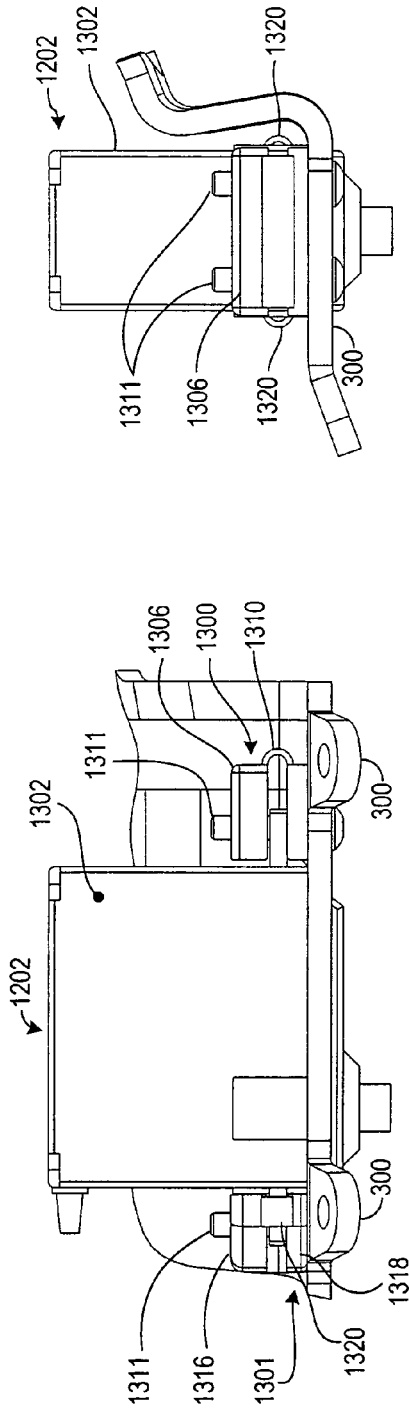
FIG. 43A  FIG. 43B  FIG. 43C  FIG. 43D

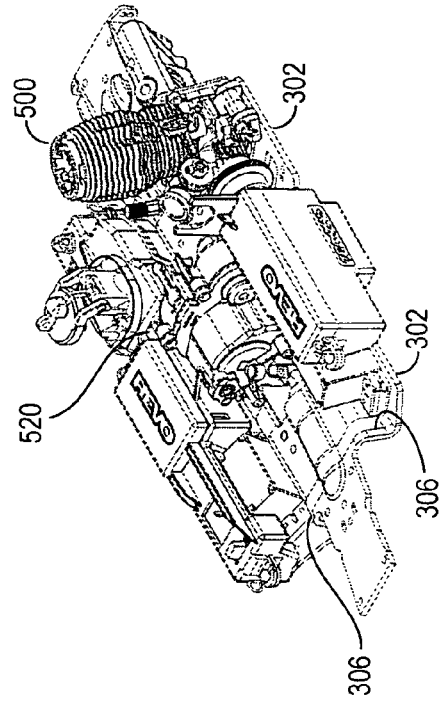
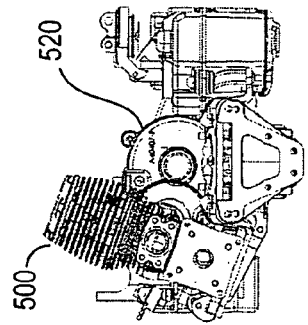
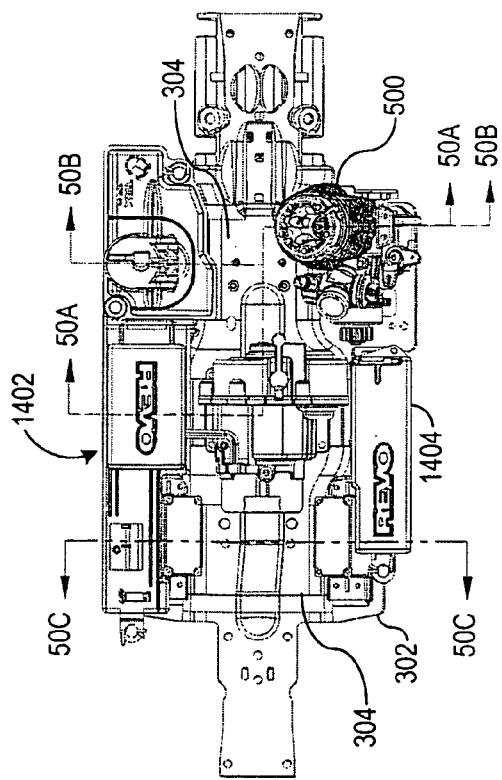
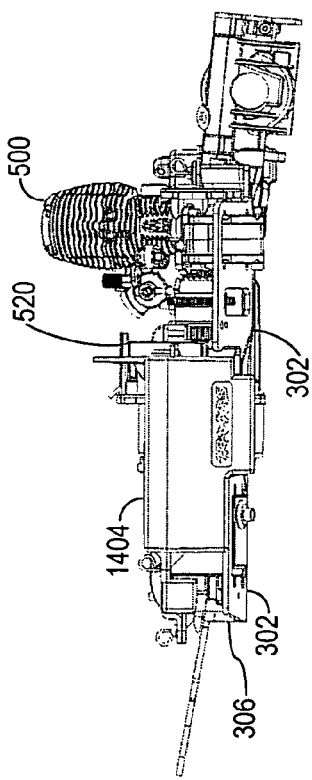
FIG. 49D
FIG. 49B
FIG. 49C
FIG. 49A

| SPACER COMBINATION | CASTER ANGLE | | | | | ROLL CENTER SETTING |
|---|---|---|---|---|---|---|
| FRONT Outer Toe Link End Setup | Caster | | | | | Control Arm Mounting Hole on Front Bulkhead |
| | 5° | 7.5° | 10° | 12.5° | 15° | |
| Standard Hollow Ball / Thin Shim / Thick Shim | | | | ⊙ | | Upper |
| | | | ⊙ | | | Lower |
| Thin Shim / Standard Hollow Ball / Thick Shim | | | | ⊙ | | Upper |
| | | | ⊙ | | | Lower |
| Tall Center Hollow Ball | | | ⊙ | | | Upper |
| | | ⊙ | | | | Lower |
| Thick Shim / Standard Hollow Ball / Thin Shim | | | ⊙ | | | Upper |
| | ⊙ | | | | | Lower |
| Thick Shim / Thin Shim / Standard Hollow Ball | | ⊙ | | | | Upper |

*FIG. 55*

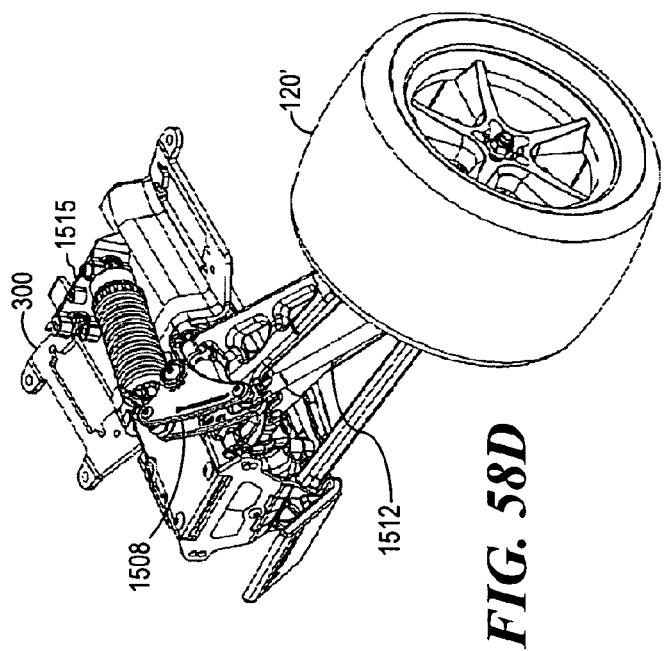
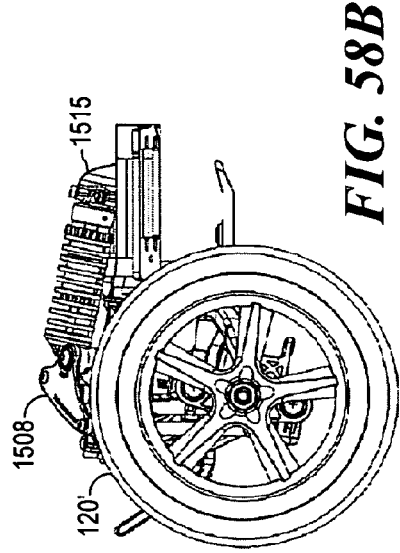
FIG. 58D
FIG. 58B
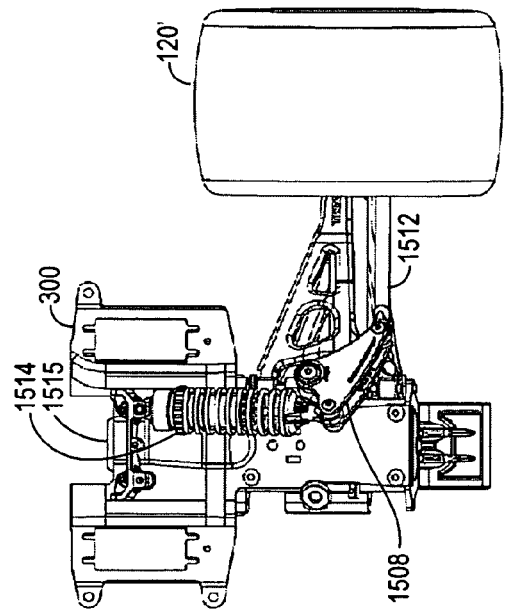
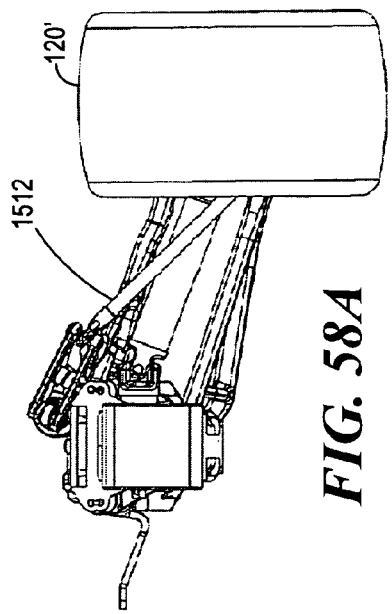
FIG. 58C
FIG. 58A

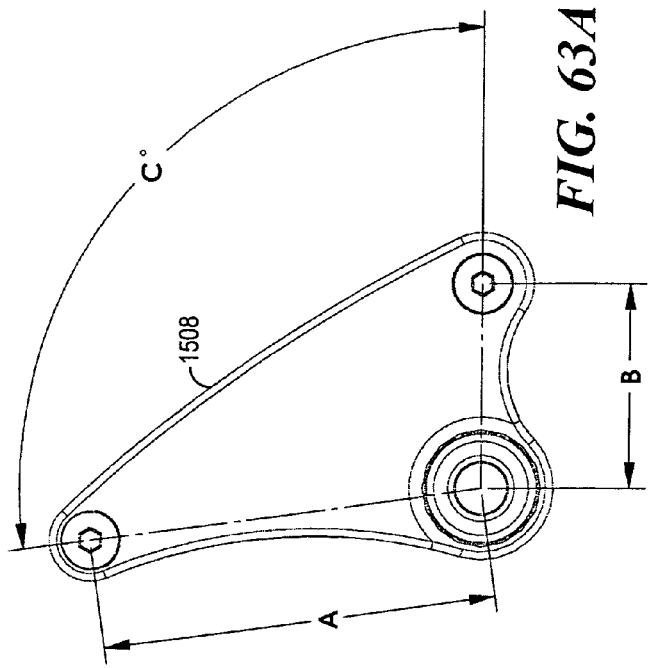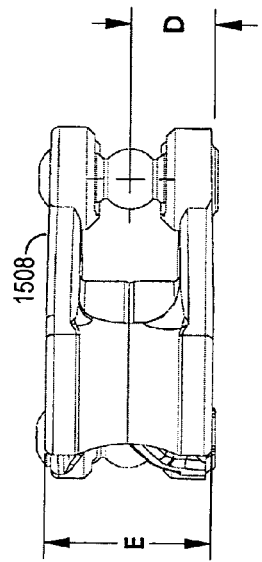
FIG. 63A
FIG. 63B
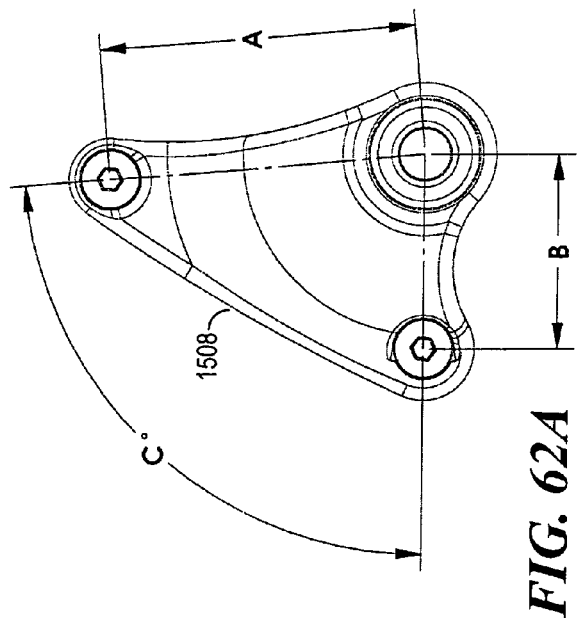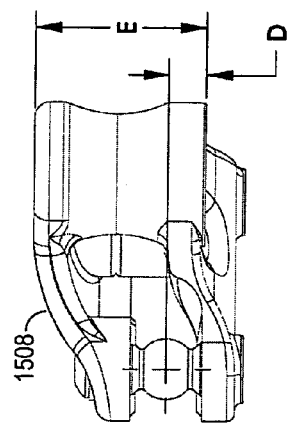
FIG. 62A
FIG. 62B

LOW CENTER-OF-GRAVITY CHASSIS FOR A MODEL VEHICLE

RELATED APPLICATIONS

This application claims the benefit of priority under 35 U.S.C. 120 of provisional patent application Ser. No. 60/669,664 entitled "MOTOR OPERATED VEHICLE," filed on Apr. 7, 2005. This application is also a continuation-in-part of U.S. patent application Ser. No. 11/102,008 entitled "A MODEL VEHICLE SUSPENSION CONTROL LINK," filed on Apr. 7, 2005 now abandoned and previously incorporated as an Appendix of the aforementioned provisional patent application, the contents of which are hereby incorporated by reference in full as if fully set forth herein. This application is also a continuation-in-part of U.S. design patent application Ser. No. 29/227,305 entitled "VEHICLE MOUNTED COIL SPRING AND SHOCK ASSEMBLY" filed on Apr. 7, 2005 now U.S. Pat. No. D,567,886, the contents of which are hereby incorporated by reference in full as if fully set forth herein.

FIELD OF THE INVENTION

The present invention relates to vehicle design and has particular application is the design of remote control and model vehicles.

APPENDICES

Also attached and made a part of this application are Appendices A-C. Appendix A is a document entitled "Model 5310 Revo Owner's Manual" and describes in further detail the construction and operation of an embodiment of the invention. Appendix B are documents entitled "Traxxas Service and Support Guide" and "Revo Part List," which describe in further detail the construction and assembly of components employed in an embodiment of the invention. Appendix C is a document entitled "Revo Suspension Claims," which describes "progressiveness" in further detail as related to motion ratios and the change in motion ratio.

These Appendices are incorporated by reference in this application in their entireties to the same extent as if fully set forth herein.

BACKGROUND OF THE INVENTION

Vehicles in a variety of styles and sizes have been made for many years. However, despite improvements in design of vehicles over the years, vehicles remain unduly expensive to construct, expensive to maintain. Furthermore, vehicles, in particular, remotely controlled vehicles such as models and other reduced-size vehicles, do not have optimum handling characteristics and are unduly difficult to adjust to obtain optimum handling characteristics under different driving conditions.

Accordingly, it is an object of the present invention to overcome the foregoing limitations of the prior art.

SUMMARY OF THE INVENTION

These and other objects and advantages are achieved in accordance with an embodiment of the present invention, wherein a method of configuring components on a chassis of a model vehicle is provided, comprising providing a vehicle chassis, mounting an engine to the vehicle chassis such that the engine crankshaft is positioned at a first height relative to the chassis, and mounting a transmission to the vehicle chassis such that the transmission output shaft is positioned at a second height, and wherein the first height of the crankshaft is no less than about 3 mm and no more than 13 mm higher than the second height of the output shaft.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A through E illustrate an engine mount allowing adjustment of the center distance between the engine crankshaft and the transmission input shaft or engagement and disengagement of a vehicle engine with a transmission;

FIGS. 9A through D are perspective, front elevation, side and top views of a front portion of the vehicle, on which is mounted a bumper assembly;

FIG. 13A is a plan view of the fuel tank, filler cap and finger pull tab, with the cap open;

FIG. 13B is a side view of the fuel tank, filler cap and finger pull tab, as viewed from the rear of the vehicle, with the cap open;

FIG. 13C is a perspective view of the fuel tank, filler cap and finger pull tab, with the cap open;

FIG. 13D is a side plan view of the fuel tank, filler cap and finger pull tab, as viewed from the right side of the vehicle, with the cap open;

FIG. 14 is a partially sectional view of the fuel tank, filler cap and finger pull tab, taken along the line 14-14, with the cap open;

FIGS. 20A through C are front, side in perspective views of a slipper clutch assembly for use in a vehicle;

FIG. 25A is an axial view, looking along the axis of the brake disk from the outboard side, of a brake pad support assembly in accordance with one embodiment of the present invention;

FIG. 25B is a side view of the brake pad support assembly depicted in FIG. 25A;

FIG. 25C is a plan view of the brake pad support assembly depicted in FIG. 25A;

FIG. 25D is a perspective view of the brake pad support assembly depicted in FIG. 25A, as viewed from the outboard side;

FIGS. 30A through D are front elevation, side, top and perspective views of a telescoping drive shaft of the vehicle;

FIG. 43A is a plan view of a steering servo mounted on the right side of the chassis;

FIG. 43B is a side view of a steering servo mounted on the right side of the chassis;

FIG. 43C is a perspective view of a steering servo mounted on the right side of the chassis;

FIG. 43D is an end view of a steering servo mounted on the right side of the chassis, viewed from the front of the vehicle;

FIGS. 49A through D are side, front, top and perspective views of the vehicle chassis supporting certain components of a vehicle;

FIG. 55 is a table depicting an example of five different positionings of the pivot link for different combinations of caster angle and roll center settings, employing a thick spacer and a thin spacer in different configuration, as well as a standard configuration employing a tall center hollow ball type pivot link.

FIGS. 58A through D are front elevation, side, top and perspective views of the front left suspension assembly of the vehicle in a full droop position;

FIGS. 62A and B are top and side views of a rocker arm employed in a rear suspension assembly of the vehicle;

FIGS. 63A and B are top and side views of a rocker arm employed in the front suspension assembly of the vehicle.

DETAILED DESCRIPTION

Figure 1:
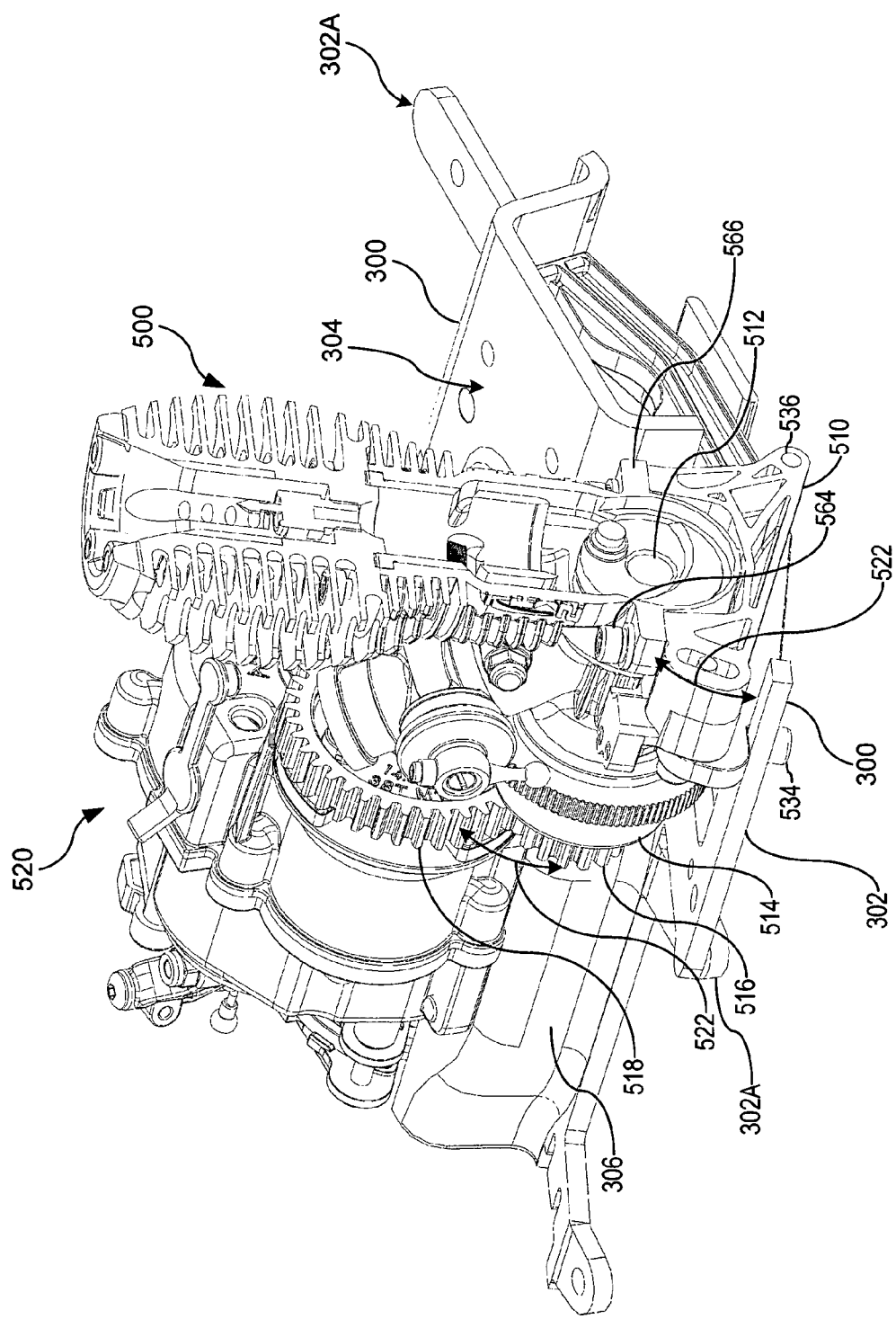
FIG. 1 is in isometric view of a portion of the vehicle showing an engine mount supporting an engine on a chassis, wherein the engine is coupled to a transmission assembly.
Figure 2E:
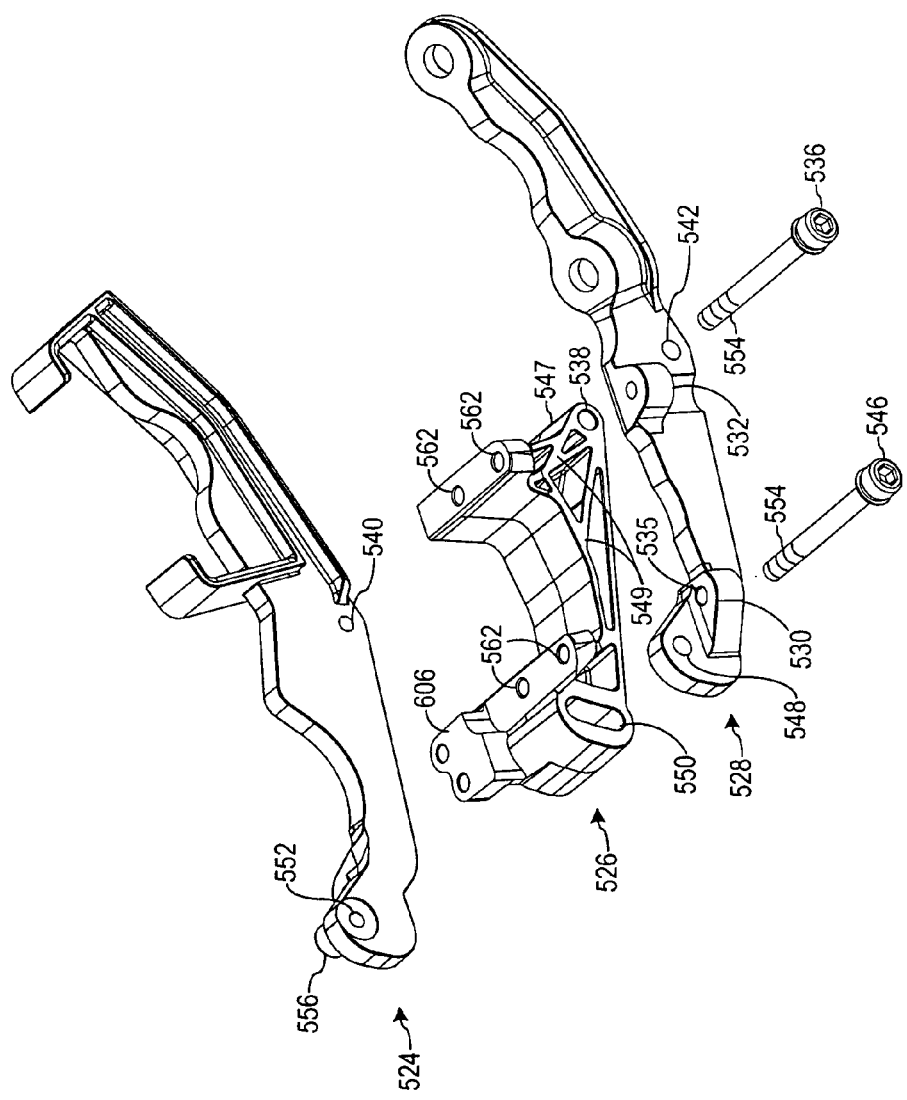
Figures 3A, 3B:
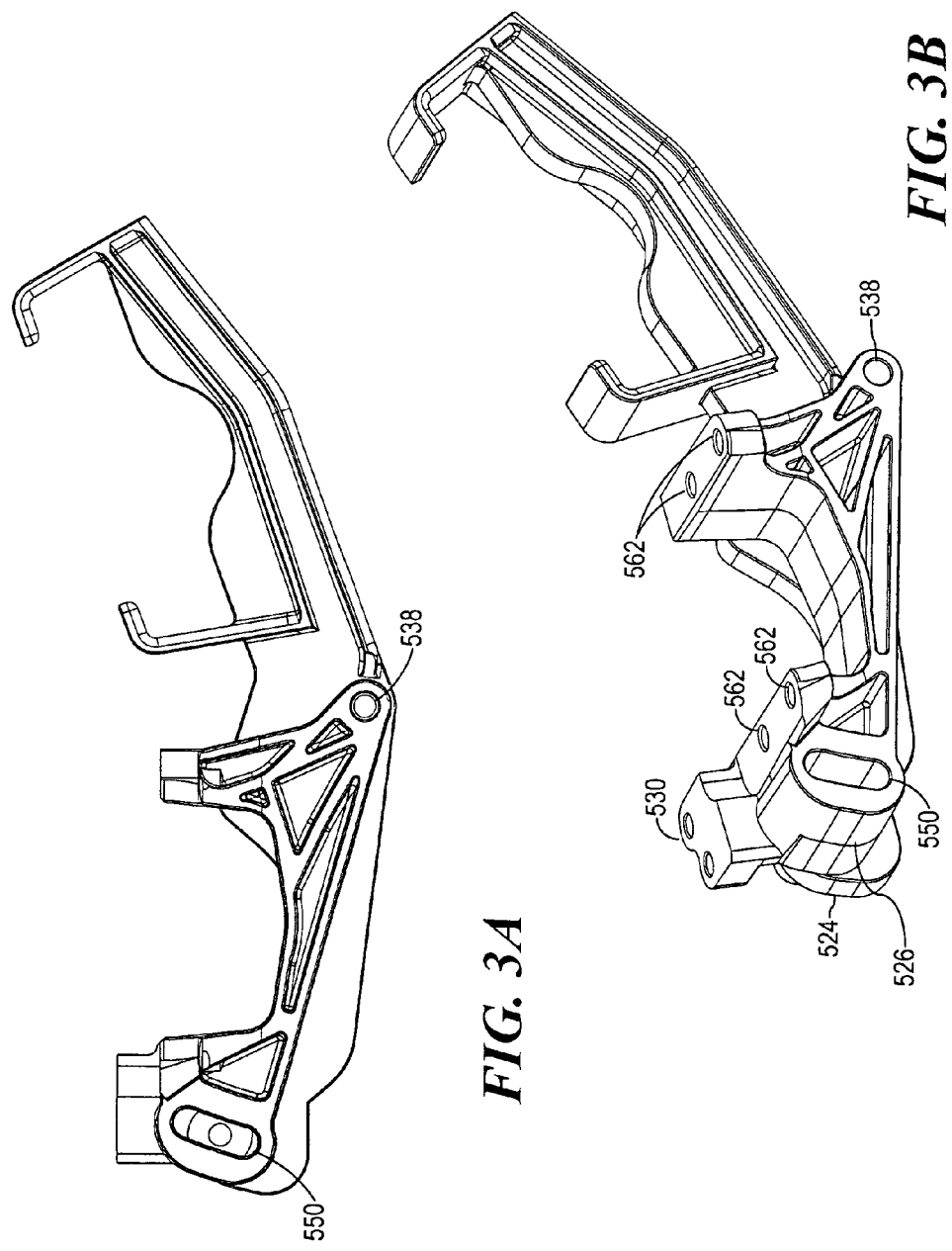
FIGS. 3A and B are respectively a partial section view, taken along the section lines of FIG. 2B, and in isometric view of a partial section view.
Figure 4C:
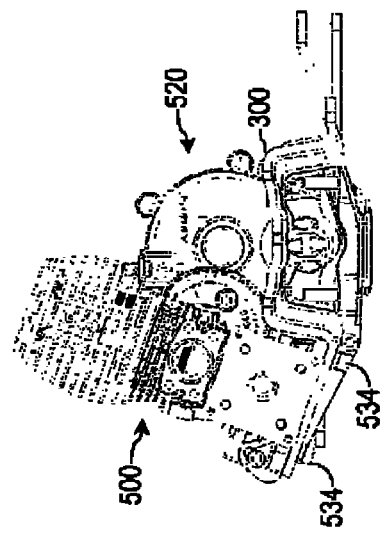
FIGS. 4A through C are top, front elevation and side views of that portion of the vehicle chassis on which the engine and transmission are mounted.
Figure 4A:
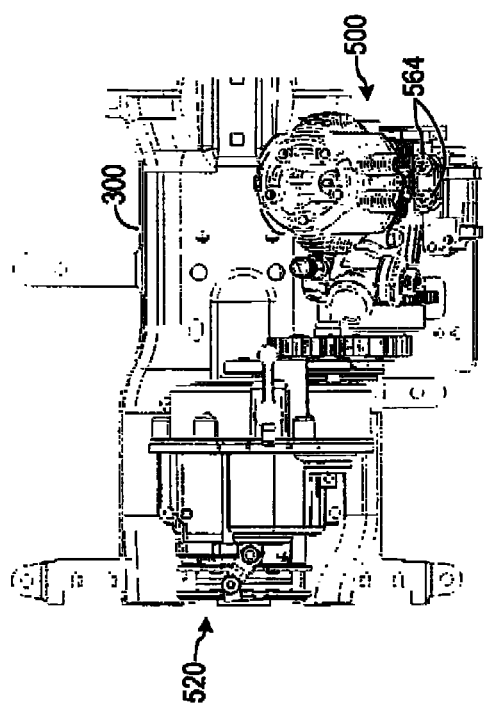
Figure 4B:
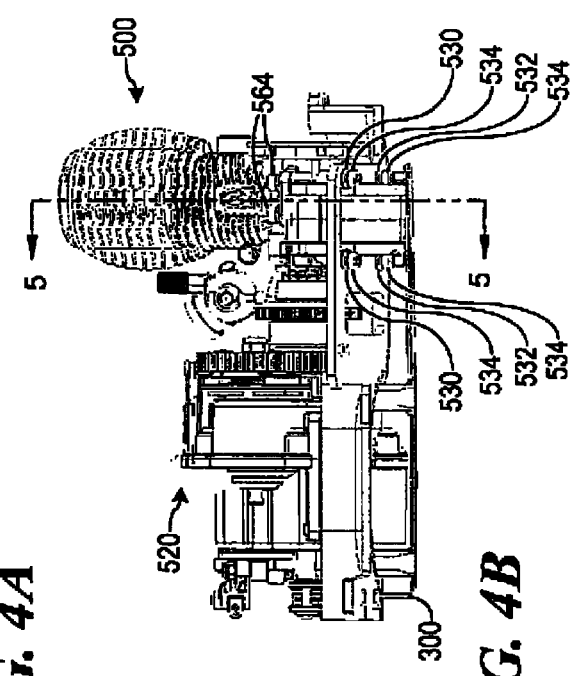
Figure 5:
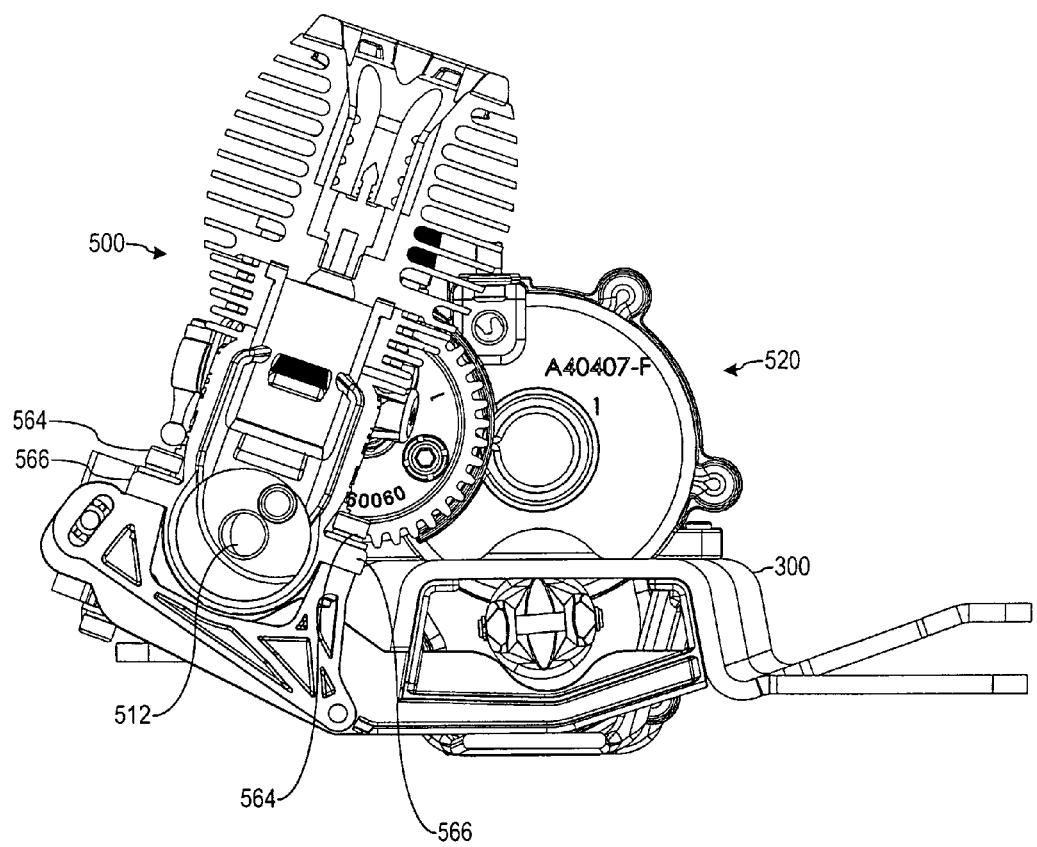
FIG. 5 is a partial section view of the engine and any amount, taken along the section lines of FIG. 4B.
Figure 6:
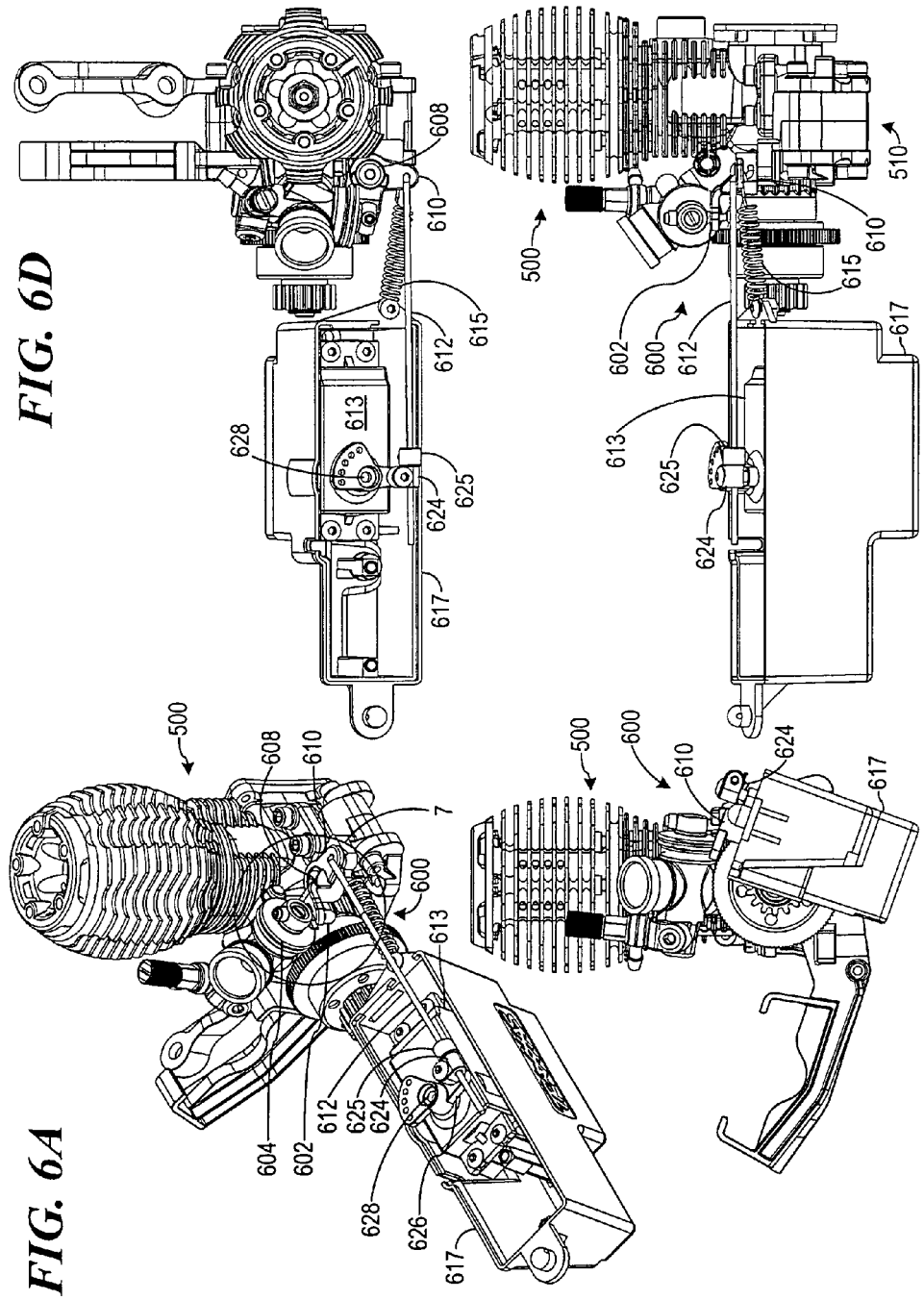
FIGS. 6A through D are isometric, front elevation, side, and top views of an engine and throttle link assembly of a vehicle.
Figure 7:
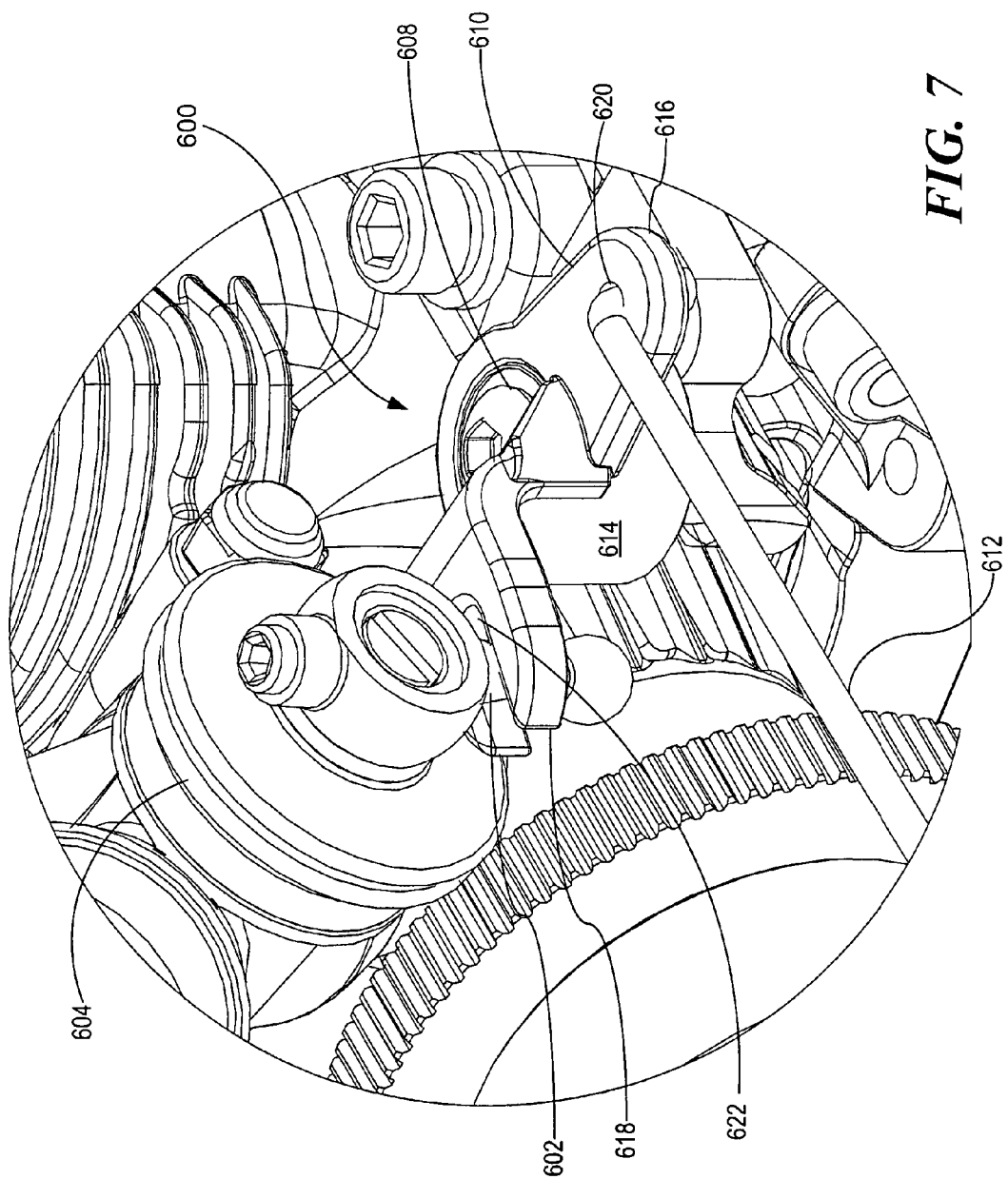
FIG. 7 is a detail perspective view of a portion of the throttle link assembly illustrated in FIG. 6A.
Figure 8:
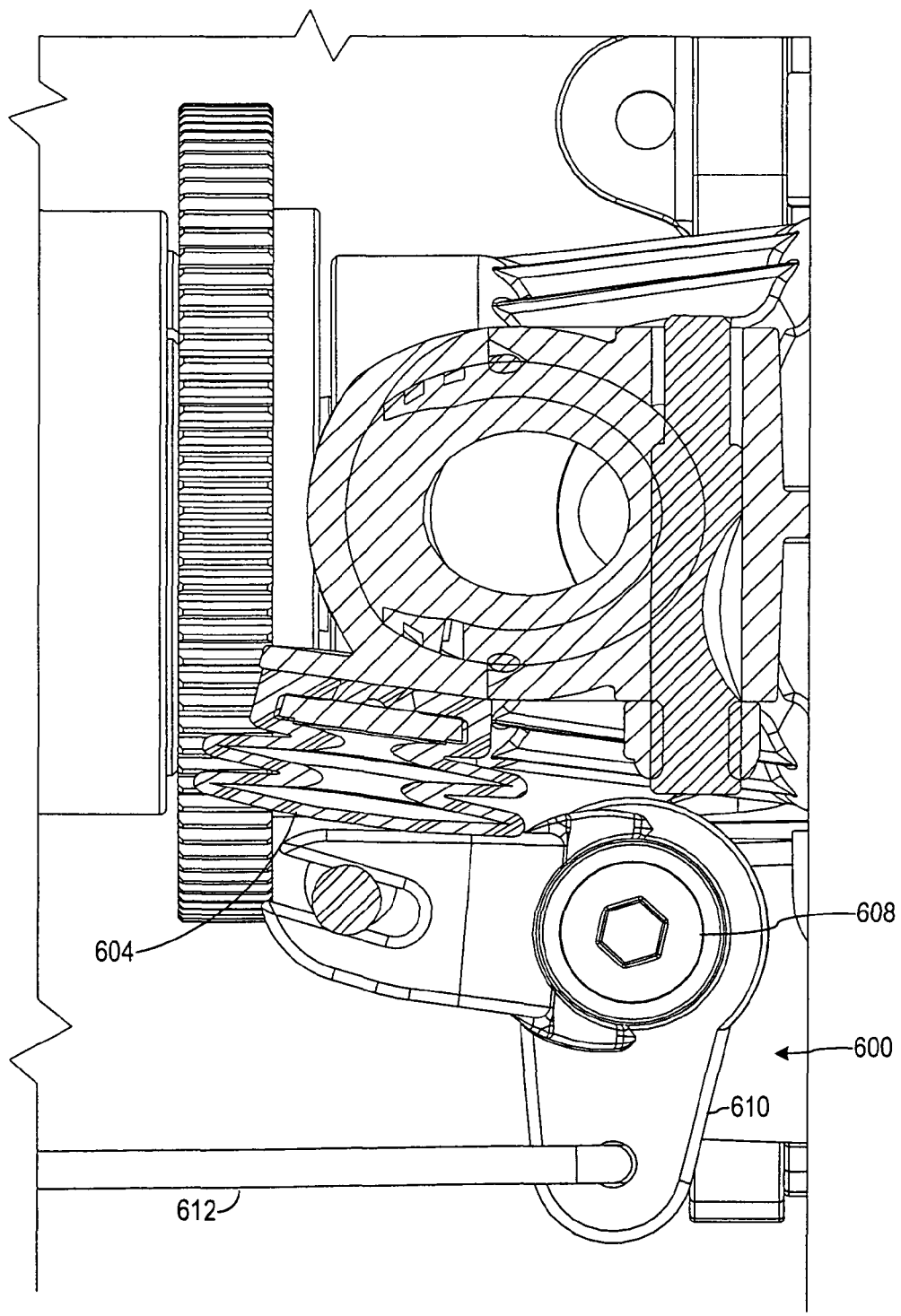
FIG. 8 is a partial section view of the throttle link assembly, taken along the section lines of FIG. 6C.

FIG. 1 illustrates a vehicle engine 500 supported by an engine mount 510 (partially shown) on the vehicle chassis 300. The engine 500 drive shaft 512 rotates a clutch bell 514 and drive gear 516 assembly that is coupled via a spur gear 518 to a transmission assembly 520. The engine mount 510 is configured to allow generally vertical movement, shown by the arrows 522, to accommodate drive and spur gears 516, 518 of different sizes or to allow engagement and disengagement of a vehicle engine with a transmission. Such gear mesh adjustment, in a generally vertical direction, reduces horizontal space needed on the chassis 300 and accommodates the multi-level design of the chassis 300.

Referring now to FIGS. 1, 2A through E, 3A and B and 4A through C, the adjustable engine mount 510 is shown in more detail. The engine mount 510 comprises a front support 524, a middle support 526 and a rear support 528. The supports 524, 526 and 528 are preferably manufactured from cast aluminum; however, other suitable materials having the required strength and temperature resistance would also be suitable. The front and rear supports 524, 528 are generally rib-shaped and are secured on the chassis 300 by outboard flanges 530 and inboard flanges 532. Bolts 534 are inserted into threaded apertures 535 formed in the flanges 530, 532 from and through the bottom of the chassis 300. The middle support 526 is pivotally mounted to the front and rear supports 524, 528 by a pivot bolt 536 extending through a hinge aperture 538 of a middle support 526 and aligned apertures 540, 542 through the front and rear supports 524, 528 respectively. The pivot bolt 536 comprises a threaded end 554, but preferably has a smooth surface that extends through the hinge aperture 538. The threaded end 554 secures the pivot bolt 536 to a threaded shank 546 extending laterally from and in alignment with the aperture 540 of the front support 524. The smooth surface of the pivot bolt 536 reduces friction, thereby facilitating pivoting of the middle support 526 between the front and rear supports 524, 528.

The middle support 526 includes a pivot arm 547 extending generally downwardly and inboard from the remainder of the support 526. The pivot arm 547 positions the hinge aperture 538 so as to impart a horizontal component to the pivotal movement of the engine 500 when the middle support 526 is pivoted from the lowest to the uppermost position. The rotational axis of the drive gear 516 is offset in the outboard direction from the rotational axis of the spur gear 518. Thus, the horizontal component of movement of the engine 500 as the middle support 526 pivots upwardly, moves the drive gear 516 axis more directly toward the spur gear 518 axis than would otherwise be the case, facilitating meshing of the gears with reduced interference. The pivot arm 547 also positions the hinge aperture 538 inboard, to impart greater movement of the engine 500 as the middle support 526 is pivoted. The pivot arm 547 is formed from a plurality of structural ribs 549, to reduce the weight of the middle support 526.

Setting of the position of the engine mount 510 is accomplished by an adjustment bolt 546, which extends through an aperture 548, an adjustment slot 550 and an aperture 552, through the respective rear support 528, middle support 526 and front support 524. The adjustment slot 550 is located near the outboard end of the middle support 526, for ease of access and clearance from the engine 500. A lock washer (not shown) is positioned over the adjustment bolt 546, between the surfaces of the rear and middle supports 528, 526 and between the services of the middle and front supports 526, 524, to secure the surfaces against relative movement when the adjustment bolt 546 is tightened. The adjustment bolt 546 comprises a threaded end 554, but preferably has a smooth surface that extends through the adjustment slot 550. The threaded end 554 secures the adjustment bolt 546 to a threaded shank 556 extending laterally from and in alignment with the aperture 552 of the front support 524. The smooth surface of the adjustment bolt 546 reduces friction, thereby facilitating pivoting of the middle support 526 between the front and rear supports 524, 528.

The engine 500 is supported by inboard and outboard engine support surfaces 558, 560 formed on the engine mount 510 middle support 526. Threaded engine fastening bores 562 are formed through the support surfaces 558, 560, to receive threaded engine fastening bolts 564. The fastening bolts 564 are tightened into the engine fastening bores 562 and through outboard and inboard flanges 566 extending laterally from the engine 500, to secure the engine 500 to the pivotable middle support 526 of the engine mount 510. The engine mount 510 is generally U-shaped between the engine support surfaces 558, 560, to receive the lower end of the engine 500.

In use, the engine mount 510 may be employed to position the engine 500 drive gear 516 toward and away from the spur gear 518. The adjustment bolt 546 is loosened, allowing the outboard end of the middle support 526 of the engine mount 510 to be pivoted to a desired position, about the pivot bolt 536, parting the drive gear 516 and the spur gear 518. The middle support 526 acts as a hinge relative to the chassis 300 and the transmission assembly 520, which is fixed to the chassis 300. The range of pivotal movement of the middle support 526 is determined by the length of the adjustment slot 550. The length of the adjustment slot 550 is determined, primarily based on the variety of teeth or sizes of the drive gear 516 and spur gear 518. The centerline of the adjustment slot 550 substantially tracks a constant radius from the pivot bolt centerline 536, to allow pivotal movement of the middle support 526 without substantial interference between the surfaces of the adjustment bolt 546 and the adjustment slot 550. Once substitution of a different sized drive gear 516 or spur gear 518 is made, or other modifications or maintenance is completed, the engine 500 is pivoted upwardly to mesh the drive gear 516 and spur gear 518, connecting the engine 500 to the transmission assembly 520. The adjustment bolt 546 is then tightened, securing the middle support 526 in the desired position for operation of the vehicle engine 500 and transmission assembly 520.

Referring now to FIGS. 6A through D, 7 and 8 a throttle link assembly 600 is shown that accommodates vertical movement of the engine 500 by the engine mount 510 without being uncoupled from the engine 500. The throttle link assembly 600 is mounted to the middle support 526 of the engine mount 510, for movement with the engine 500 and the throttle arm 602 extending downwardly from the engine throttle 604. The middle support 526 includes a throttle link support surface 606 (shown in FIGS. 1 through 3B) extending towards the front of the vehicle. The throttle link support surface 606 includes a threaded aperture into which is threaded a throttle link bolt 608, securing the throttle link assembly 600 for pivotal movement about an axis generally perpendicular to the throttle link support surface 606.

The throttle link assembly 600 includes a bell crank 610 secured for pivotal movement about the bolt 608, to actuate the throttle arm 602 in response to actuation of a servo-link 612. The bell crank 610 includes a central cylindrical shaft 614, through which the bolt 608 extends. The bell crank 610 pivots about bolt 608. A servo-link arm 616 and a throttle actuation arm 618 extend in substantially perpendicular directions from bell crank 610. The servo-link 612 and the throttle arm 602 are both pivotally connected to the servo-link arm 616 and the throttle actuation arm 618, respectively. The servo-link 612 is preferably manufactured from a length of steel wire, which is bent into an aperture 620 formed through the servo-link arm 616 and secured for pivotal movement.

The throttle actuation arm 618 is positioned higher than the servo-link arm 616, to provide clearance from the servo-link 612 when the engine throttle 604 is actuated towards an open position. A slot 622 is formed through the throttle actuation arm 618, to allow the throttle arm 602 to travel in a relatively straight line of motion as the throttle actuation arm 618 rotates about the throttle link bolt 608. The slot 622 is open at the distal end of the actuation arm 618, to allow the throttle arm 602 to be easily removed. The slot 622 also allows the engine 500 to be removed from the vehicle without disrupting the throttle link assembly 600, which is secured to the engine mount 510, rather than to the engine 500.

The throttle 604 is actuated to an open position by servo-link 612 pushing against the servo-link arm 616, rotating the bell crank 610 to move the throttle actuation arm 618 towards the servo-link 612. The servo-link 612 is secured by a guide 624 and stop 625 to a servo actuation arm 626 of a servo mechanism 613. The guide 624 allows the servo-link 612 to slide, while the stop 625 clamps the servo-link 612, preventing further sliding nearer the throttle 604.

The servo mechanism 613 rotates the servo actuation arm 626 about a servo mounting aperture 628 to move the actuation arm 626 towards the bell crank 610. The servo actuation arm 626 slides along the servo-link 612 until the guide 624 abuts the stop 625, at which point, continued movement of the actuation arm 626 pushes the servo-link 612 to actuate the bell crank 610. As the bell crank 610 actuates, the throttle actuation arm 618 moves towards the servo-link 612 and the throttle arm 602 follows, opening the throttle 604. The guide 624 allows the servo actuation arm 626 to be actuated in an opposite direction, such as to actuate a braking mechanism (not shown), while leaving the throttle 604 and the throttle link assembly 600 in the engine idle position (closed) shown. A spring 615 connected between an enclosure 617 holding the servo and the end of the servo-link 612 extending out of aperture 620 of the bell crank 610 returns the throttle 604 and a throttle link assembly 600 to the engine idle position.

The configuration and position of the throttle link assembly 600 and the servo actuation arm 626 allow adjustment of the position of middle support 526 of the engine mount 510 and the engine 500, without requiring decoupling of the throttle link assembly 600 from the engine or the servo actuation arm 626. Contributing to this is that the pivot points of the bell crank 610 and servo actuation arm 626 (excepting the pivot point at the throttle arm 602) form a substantially rectangular configuration in the unactuated position shown in FIG. 6D. When actuated, the pivot points form a trapezoid. In addition, the axis of the servo-link 612 is substantially perpendicular to the axis of rotation of the bell crank 610 about the bolt 608. Thus, adjusting the position of the engine 500 by the engine mount 510 does not require adjustment of the throttle control link assembly 600.

FIGS. 9A through E illustrate a bumper assembly 650 that cooperates with a skid plate 652 to protect the front end of the vehicle shown from impacts. It will be apparent that the bumper assembly 650 may also be mounted on the rear end of the vehicle, to protect the back of the vehicle from impacts as well. The bumper assembly 650 comprises a bumper support 654 and a bumper 656 that are secured to a bumper chassis mount 658 attached to the vehicle chassis 300. Below the bumper assembly 650 and mounted to the bulkhead assembly 658 is the skid plate 652.

Figure 9E:
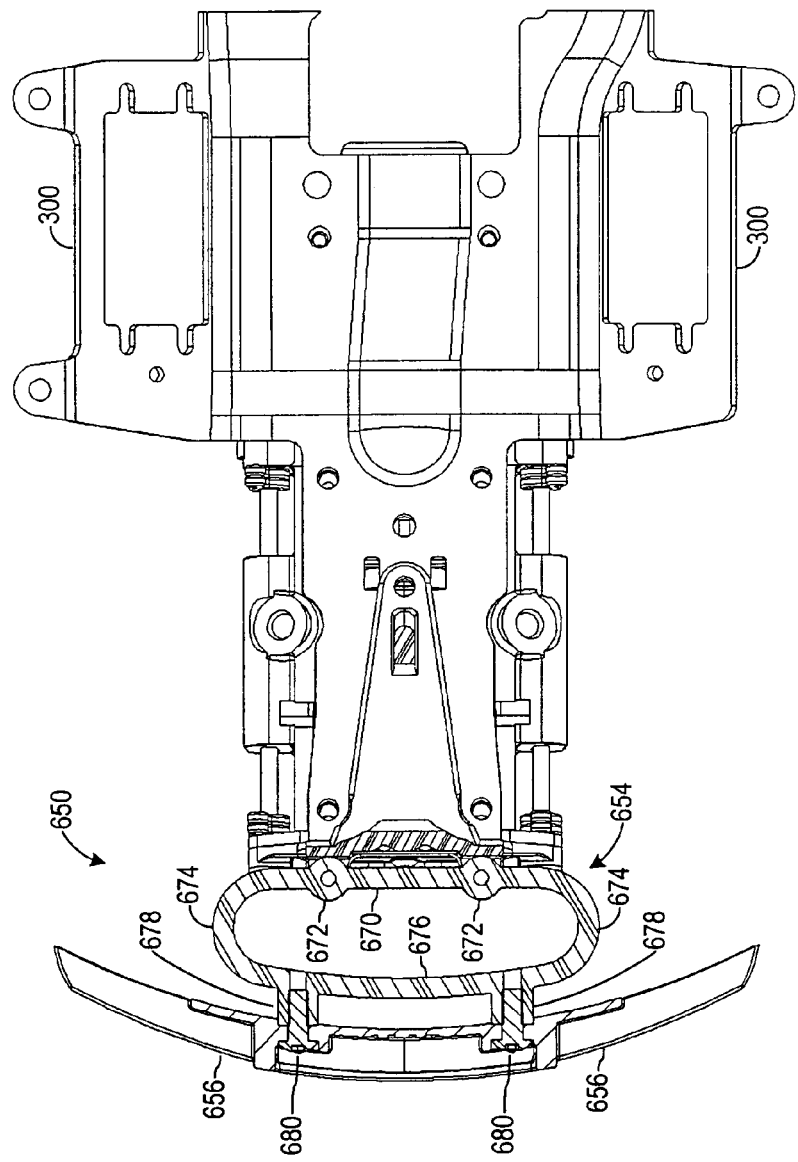
FIG. 9E is a section view, taken along the section line of FIG. 9C.

Referring additionally to FIG. 9E, the bumper support 654 is formed in a generally oval-shape loop and is mounted to the bulkhead assembly 658 in a horizontal orientation relative to the chassis 300. The inboard length 670 of the bumper support 654 includes two integrally formed mounting collars 672 extending vertically across the width of the bumper support 654. The mounting collars 672 are longer than the width of the bumper support 654, to provide greater resistance to and strength during vertical flexing and twisting of the bumper support 654. The mounting collars 672 extend vertically, to avoid interference with flexing of the inboard length 670 of the bumper support 654. A pair of fastening bolts 673 extending through the mounting collars 672 and portions of the bulkhead assembly 658 secure the bumper support 654 to the front of the vehicle. The bumper support 654 also includes C-shaped, curved lateral ends 674, each of which act as a curved leaf spring. The mounting collars 672 are positioned to allow inboard deflection of the lateral ends 674. The outboard length 676 of the bumper support 654 extends between the lateral ends 674 and bends in a slightly convex curve relative to the bumper 656. The inboard and outboard lengths 670, 676 of the bumper support 654 also act as leaf springs to absorb an impact. The outboard length 676 of the bumper support 654 includes two integrally formed mounting collars 678 extending horizontally and outwardly from the front of the bumper support 654. The mounting collars 678 preferably extend outwardly from the outboard length 676 of the bumper support 654 a sufficient distance to maintain clearance between the surfaces of the bumper 656 and the bumper support 654 in extreme impact conditions, when maximum deflection of the components occurs. The bumper support 654 is preferably manufactured from a strong, elastic plastic, such as super tough Nylon® (Zytel ST 801), available from DuPont.

The bumper 656 is secured to the mounting collars 678 by a pair of fastening bolts 680. The bumper 656 includes a frame member 682, surrounding a middle section of the length of the bumper 656. The frame member 682 adds rigidity and strength to the middle section of the bumper 656, as well as supporting a pair of substantially parallel, horizontally extending bumper stays 684. The outboard lengths of the bumper stays 684 each act as leaf springs to absorb an impact. The bumper 656 is formed in a generally convex curve facing the front of the vehicle, to aid in deflecting the vehicle away from objects upon impact and to aid in deflecting movable objects from the path of the vehicle. The rear bumper can be flat, which is more stable for wheelies. The bumper 656 is preferably manufactured from a strong, elastic plastic, such as super tough Nylon® (Zytel ST 801), available from DuPont.

The skid plate 652 is generally rectangular in shape, is substantially uniform in thickness and is secured to and extends forwardly from the bulkhead assembly 658. The skid plate 652 is positioned below and rearward of the bumper 656, and extends upwardly from the bulkhead assembly 658 toward the lower edge of the bumper 656. This orientation causes the front surface of the skid plate 652 to face forwardly and downwardly, to deflect obstacles away from the vehicle and to lift the vehicle's front end upwardly over obstacles in the path of travel. The skid plate 652 acts as a leaf spring to absorb and protect the front end and bulkhead assembly 658 from impacts. Sufficient clearance is provided between the upper edge of skid plate 652 and the bumper 656, to avoid interference as the skid plate 652 flexes. The skid plate 652 is preferably manufactured from a strong, elastic plastic, such as super tough Nylon® (Zytel ST 801), available from DuPont.

In use, the bumper assembly 650 is capable of extreme deflection upon impact. The outboard length 676 of the bumper support 654 will deflect into contact with the inboard length 670, if necessary, on impact. The lateral ends 674 will deform into a smaller radius, upon impact, while both the inboard and outboard lengths 670, 676 will deform or bow inwardly toward the center of the bumper support 654. Deflection of the outboard length 676 of the bumper support 654 allows total deflection of the bumper support 654 in inboard direction greater than the deflection of the lateral ends 674. The bumper support 654 will elastically return to substantially the same position and shape following impact. The stays 684 of the bumper 656 will also elastically deflect rearwardly, into a more bowed shape, upon impact. Following impact, bumper stays 684 will substantially return to the original shape.

Figure 10:
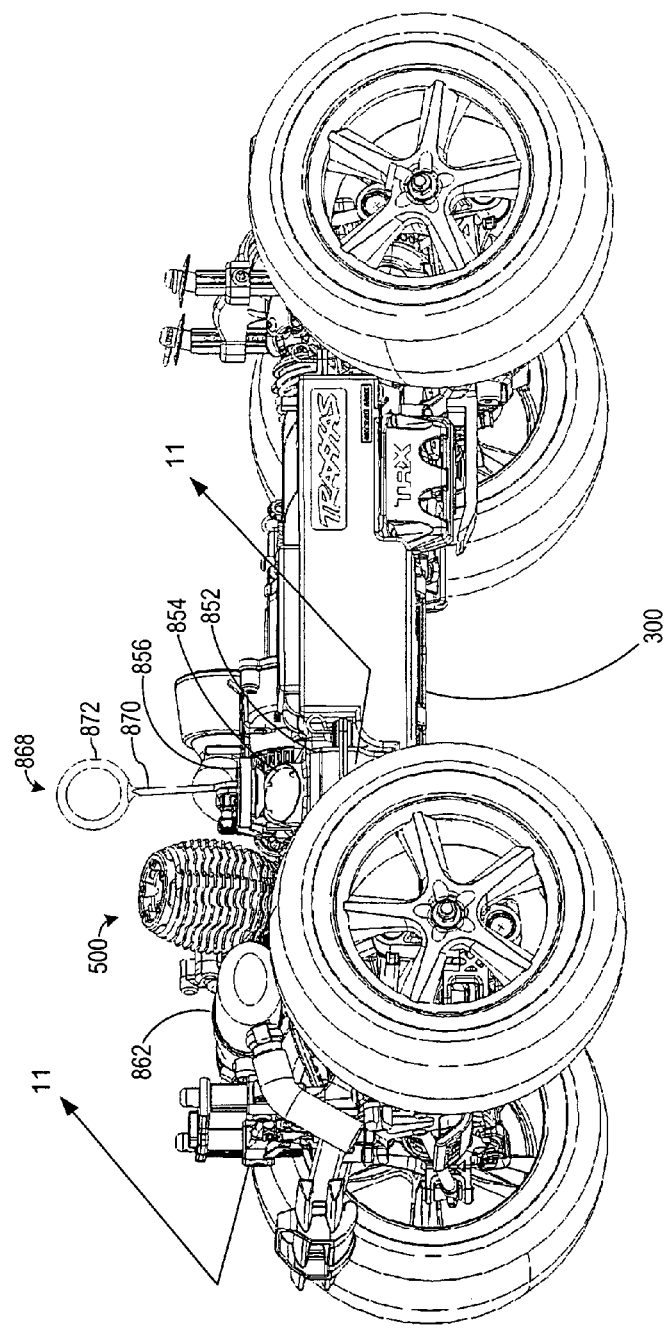
FIG. 10 is a perspective view of a vehicle chassis with the body shell removed.
Figure 11:
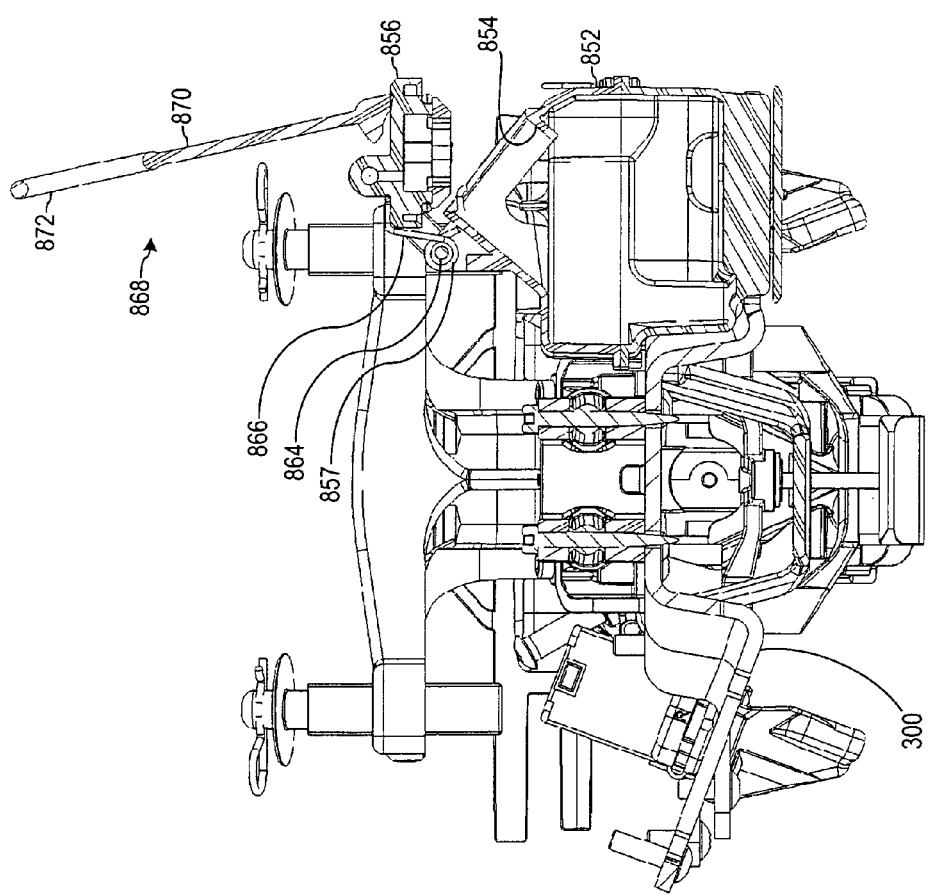
FIG. 11 is a sectional view of the vehicle chassis of FIG. 10, taken through the portion of the vehicle chassis including the fuel tank, filler cap and finger pull tab, with the cap open, along the line 10-10.

Turning now to FIGS. 10-15, and initially to FIG. 10 thereof, a perspective view of a vehicle chassis 300 with the body shell 850 removed is depicted, from the right side of the vehicle chassis 300. Vehicle chassis 300 has a fuel tank 852 secured thereon. Fuel tank 852 has a fill opening 854 and a hinged filler cap 856. In one embodiment, the fill opening 854 has a rim 855 tipped toward a lateral side of the body shell 850, at an angle with respect to the horizontal plane. In one embodiment, this angle is between about 10 degrees and 80 degrees and more preferably between about 40 degrees and 50 degrees. By making the opening 854 at an angle, the body opening is more easily accessible for the outside of the body shell 850 for filling. Furthermore, placing the opening 854 at an angle allows the fill opening 854 to be placed at the side of the body shell 850. The angle permits a fuel filler bottle nozzle to be inserted into the opening 854 without turning the bottle upside down over the vehicle, which reduces spillage. Furthermore, the angle makes the fuel cap easier to open by means of a direct upward pull on a finger ring pull, in a manner to be described below.

The angle also allows greater freedom of body shell styles since a vertical opening would require a fuel neck extension to accommodate taller body shell styles, such as SUV styles, or some other cumbersome method of refueling. However, with the angled opening, many body shell styles of different heights can be used on the same chassis, without changing the fill opening 854 or adding a fuel neck extension.

During fueling, air often becomes entrained in the fuel as it is squeezed into the tank, causing bubbles. These bubbles can cause foam and "burping" during filling, resulting in spills. To minimize this problem, the fuel tank 852 can include channels 853 along the inside upper surface of the top wall of the fuel tank 852, sloped upwardly leading to the inside of the opening 854. These channels allow a path for entrained air in the tank to escape, toward the inside edges of opening 854, where the escaping air is less likely to cause foaming or "burping" during filling.

The fuel tank 852 can have a resiliently closeable cap, such as a hinged fuel cap 856. Fuel cap 856 can be pivotably attached to molded eyes 857 of the top of fuel tank 852 and attached with hinge pins 864. A spring 866 can be installed between the fuel cap 856 and the tank 852 to resiliently urge fuel cap 856 into a closed position when it is not being intentionally physically opened for filling. The cap can also be closed by a clip that snaps over the opposing end of the cap from the hinge and maintains the cap closed position.

Fuel cap 856 also includes a nozzle 858 to which is attached one end of a pressurization tube 860. The other end of pressurization tube 860 leads to a nozzle 861 on exhaust muffler 882. During operation of the engine 500, a slight amount of back pressure will be present in exhaust muffler 882. Pressurization tube 860 causes this back pressure to pressurize fuel tank 852, thus assisting fuel flow without the need to rely on gravity alone and without the need for fuel pumps.

A finger pull tab 868 having an elongated shaft member 870 is attached to the fuel cap 856. This pull tab 868 permits an operator to open the fuel cap 856 while keeping the users hands at a safe distance from hot or rotating objects that could injure them. This is advantageous because, after operation, the fuel cap can be soaked with fuel and sufficiently hot to risk injury from touching the fuel cap or, at the least, an unpleasant burning sensation.

Figure 12:
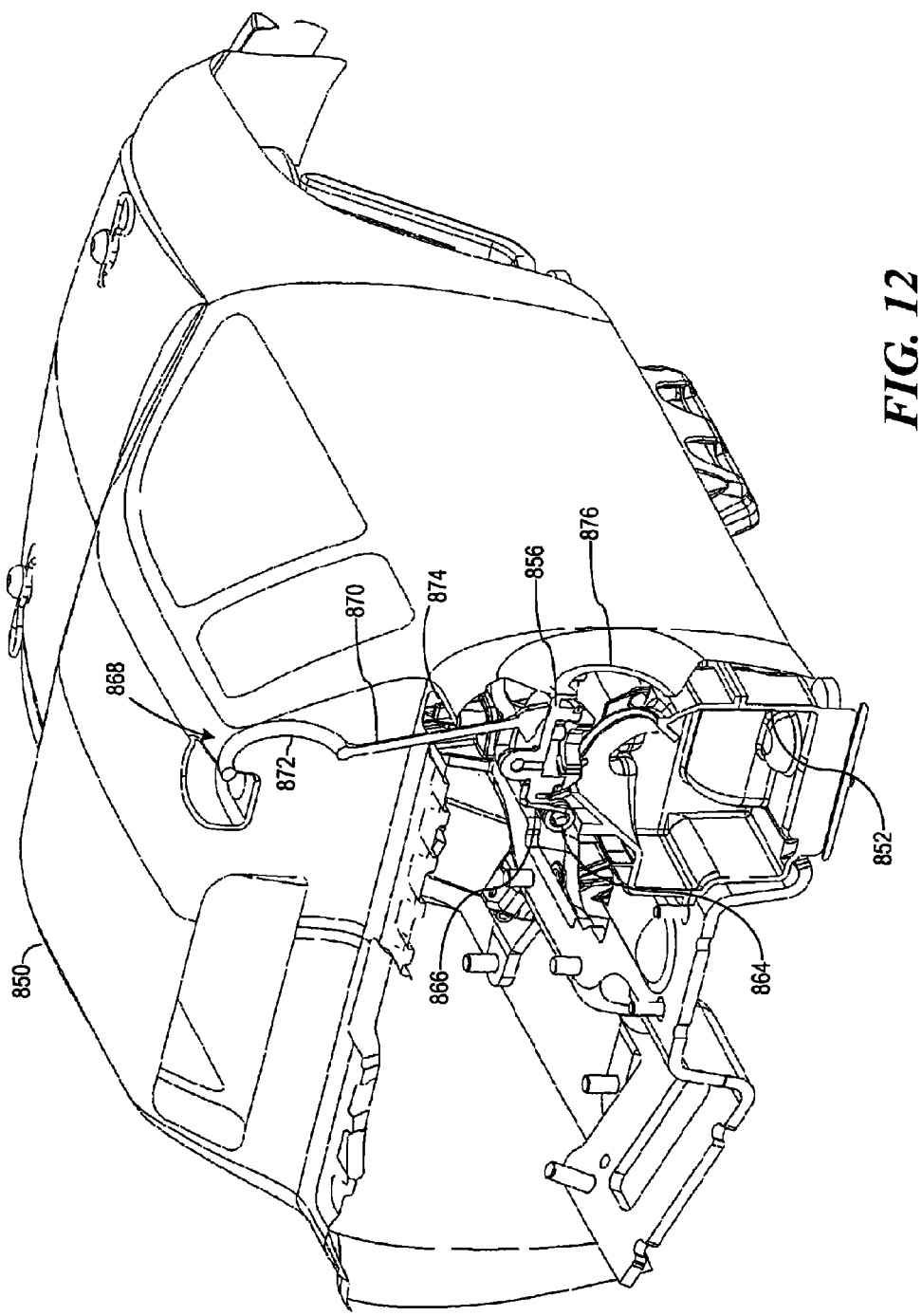
FIG. 12 is a perspective sectional view of a vehicle chassis, with the body shell installed, taken through the portion of the vehicle chassis including the fuel tank, filler cap and finger pull tab, with the cap open, and showing one half of the opening through with the finger pull tab can pass when the body shell is installed or removed.
Figure 15:
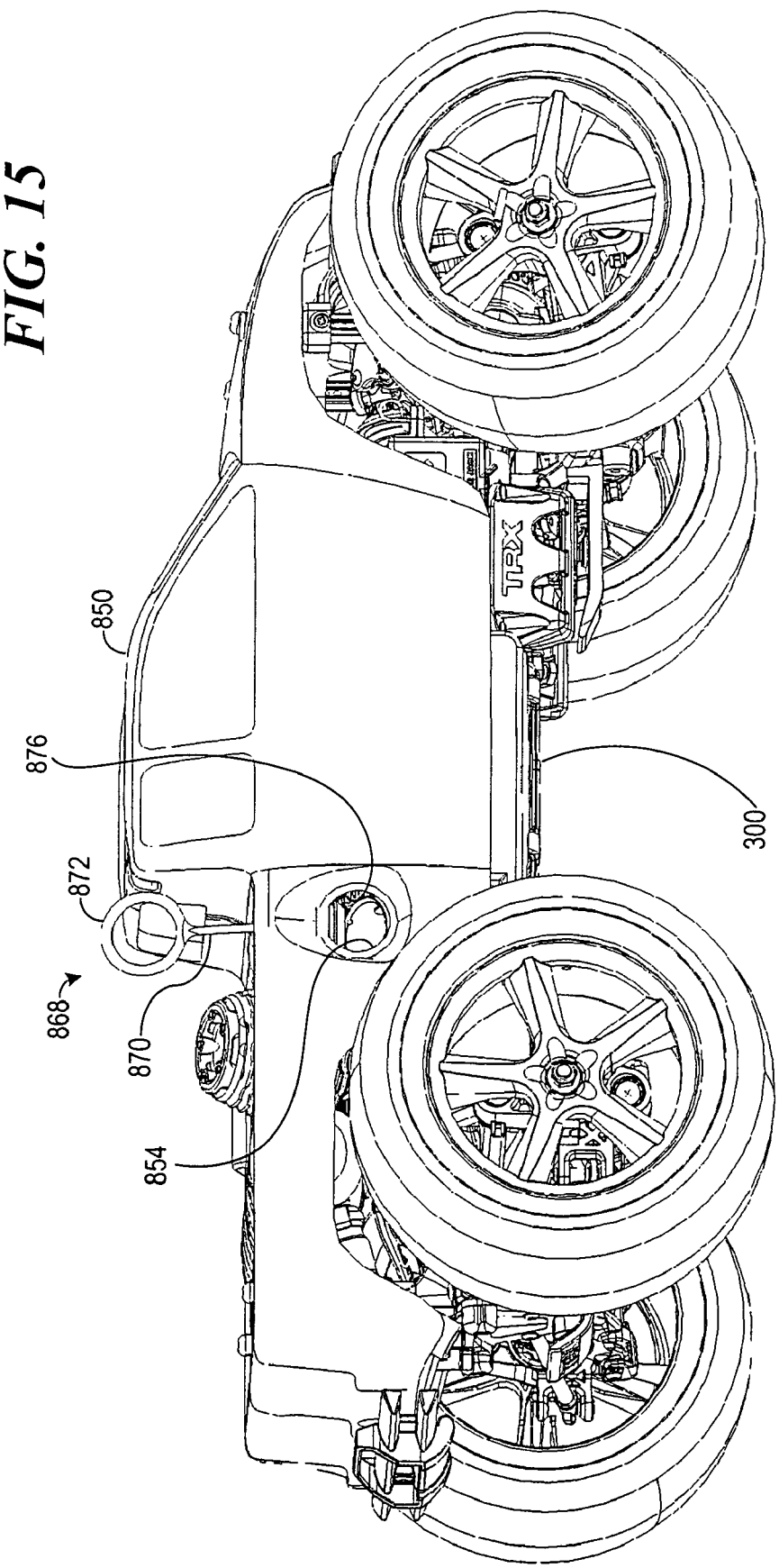
FIG. 15 is a perspective sectional view of a vehicle chassis, with the body shell installed, showing the cap opened.
Figure 16:
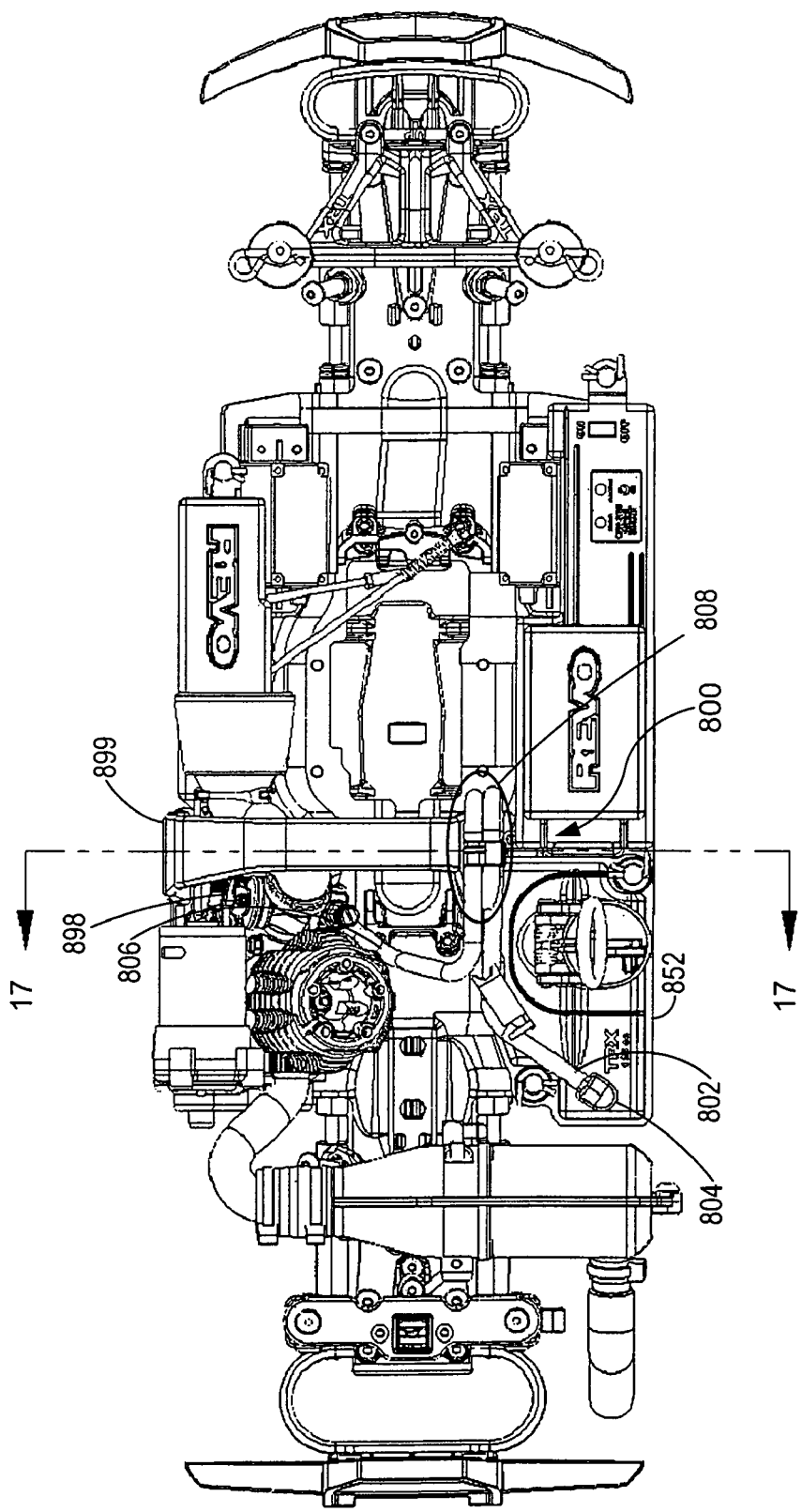
FIG. 16 is a plan view of a vehicle chassis with the body shell and suspension components removed.

In accordance with an embodiment of the present invention, the fuel cap 856 can be opened and closed, and the tank refilled, without the need to remove the body shell 850. However, if desired, the body shell 850 can be removed and replaced for access to the fuel tank 852, or other components on chassis 300, without the need to either open the cap 856 or to remove the finger pull tab 868. However, as can be seen if FIG. 12, the body shell 850 and the fill opening 876 in the body shell 850 are spaced apart from opening 854 sufficiently so that the cap 856 can be pulled open inside the shell 850 sufficiently to allow insertion of a fuel filling line or nozzle, without removing the body shell 850. As depicted in FIG. 12, opening the cap 856 to an approximately horizontal position is sufficient to provide substantially unimpeded access to the opening 854, but any degree of opening sufficient to allow insertion of a fuel filling line or nozzle will suffice.

As can be seen in FIG. 12, the cap 856 can be opened by means of pulling up on finger pull tab 868, which extends through an opening 874 in the body shell 850. Because FIG.

12 is a sectional view, only one half of opening 874 is depicted, but it is to be understood that the remainder of the slot (not shown) is substantially a mirror image of the one half of a opening 874 shown. Opening 874 is sized to permit the tab portion 872 of pull tab 868 to pass without undue interference, to permit removal and replacement of the body shell 850 without removal of pull tab 868. However, since pull tab 868 can be made from a resilient material, such as plastic or rubber, some deformation of tab portion 872 as it passes through opening 874 is permissible. Furthermore, having a separate opening for the finger pull tab 868 provides greater access to the fuel tank opening 854, since the finger pull tab 868 is safely inside the slot 876, away from opening 854, and thus does not interfere with the fuel tank opening 854. The body shell 850 has a fill opening 876 approximately aligned with the opening 854 in the tank 852.

Turning to FIGS. 16-18 and 19A-B, a vehicle chassis 300 having a secured double looped fuel line 800 in accordance with an embodiment of the present invention is depicted. Fuel line 800 has an intake end 802 attached to a nozzle 804 which extends into fuel tank 852, from which fuel can be withdrawn. Fuel line 800 has an exit end 806 that is attached to a carburetor 898 on engine 500. Fuel line 800 can be made from any suitable material, including a plastic or rubber material generally resistant to the type of fuel employed.

Figure 19A:
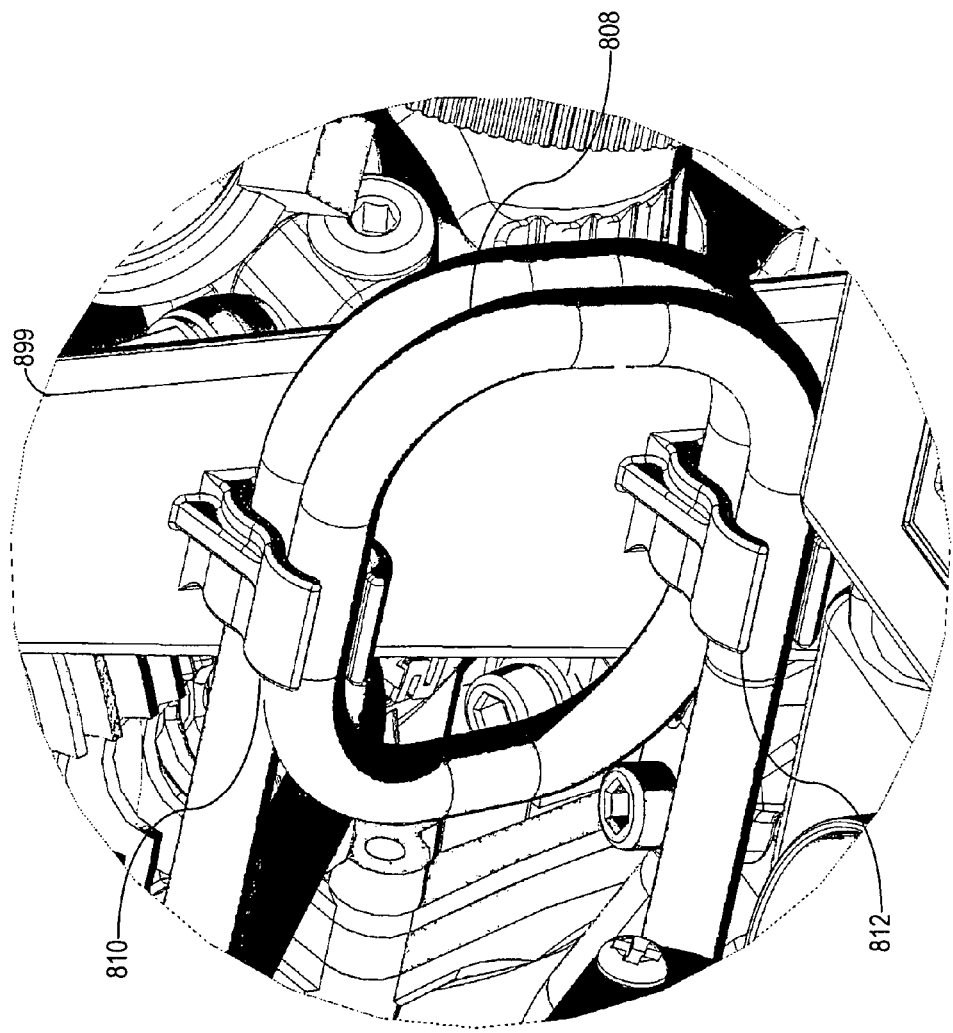
FIG. 19A is a detailed perspective view showing the secured double looped fuel line.
Figure 19B:
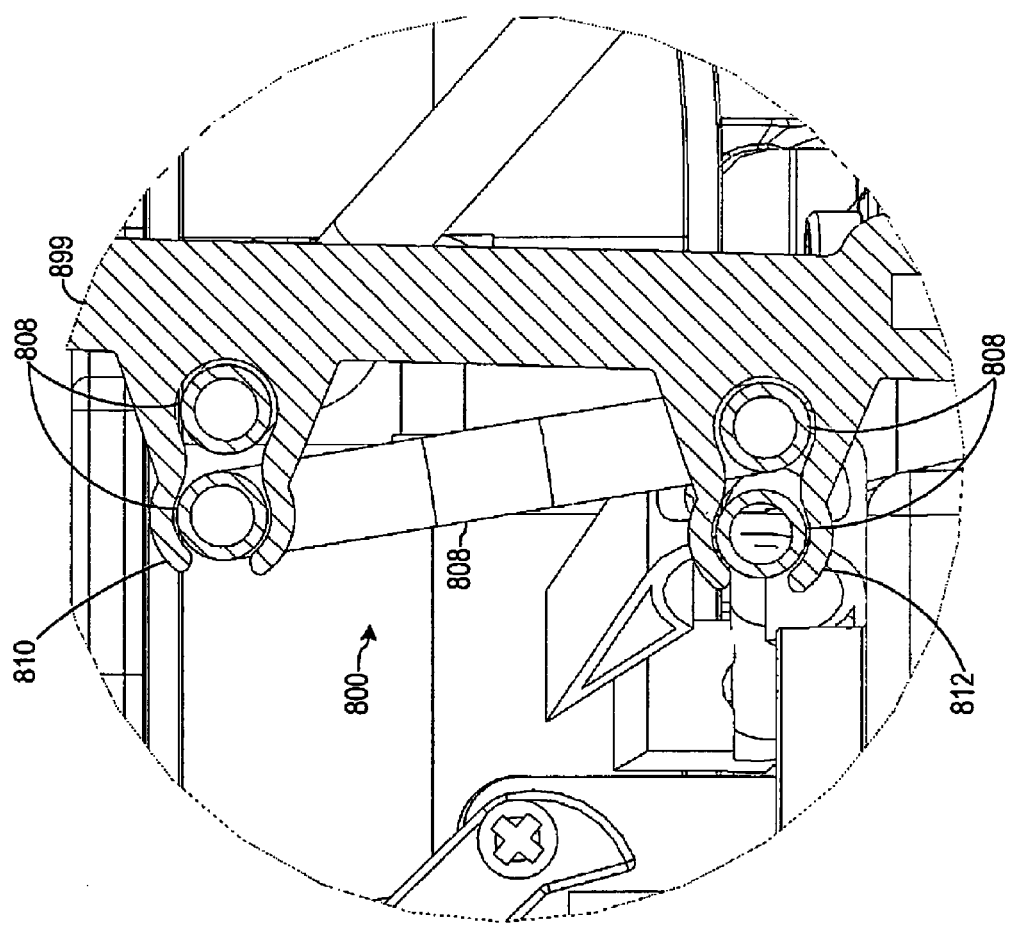
FIG. 19B is a detailed cross-sectional view taken within the detail circle of FIG. 17, showing a cross-section of the secured double looped fuel line as secured in its chassis mount.
Figures 21A, 21B:
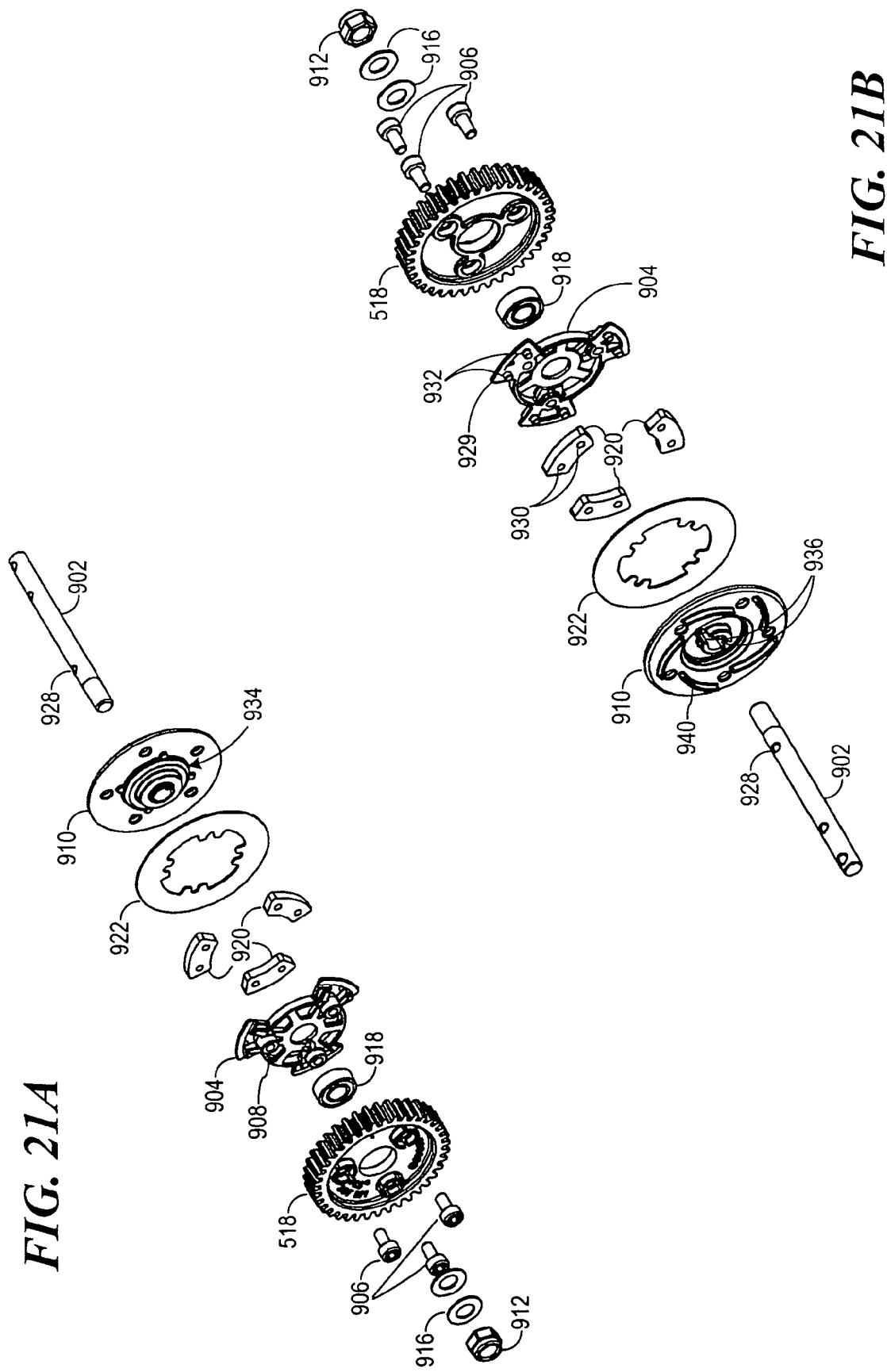
FIGS. 21A and B are exploded in perspective views of the slipper clutch assembly.
Figure 23:
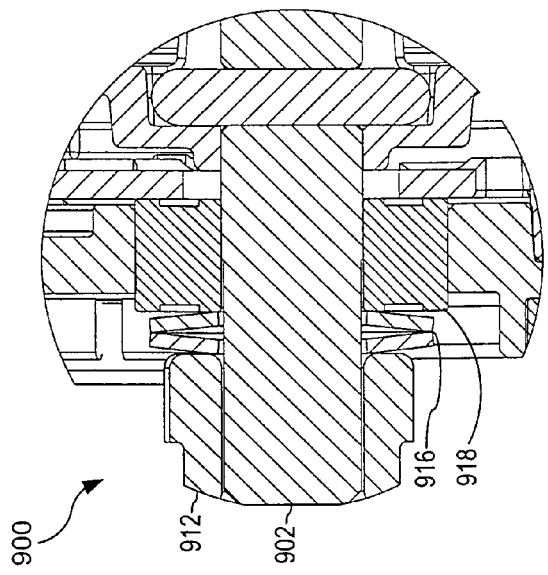
FIG. 23 is an enlarged detail illustration of a portion of FIG. 22.
Figure 22:
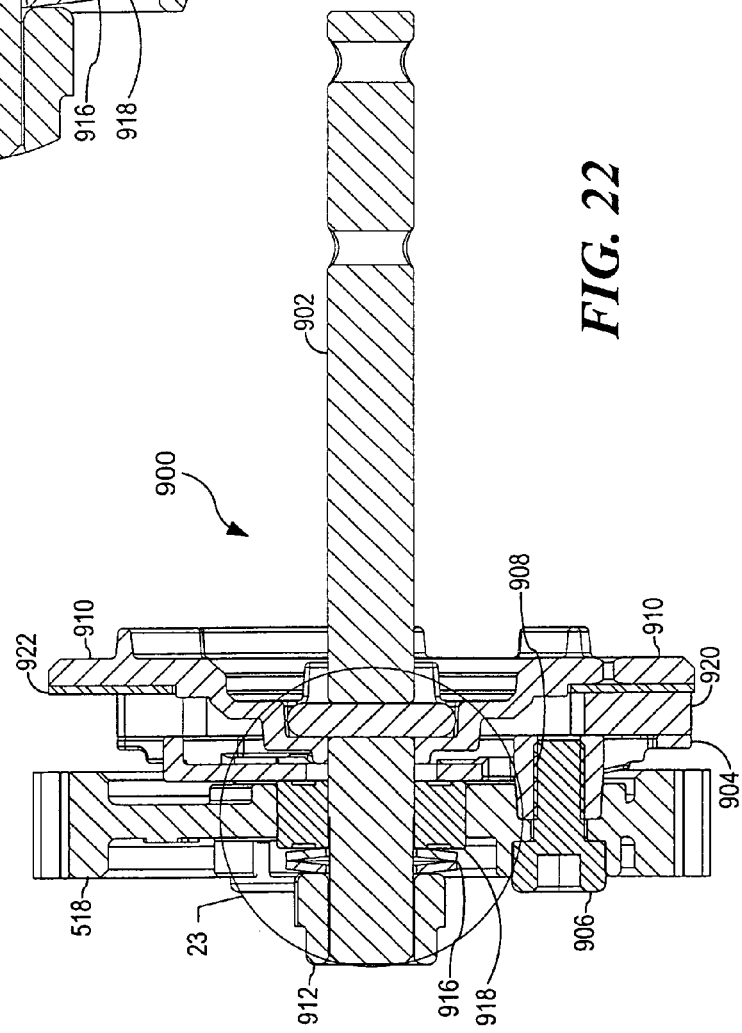
FIG. 22 is a section view, taken along the section lines of FIG. 20A.
Figure 24:
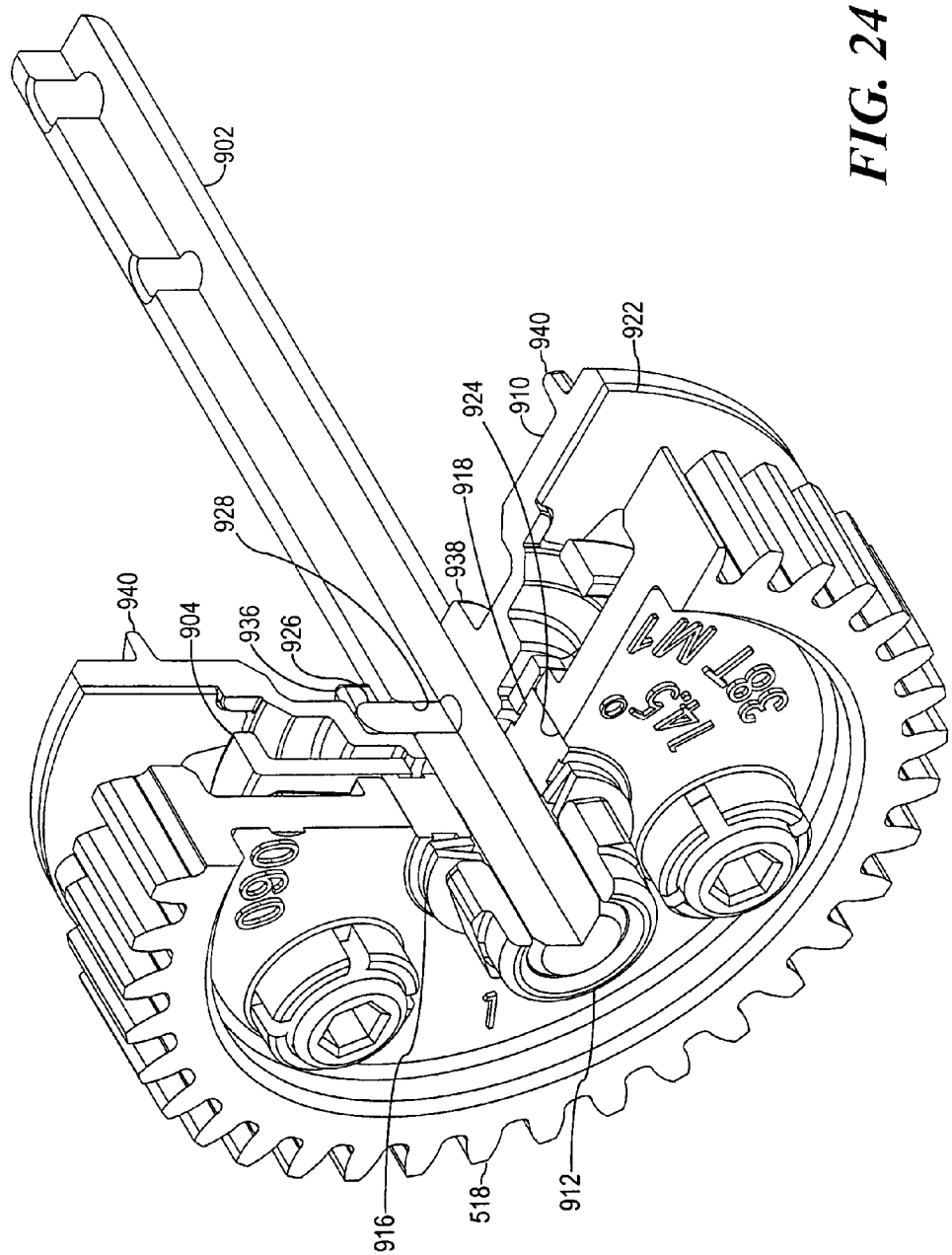
FIG. 24 is a partial section view of the slipper clutch assembly.
Figure 26B:
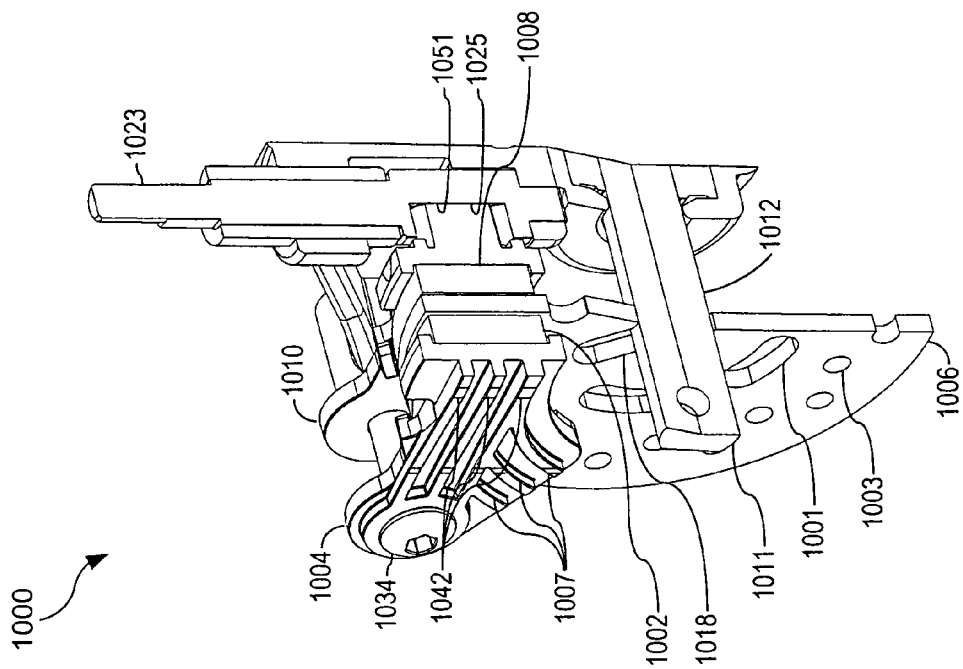
FIG. 26B is a sectional perspective view of the brake pad support assembly depicted in FIG. 25D, taken along the line 25D-25D of FIG. 25D.
Figure 26A:
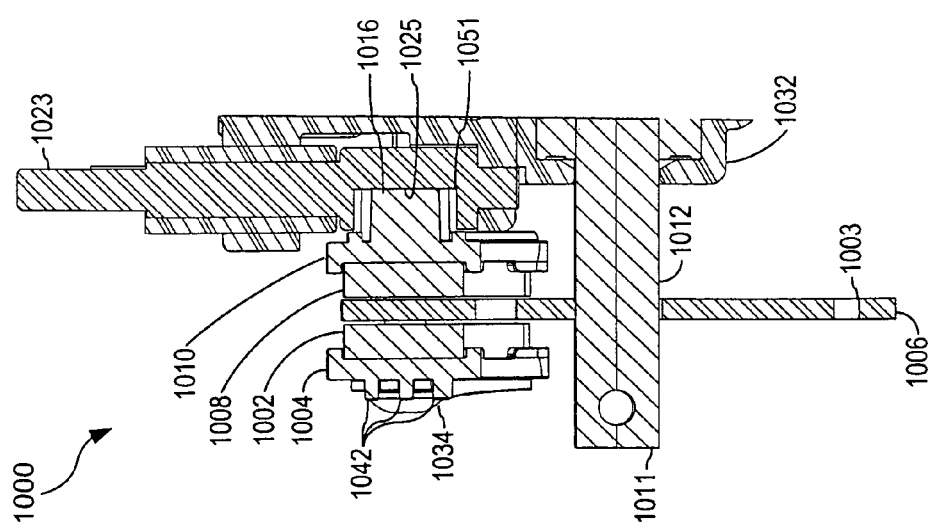
FIG. 26A is a sectional view of the brake pad support assembly depicted in FIG. 25A, taken along the line 25A-25A of FIG. 25A.

As can be seen in FIGS. 19A and B, the middle of fuel line 800 does not run straight between the fuel tank 852 and the carburetor 898, but rather is coiled into a loop portion 808. In the event the vehicle turns over during operation, fuel generally can no longer be drawn into the entrance of the fuel line 800. Accordingly, the engine will soon stop running. Normally, the vehicle will be operated by radio control and the operator may be several hundred feet away from the vehicle at the time the vehicle turns over. Often, this is too far to reach the vehicle to turn it upright before the engine stops. In the present invention, the loop portion 808 of the fuel line will retain additional fuel, giving the operator additional time to reach and right the vehicle before the engine stops running from lack of fuel. It should be understood that, although a double loop is depicted, a single loop or more loops could also be employed.

Although the loop portion 808 will retain additional fuel, the coiling of the fuel line undesirably causes the fuel line to attempt to uncoil. Because the fuel line is nearby many hot surfaces, including the engine 500 and exhaust pipe, the fuel line could easily come in contact with these hot surfaces during rough drives. Accordingly, in accordance with the present invention, the double loop is secured to the chassis by upper double clip 810 and lower double clip 812, which are affixed to a support member such as roll bar 899 which is attached to chassis 300.

With the loop portion 808 secured, the advantages of using the loop portion 808 to provide additional fuel capacity in the fuel line is achieved, without the risk of fuel fires caused by unintended contact between the fuel line and a hot surface.

Figure 17:
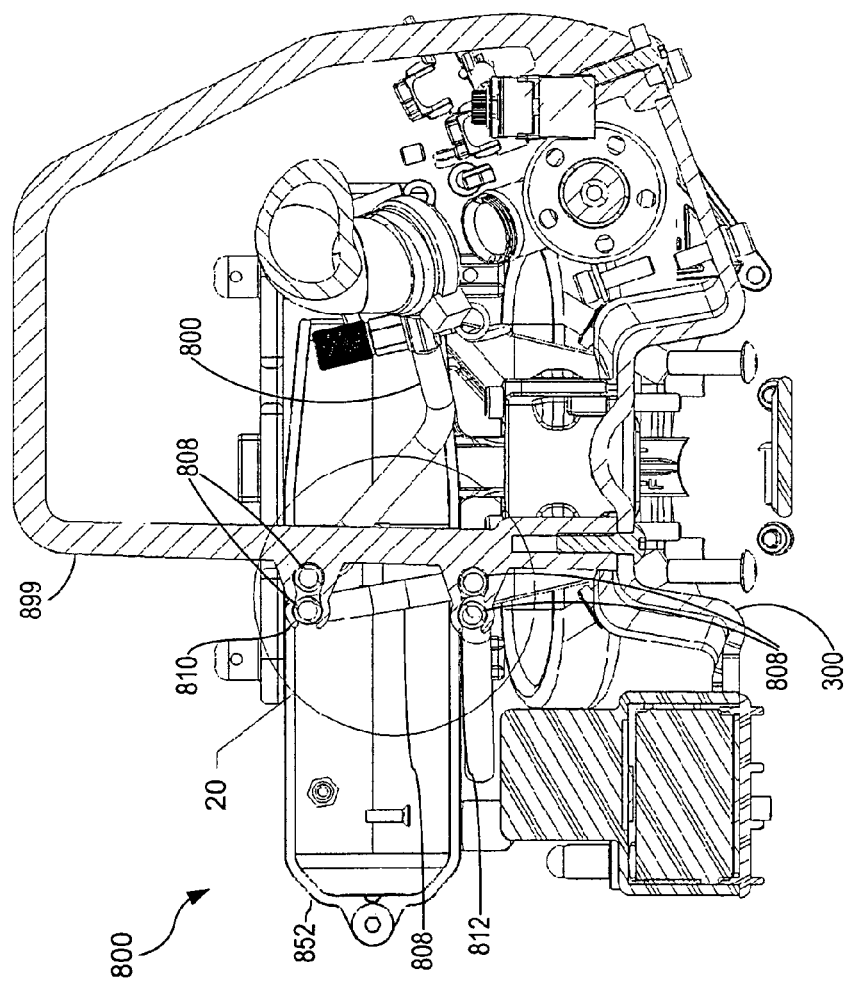
FIG. 17 is a sectional view of the vehicle chassis of FIG. 16, taken along the line 16-16, with a detail circle K around the secured double looped fuel line in accordance with an embodiment of the present invention.
Figure 18:
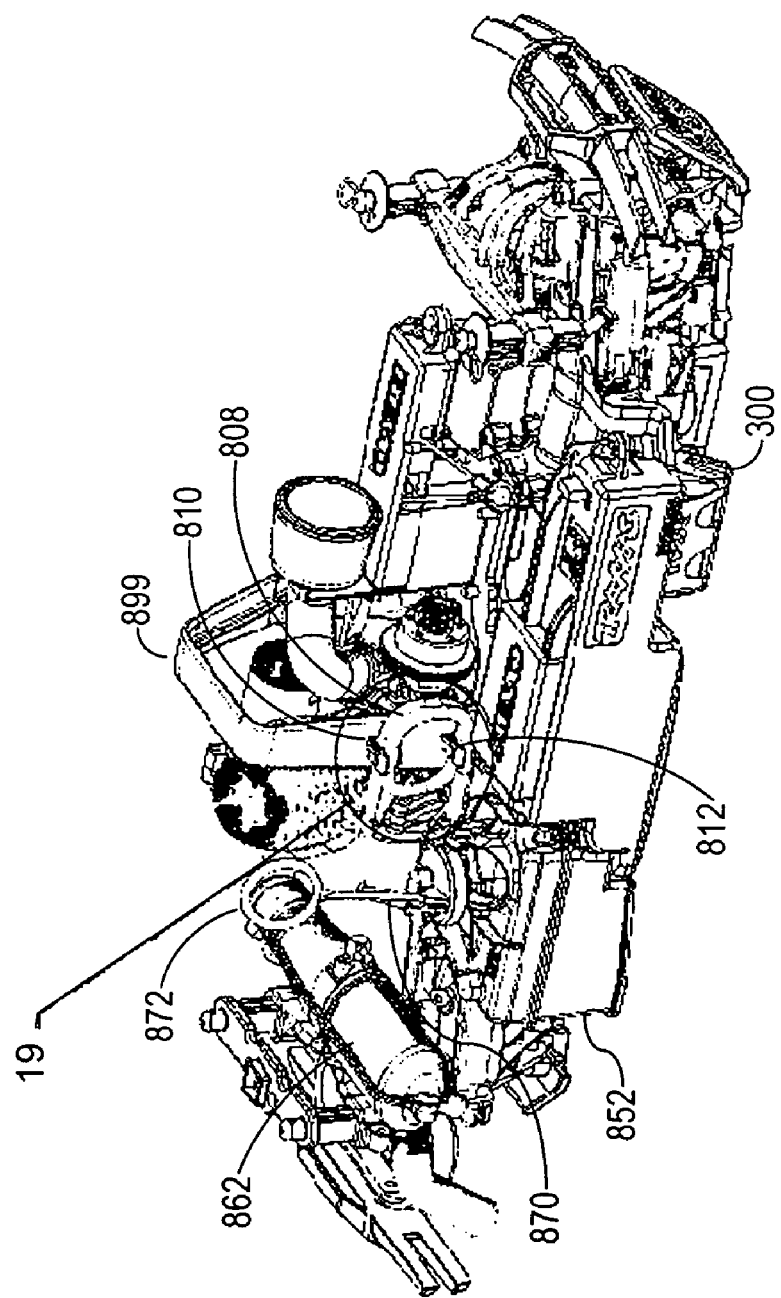
FIG. 18 is a perspective view of the vehicle chassis of FIGS. 16 and 17, showing the secured double looped fuel line.

As can be seen in FIG. 17, the upper double clip 810 can have a first fastener having a pair of opposed arcuate surfaces to grip a first loop of the loop portion 808 and a second fastener having a pair of opposed arcuate surfaces to grip a second loop of the loop portion 808. The lower double clip 812 can have a third fastener having a pair of opposed arcuate surfaces to grip a lower portion of the first loop of the loop portion 808 and a fourth fastener having a pair of opposed arcuate surfaces to grip a lower portion of the second loop of the loop portion 808. At least a portion of one of the opposing surfaces of the third fastener is spaced farther from the other opposing surface to receive and retain the curved surface of a portion of the tube retained by the third fastener. Also, at least a portion of one of the opposing surfaces of the fourth fastener can be spaced farther from the other opposing surface to receive and retain the curved surface of a portion of the tube retained by the fourth fastener.

The first and third fasteners can be formed as one integral piece and the second and fourth fasteners can also be formed as one integral piece. Thus, the third fastener can form an entrance for placement of a portion of a tube in the first fastener and the fourth fastener can form at least a portion of an entrance for placement of a portion of a tube in the second fastener. Conveniently, either or both double clips 810 and 812 can be molded integrally with roll bar 899, which is conveniently made of a plastic material. Because both the fuel line 800 and the double clips 810 and 812 are somewhat resilient, the fuel lines can be resiliently inserted into the clips and resiliently retained there during rough driving, while still being removable intentionally by the operator without difficulty FIGS. 20A-C through 24 illustrate a slipper clutch assembly 900 for transferring torque from the spur gear 518 shown in FIG. 1 to a transmission input shaft 902, during operation of the vehicle. The slipper clutch assembly 900 protects the spur gear 518 and the engine 500 shown in FIG. 1 from acute shocks to the drive train, such as when the wheels of the vehicle are abruptly slowed from a high speed spin to a much lower rotation when the vehicle lands following a jump. The slipper clutch can also serve as a torque limiting traction control aid. The slipper clutch assembly 900 interposes a friction coupling between the spur gear 518 and the transmission input shaft 902, which momentarily slips, allowing the spur gear 518 to rotate at a speed faster than the input shaft 902 until the speed is slowed by the friction coupling of the slipper clutch assembly 900. When acute shocks to the drive train are not experienced, the slipper clutch assembly 900 preferably transmits rotational torque with little or no slippage.

The slipper clutch assembly 900 is configured to allow removal of the spur gear 518 without changing the compression setting of the slipper clutch assembly 900. The spur gear 518 is secured directly to the drive plate 904 by bolts 906 extending through substantially equidistant locations on the body of the spur gear 518. The bolts 906 are threaded into similarly located receptacles 908 formed on the surface of the drive plate 904. The spur gear 518 can be removed from the slipper clutch assembly 900, for service or replacement, by removing the bolts 906 from the receptacles 908.

The slipper clutch assembly 900 transfers torque between the spur gear 518 and the input shaft 902, depending upon the compressive force applied to the drive plate 904 and the driven plate 910. The compressive force is adjusted by an adjustment nut 912 threaded on the end of the input shaft 902 extending from the vehicle transmission (not shown). The adjustment nut 912 abuts and compresses a pair of springs 916 mounted on the input shaft 902 to maintain the desired compressive force. Although springs 916 are spring washers, it will be apparent that other suitable springs, such as helical springs and the like, could be employed. The springs 916, in turn, press a radial ball bearing assembly 918 against the drive plate 904. The drive plate 904, in turn, presses clutch pads 920 against a clutch disc 922 held by the driven plate 910 of the slipper clutch assembly 900. Frictional resistance to movement between the contacting surfaces of the clutch pads 920 and the clutch disc 922 couples the spur gear 518 to the transmission input shaft 902. The rotational and axial position of the driven plate 910 is secured by a pin 926 that extends through a diametrically extending hole 928 through the transmission input shaft 902. Opposing ends of the pin 926 extend from the hole 928, against the driven plate 910 and prevent movement of the plate axially along the shaft 902 away from the adjustment nut 912. The greater the compressive force applied to the clutch pads 920 and the clutch disc 922, the more torque will be required to cause slippage of the slipper clutch assembly 900.

The ball bearing assembly 918 supports the spur gear 518 for rotation about the transmission input shaft 902, in addition to transmitting compressive forces from the spring(s) 916. An aperture 924 in the center of the spur gear 518 preferably fits snugly over the ball bearing assembly 918. The ball bearing assembly 918 also fits snugly over the transmission input shaft 902. This configuration reduces the total clearance encountered between the input shaft 902 and the teeth of the spur gear 518, reducing the risk of run out by the spur gear 518.

The clutch pads 920 are each supported by a flange 929 extending outwardly from a central, circular body portion of the drive plate 904. The clutch pads 920 each include a pair of indexing holes 930 in their surfaces opposite the clutch plate 922. Indexing posts 932 extending from the flanges 929 insert into the indexing holes 930, secure the clutch pads 920 from sliding out of position during operation.

The clutch disc 922 is secured against movement by the driven plate 910 of the slipper clutch assembly 900. The clutch disc 922 has a circular outer perimeter substantially matching the circular perimeter of the driven plate 910. However, a central portion is cut from the clutch disc 922 in an irregular pattern, substantially matching a similar pattern 934 extending from the surface of the driven plate 910 toward the drive plate 904. The perimeter of the irregular pattern cut in the clutch disc 922 fits around the similar pattern extending from the driven plate 910, to secure the clutch disc 922 for rotation with the driven plate 910.

The driven plate 910 is secured for rotation with the transmission input shaft 902 by the pin 926, the ends of which engage an opposing pair of slots 936 formed in a collar 938 extending around the input shaft 902 and away from the drive plate 904. The pin 926 and the slots 936 cooperate to index rotation of the driven plate 910 to the input shaft 902. Rotation of the driven plate 910 rotates both the pin 926 and the input shaft 902.

Extending from the surface of the driven plate 910 are a number of integrally formed vanes 940. The vanes 940 trace spiral paths outwardly over the area of the driven plate 910 supporting the clutch disc 922. As the driven plate 910 rotates, the spiral vanes 940 act as cooling fins to dissipate heat caused by friction between the clutch disc 922 and the clutch pads 920 during operation of the vehicle.

The slipper clutch assembly 900 provides reduced size, low inertia and enhanced heat dissipation. These features are provided by use of a semi-metallic, high-friction material to form the clutch pads 920. Use of such a high-friction material allows placement of the clutch pads 920 closer to the axis of rotation of slipper clutch assembly 900, reducing the diameter of the slipper clutch assembly 900. The reduced diameter contributes to both reduced size and low inertia. Both the drive and driven plates 904, 910 are preferably manufactured from cast aluminum, which is light-weight and a good heat conductor, further contributing to low inertia and enhanced heat dissipation.

In prior model vehicle braking pad assemblies, a thin piece of friction material is supported by a pad support constructed of a thin piece of sheet metal. A small piston, actuated by a cam, applies force to the sheet metal plate. The plate applies force to the friction material and disk. A problem with such prior braking pad assemblies is that the use of thin and flexible material for the pad support and friction material results in poor distribution of pressure, overheating and uneven wear. As a result, the area directly under the piston wears quickly and overheats.

In order to overcome these disadvantages of prior model vehicle braking pad assemblies, in an embodiment of the present invention, the friction material can be supported by a very rigid cast pad holder (also called a caliper). The pad holder geometry is more three dimensional than typical pads that are stamped from sheet metal. This structure also provides the caliper with a high thermal capacity and better thermal conductivity for cooling. Furthermore, in an embodiment of the present invention, the caliper can employ an integrated post with ribs providing additional stiffness to help evenly distribute the forces from the actuating cam. In another embodiment, an integrated cam receiving surface on the caliper also helps to evenly distribute the forces from the cam.

FIGS. 25A-D, 26A-B and 27-28 depict a model vehicle braking pad caliber assembly 1000 in accordance with in an embodiment of the present invention. The braking pad caliper assembly 1000 has outboard pad made of a friction material 1002 supported by a very rigid cast pad holder or caliper 1004 on the outboard side of braking disk 1006. On the inboard side, an embodiment of the invention can include a pad of friction material 1008 supported by an opposing very rigid cast pad holder or caliper 1010 on the inboard side of braking disk 1006. The braking disk 1006 can be made from strong material, such as steel, aluminum or titanium. The braking disk further can have slots 1001 and holes 1003 for, respectively, reduction of weight and assisting cooling of the disk. The calipers 1008 and 1010 can be made from a strong material, such as steel, aluminum or titanium. In an embodiment, the calipers 1008 and 1010 can be made from cast aluminum, which has a higher thermal conductivity than steel as well as a high strength to weight ratio.

Disk 1006 is slidably mounted over drive shaft 1012 but not affixed to it. That is, the disk 1006 is free to slide axially on the shaft 1012 to a limited degree. Drive shaft 1012 has opposite flat surfaces 1013 and 1015 on its end 1011 for receiving a coupling (not shown). The coupling has two pin keys (not shown) that extend into opposite ends 1018 and 1020 of slot 1022, that extends from hole 1017 in disk 1006. These pin keys force the disk 1006 to rotate with the coupling, and hence with the drive shaft 1012 but permit a limited degree of axial sliding of the disk 1006 with respect to drive shaft 1012.

Figure 27:
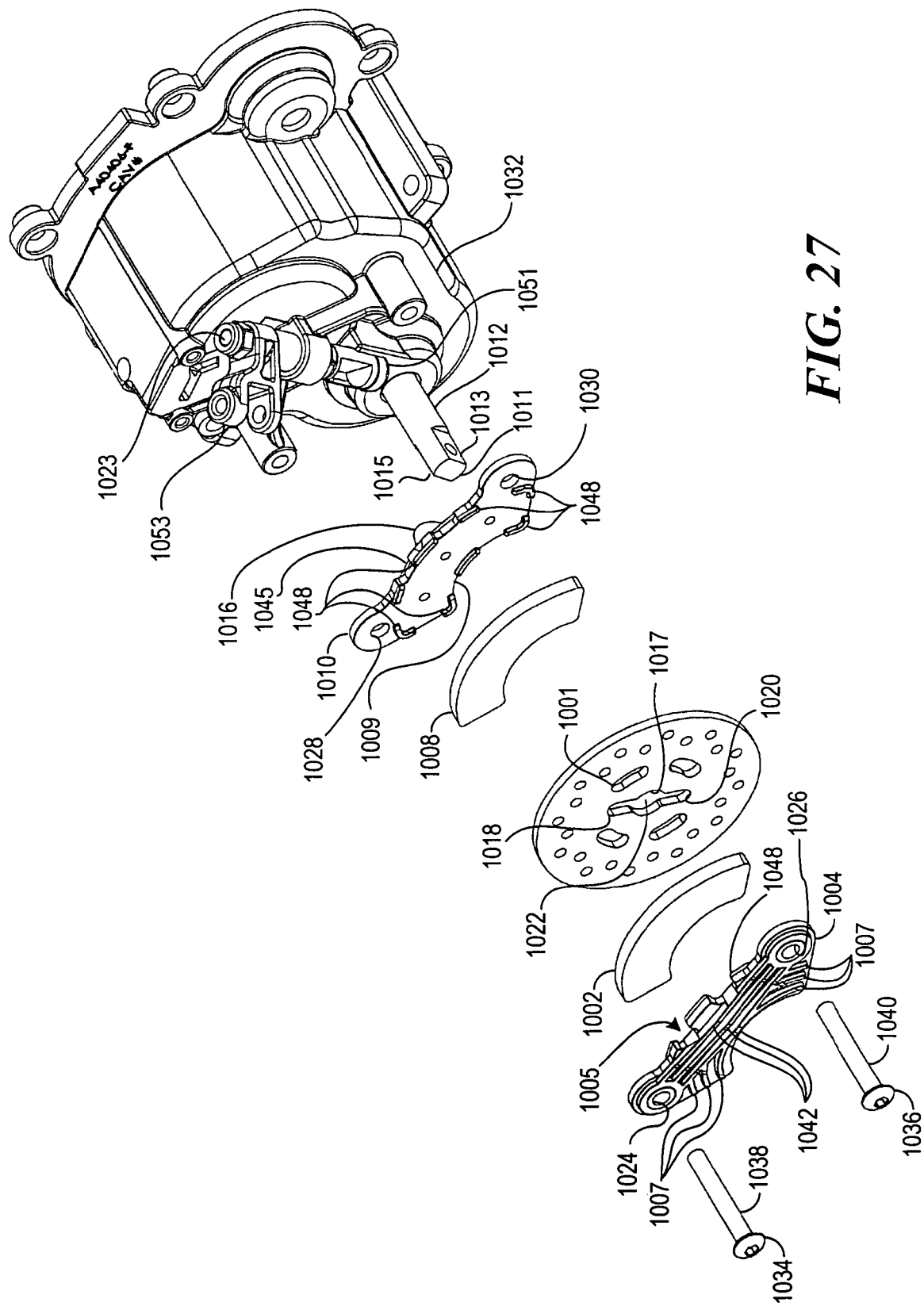
FIG. 27 is an exploded perspective view of an embodiment of the brake pad support assembly and base, as viewed from the outboard side.
Figure 28:
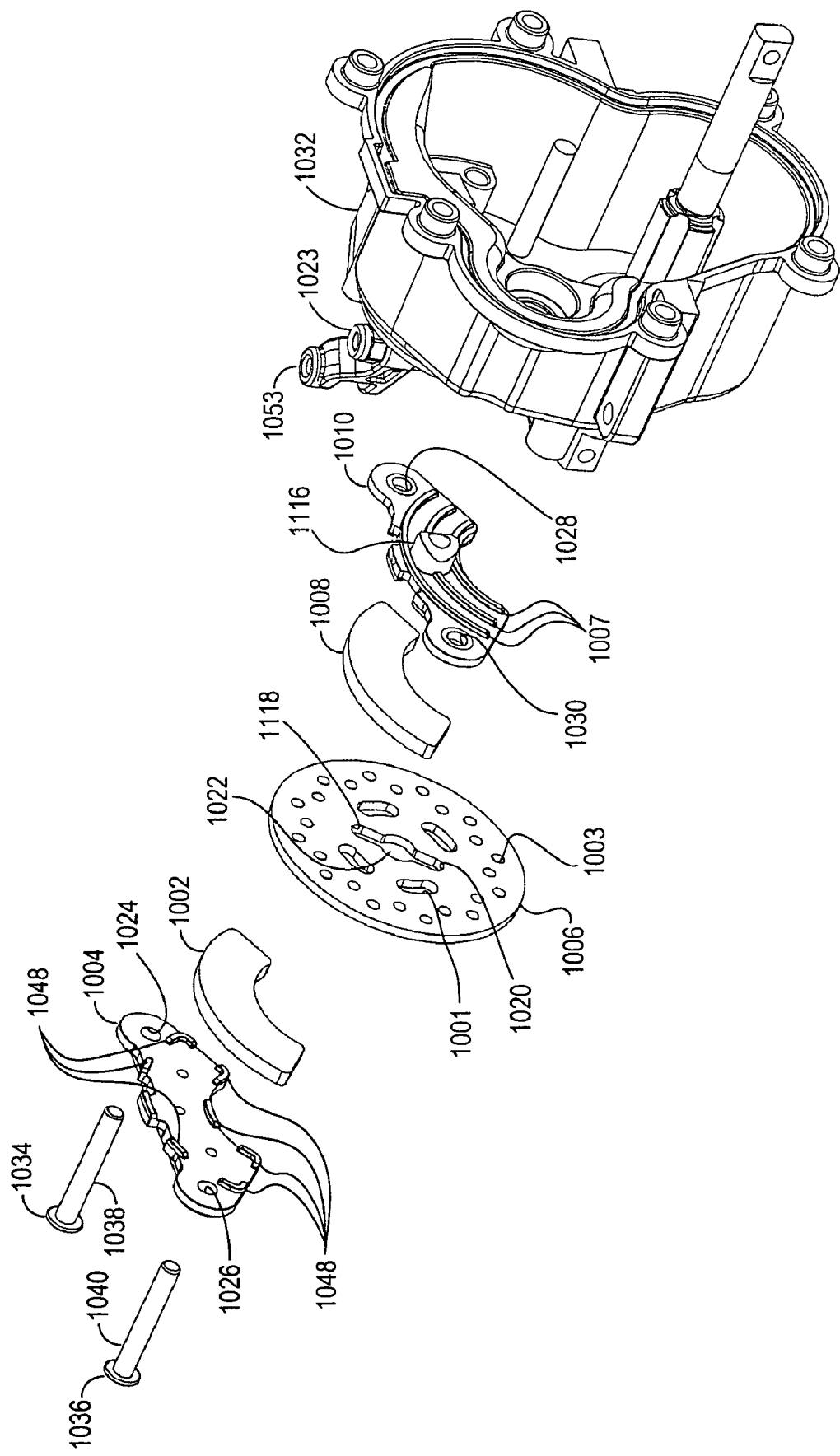
FIG. 28 is an exploded perspective view of an embodiment of the brake pad support assembly and base, as viewed from the inboard side.
Figure 29D:
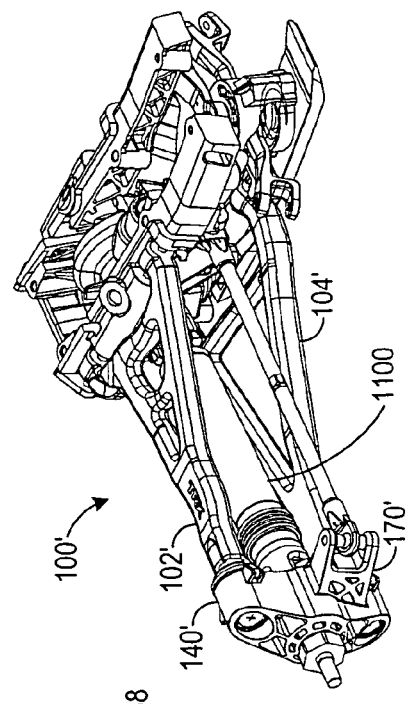
FIGS. 29A through D are rear elevation, side, top and perspective views of a front bulkhead assembly and suspension arm assembly of the vehicle.
Figure 29B:
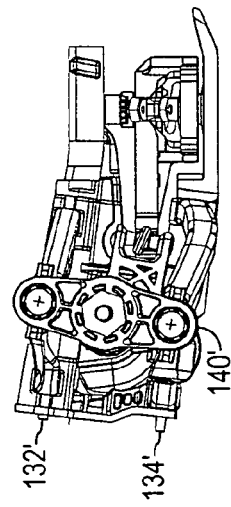
Figure 29C:
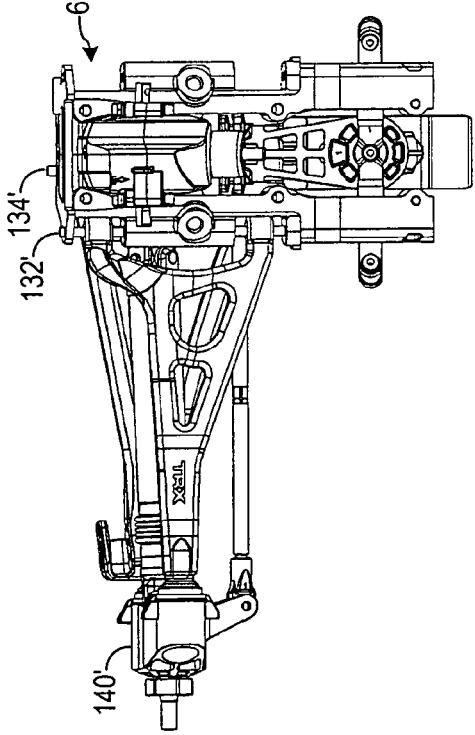
Figure 29A:
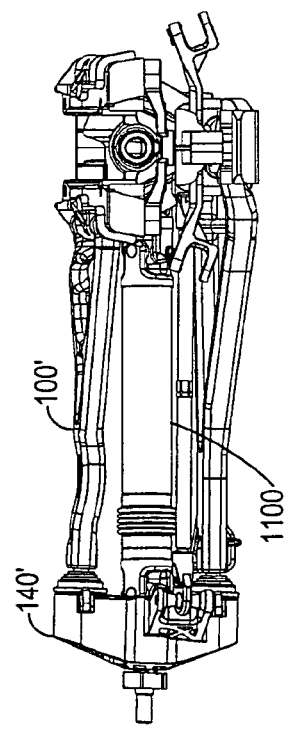
Figure 31A:
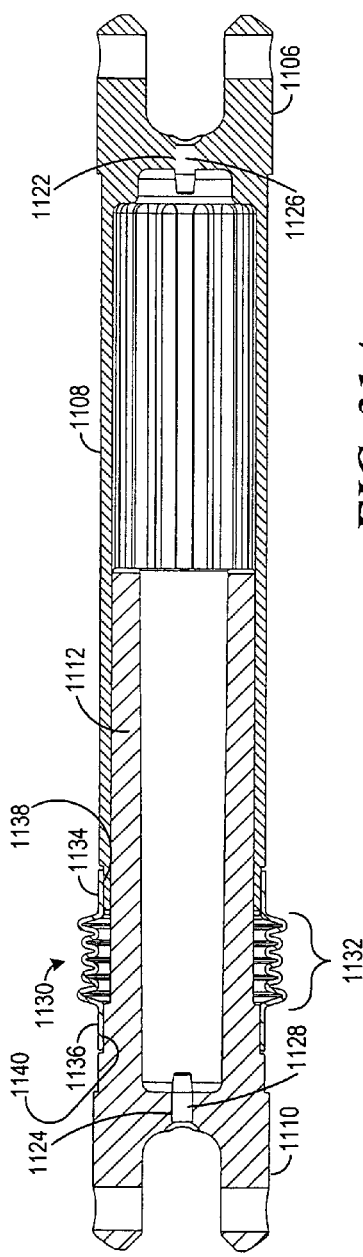
FIGS. 31A and B are section and perspective section views, taken along the section lines 31-31 of FIG. 30A, of the telescoping drive shaft.

As can be seen in FIG. 27 and FIG. 28, in one embodiment, the brake pad support calipers 1004 and 1010 each support a brake pad of friction material 1002 and 1008 on first inner faces 1005 and 1009, respectively, to which the friction material 1002 and 1008 is disposed. In one embodiment, the calipers 1004 and 1010 can each be a single piece of cast aluminum.

In one embodiment, the inboard caliper 1010 has a cam receiving post or follower 1016 extending from its outside face 1045. The post 1016 has a cam receiving surface for receiving compressive force from an actuating cam 1025.

The actuating cam 1025 can take a variety of forms. In one embodiment, the cam 1025 is the flat surface 1027 of a half-shaft portion of a cam shaft 1023. The cam shaft 1023 is retained in base 1032 for pivoting about the axis of cam shaft 1023. In one embodiment, base 1032 is the transmission housing, which is secured to chassis 300. The cam shaft is pivoted by means of a force applied to yoke 1021, which is secured to one of the ends of cam shaft 1023.

As the cam shaft is pivoted, one side of the flat surface 1027 will compressively press against the cam receiving surface of post 1016. This will, in turn, displace the inboard caliper 1010 and the friction material 1008 on it toward the disk 1006.

The brake calipers 1004 and 1010 can further include a plurality of fastening points 1024, 1026 and 1028 and 1030 at which the respective caliper is secured directly or indirectly to the chassis 300 of a model vehicle. As can be seen in FIGS. 25A-D, for example, the fastening points 1024 and 1026 for the outboard caliper 1004 are where the caliper is attached to the base 1032 by means of screws through screw holes 1051 and 1053. In the case of the inboard caliper 1010, the caliper has securing holes 1028 and 1020 at each of its ends, which can slide over the shafts 1038 and 1040 of securing screws 1034 and 1036. However, the caliper 1020 is not fixedly secured to the shaft portion of the screws, but instead is axially free to slide along the shafts of the screws so that the friction material disposed on the caliper can be pressed against the disk 1006 during brake actuation.

As indicated above, the disk 1006 is free to slide axially to some degree along the axis of drive shaft 1012. Thus, as the inboard caliper 1010 and its friction material 1008 are forced toward the disk 1006, the disk will be free to slide towards the friction material 1002 on the outboard caliper 1004, which is fixed in place by means of the heads of the screws 1034 and 1026 securing it to base 1032. Thus, when the brake is actuated by the cam, the axially slidable disk 1006 will be "sandwiched" in between the movable inboard caliper 1010 and the fixed outboard caliper 1004, effectively applying braking force to stop rotation of the disk. This will stop rotation of the drive shaft 1012 which will also cause stopping of the rotation of all the wheels (not shown) connected to the drive shaft.

As can be seen in FIGS. 25A through D, 26A and B, 27 and FIG. 28, one or more ribs 1042 and 1007 extend outwardly across substantially the entire length of the outer surface of the caliper 1004. The term "inner", when referring to either caliper 1004, 1010, means the surface in contact with the friction material. "Outer" means the other surface of the caliper plate 1004, 1010. Ribs 1007 extend substantially parallel to the circumference of an axle of shaft 1012 to be braked, while ribs 1042 extend substantially tangentially to the circumference of the axle or shaft 1012. The ribs 1042 act to stiffen the caliper 1004 to distribute compressive forces applied to the outside face at one or more locations on the caliper, as well as to provide cooling. As can be seen best in FIG. 25C, one or more of the ribs 1042 can be tapered in height as the rib approaches one of the plurality of plate fastening points 1034, 1036. Thus, the ribs 1042 are the highest at the middle of the span, where the bending moment would be the highest. Furthermore, the one or more ribs 1042 extend across at least a portion of the outer faces of the calipers in substantial alignment with an imaginary line drawn through the center point of each of the plurality of fastening points 1034 and 1036. The plurality of ribs 1007 extend across at least a portion of the outer surface of the calipers 1004 and 1010, which can facilitate cooling of the calipers, as well as providing stiffening reinforcement. The ribs 1007 can each extend from the nearest rib 1042 on the outer surface of caliper 1004 to curve circumferentially about the axis of drive shaft 1012 toward an edge of caliper 1004, thus providing additional stiffness in the direction of applied frictional force, in addition to providing cooling.

In order to retain the friction material 1002 and 1008 in position on the respective calipers, the calipers can include one or more brake pad bosses 1048 extending from the inner face of the caliper for engaging at least a portion of the perimeter of a pad of friction material 1002 or 1008 supported on the inner face of the caliper, to resist lateral movement of a brake pad 1002 or 1008 across the inner surface of the respective caliper. The bosses 1048 have space between them so that an operator can visually determine the degree of wear of friction material without the need for disassembly. The brake pad bosses 1048 can be sufficient alone to retain the friction material in position on the caliper without the need for reliance on other means for fastening the friction material to the caliper. However, if desired, the friction material can also be secured to the caliper by adhesive, screws, rivets or other convenient means Co-pending U.S. Patent Application of Brent W. Byers entitled "A Model Vehicle Suspension Control Link" (Docket No. TRAX 3175000), filed concurrently herewith, is hereby incorporated by reference for all purposes. Components depicted in this application having substantially similar construction and function to those shown in the co-pending application hereby incorporated by reference are identified with the same reference numeral, followed by a prime (') designation (e.g., 100'). For example, various components employed in the construction and operation of the rear suspension arm assembly 100 in the co-pending application are substantially similar in construction and operation to the components employed in the front suspension arm assembly 100' shown in FIGS. 29A through D.

Figure 33D:
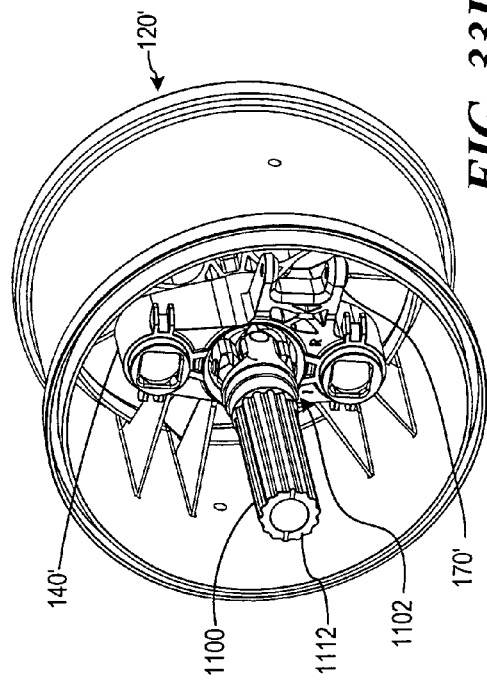
FIGS. 33A through D are rear elevation, side, top and perspective views illustrating coupling of the drive shaft to an axle assembly supporting a wheel of the vehicle.
Figure 33B:
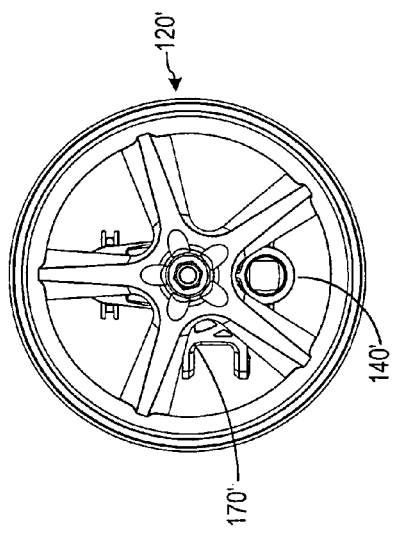
Figure 33C:
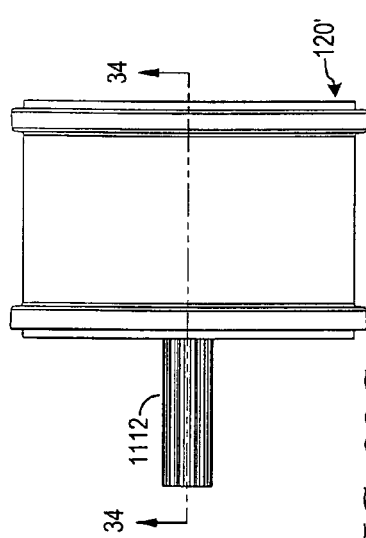
Figure 33A:
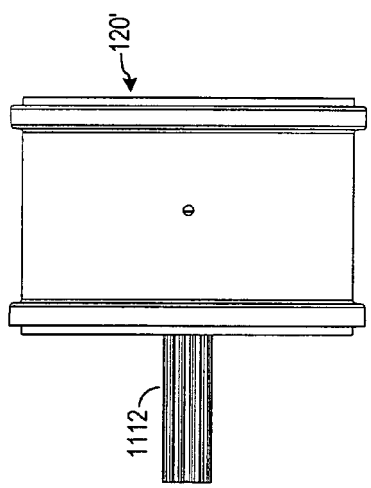
Figure 34:
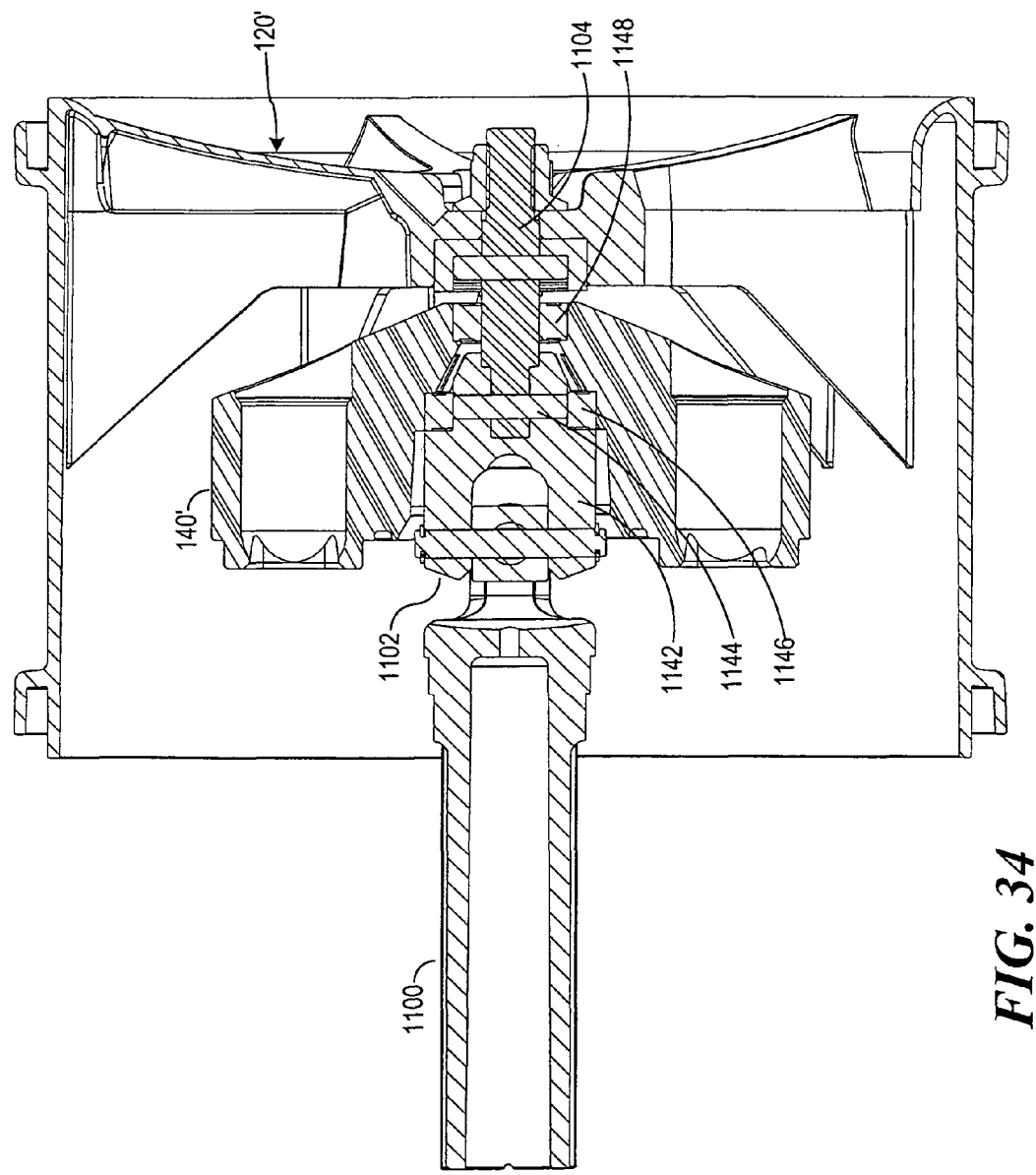
FIG. 34 is a section view, taken along the section lines 34-34 of FIG. 33C, illustrating coupling of the drive shaft to an axle assembly supporting a wheel of the vehicle.
Figure 35:
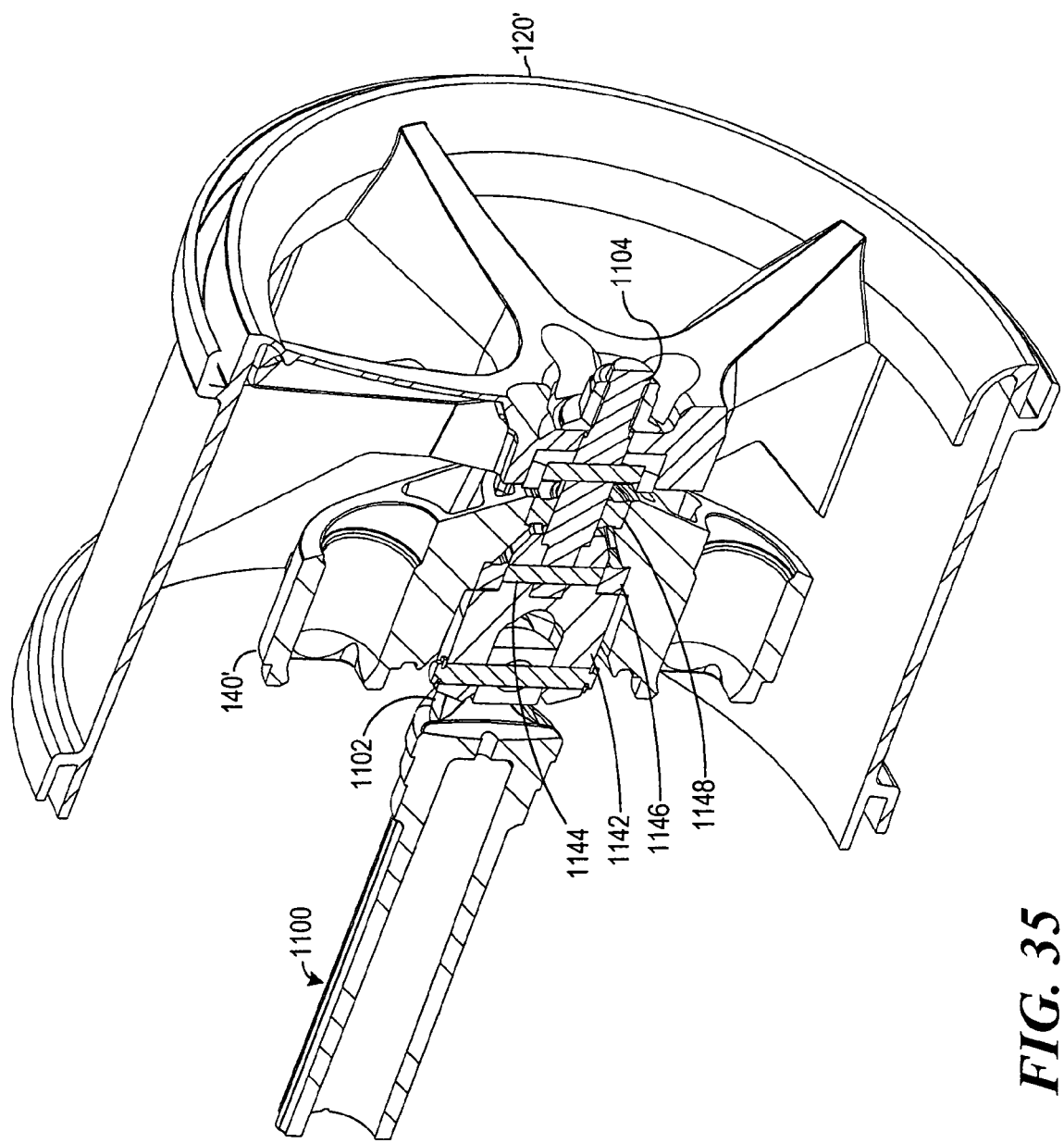
FIG. 35 is a perspective section view, taken along the section lines 35-35 of FIG. 33C, illustrating coupling of the drive shaft to an axle assembly supporting a wheel of the vehicle.

Referring now to FIGS. 29A through D, shown is a front bulkhead assembly 658, from which laterally extends a suspension arm assembly 100' and a telescoping drive shaft 1100. The telescoping drive shaft 1100 extends and retracts with upward and downward movement of the suspension arm assembly 100'. The drive shaft 1100 is secured by a Cardan joint 1102 (sometimes referred to as a "universal joint") to a transmission differential assembly shown in FIGS. 29A-D mounted in a fixed position on the front bulkhead assembly 658. The outboard end of the drive shaft 1100 is secured by a Cardan joint 1102 to an axle assembly 1104 (shown in one or more of FIGS. 33D, 34 and 35) mounted for rotation within an axle carrier 140'. The axle carrier 140' is supported on the outboard end of the suspension arm assembly 100'. Extension and retraction of the telescoping drive shaft 1100 accommodates a different pivotal path followed by the axle carrier 140' as the suspension arm assembly 100' moves between uppermost and lowermost positions.

Referring now to FIGS. 30A through D, 31A and B, and 32A and B, the telescoping drive shaft 1100 is shown in greater detail. The drive shaft 1100 comprises an inboard yoke 1106 for securing a tubular external segment 1108 to the front transmission differential of the vehicle. An outboard yoke 1110 forms the outboard end of the drive shaft 1100 for securing a tubular internal segment 1112 to the Cardan joint 1102 coupling of the drive shaft 1100 to the axle assembly 1104. The inboard and outboard yokes 1106, 1110 are integrally formed with the remainder of the external and internal segments 1108, 1112, respectively, in a single-piece construction.

Figure 32A:
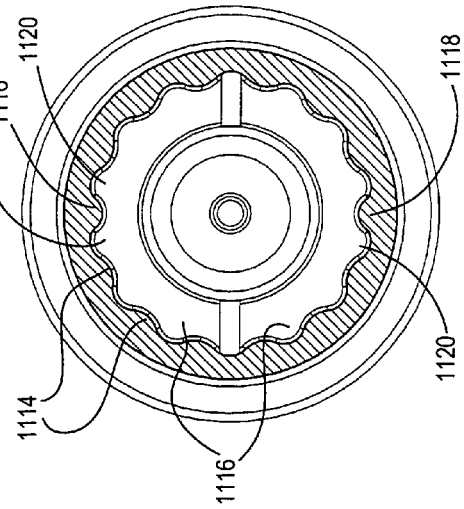
FIGS. 32A and B are section and perspective section views, taken along the section lines 32-32 of FIG. 30A, of the telescoping drive shaft.

As is best shown in FIGS. 32A and 32B, curved splines 1114, 1116 extend from the internal and external surfaces, respectively, of the external segment 1108 and the internal segment 1112 of the drive shaft 1100. The splines 1114, 1116 extend at least along the lengths of the external and internal segments 1108, 1112 that will overlap when the suspension arm assembly 100' travels between the uppermost and lowermost positions. The splines 1114, 1116 are aligned with the longitudinal axis of the shaft segments 1108, 1112, respectively, in a parallel formation. In the embodiment shown, the splines 1114 extend along substantially the entire length of the inner wall of the external segment 1108. The curved surfaces of the splines 1114, 1116 are complementary, each mating with a corresponding groove formed between adjacent splines of the external and internal segments 1108, 1112, respectively. The splines 1114, 1116 vary in radius of curvature at approximately 1800 intervals about the rotational axis of the drive shaft 1100. In the embodiment shown, for example, indexing splines 1118 of the external segment 1108 and indexing splines 1120 of the internal segment 1112 have a smaller radius of curvature relative to other of the splines 1114, 1116. The radius of curvature of the corresponding grooves with which the indexing splines 1118, 1120 mate, have a similarly smaller radius of curvature. This indexes the external and internal segments 1108, 1112 when mated, to assure alignment of the yokes 1106, 1110 in substantially the same rotational position.

The curved splines 1114, 1116 transfer torque between the yokes 1106, 1110, while allowing the segments 1108, 1112 of the drive shaft 1100 to slide with respect to each other, in telescopic fashion. The curved surfaces of the splines 1114, 1116 allow more splines to be formed than if rectangular splines were used. The curved surfaces and number of the splines 1114, 1116 and corresponding grooves reduce or eliminate stress concentrations experienced by telescopic drive shafts employing rectangular splines. Stress reduction and accommodation of a greater number of splines 1114, 1116 is provided by a relatively larger than typical diameter employed by the drive shaft 1100. These attributes also allow the walls of the internal and external segments 1108, 1112 to be thinner and lighter in weight.

The segments 1108, 1112 of the drive shaft 1100 are preferably manufactured from a low-friction, high impact strength plastic, or other similar material. In the embodiment shown, the segments 1108, 1112 are made from a suitable Nylon material. The low-friction attributes of these materials substantially eliminates the need to lubricate the surfaces of the segments 1108, 1112.

The drive shaft 1100 is sealed to prevent dust, dirt, debris and the like from entering and causing abrasion of and friction between the surfaces of the segments 1108, 1112, which would reduce performance and longevity. The ends of the drive shaft 1100 next to the yokes 1106, 1110 each include respective apertures 1122, 1124 that are sealed by elastomeric plugs 1126, 1128 secured by a compression fit. The seam between the surfaces of the external and internal segments 1108, 1112 is sealed by a bellows seal 1130.

The bellows seal 1130 includes a substantially cylindrical central portion 1132, having laterally extending folds, allowing both expansion and retraction of the bellows seal 1130 with expansion and contraction of the drive shaft 1100. Extending from the inboard and outboard ends, respectively, of the bellows seal 1130 are substantially cylindrical, smooth sealing collars 1134, 1136. The sealing collars 1134, 1136, respectively, fit snugly over substantially cylindrical, smooth landing surfaces 1138, 1140 formed on the external surfaces of the segments 1108, 1112. A seal is formed between the sealing collars 1134, 1136 and the landing surfaces 1138, 1140, by a compression seal. In addition, the sealing collars 1134, 1136 are secured to the landing surfaces 1138, 1140, by a suitable glue or adhesive. The bellows seal 1130 is preferably made from a suitable rubber compound, such as nitrile rubber, and the like.

FIGS. 33A through D, 34 and 35 illustrate coupling of the drive shaft 1100 via the Cardan joint 1102 to a drive axle assembly 1104 for driving a wheel 120' on the front end of the vehicle. The Cardan joint 1102 comprises the outboard yoke 1110 of the drive shaft 1100 coupled to a drive axle yoke 1142. The drive axle assembly 1104 is supported by the axle carrier assembly 140' for rotation. A drive pin 1144 couples the drive axle yoke 1142 to the drive axle assembly 1104 to transfer torque from the drive shaft 1100 to the wheel 120'. The drive axle yoke 1142 is supported for rotation within the axle carrier 140' by an internally mounted radial ball bearing assembly 1146. Supporting the drive axle assembly 1104 for rotation is a ball bearing assembly 1148 mounted in the axle carrier 140' adjacent the wheel 120'.

In addition to transferring torque from the yoke 1142 to the axle assembly 1104, the drive pin 1144 secures the yoke 1142 to the axle assembly 1104. The drive pin 1144 comprises a substantially smooth, cylindrical pin extending through an aperture extending diametrically through the outboard shank of the drive axle yoke 1142 and an aligned aperture extending diametrically through a portion of the axle assembly 1104 inserted into the shank. The interior surfaces of the apertures of the shank of the drive axle yoke 1142 and the axle assembly 1104 are preferably smooth and provide sufficient clearance to allow the drive pin 1144 to be inserted and removed without difficulty.

Figure 36:
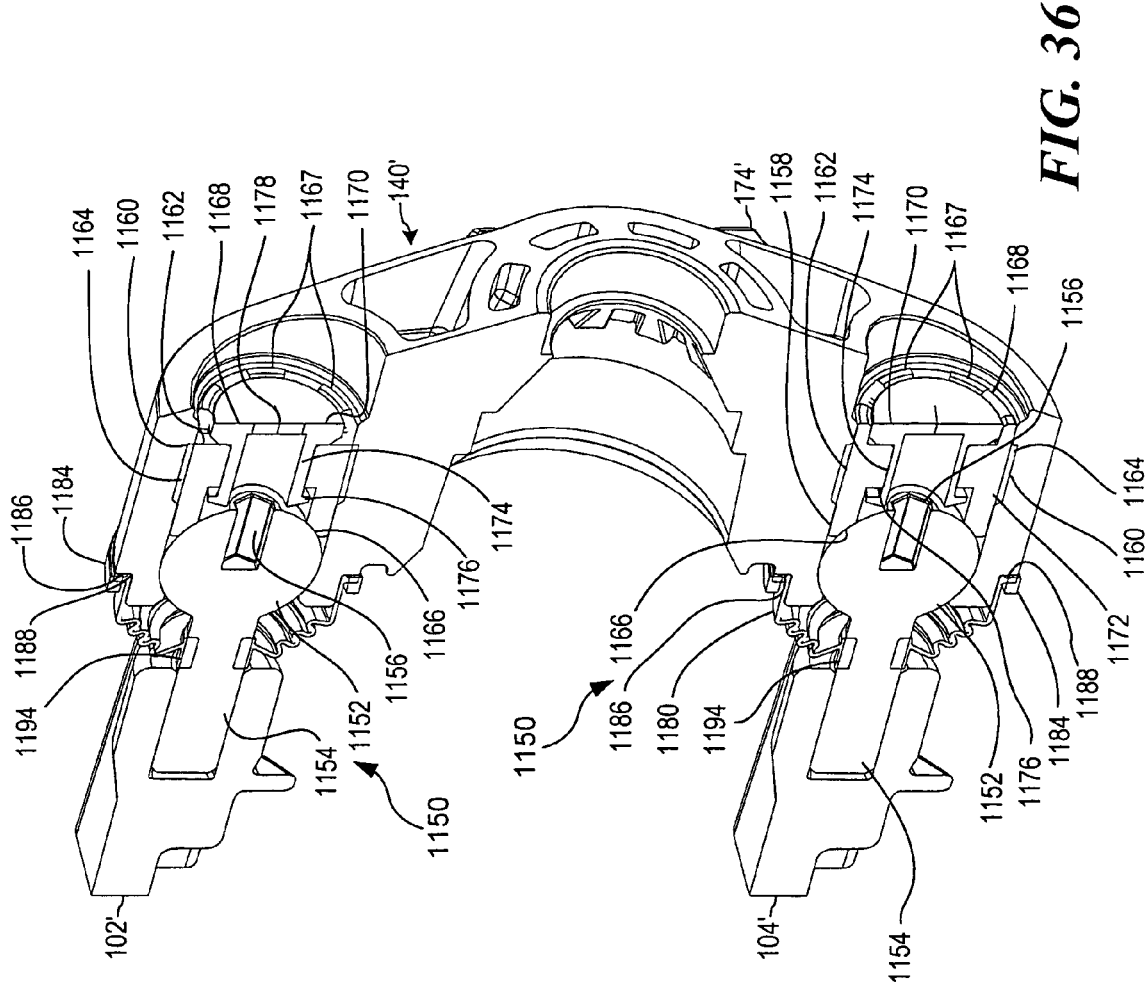
FIG. 36 is a section view substantially bisecting the ball joint and axle carrier assemblies of the vehicle.
Figure 37:
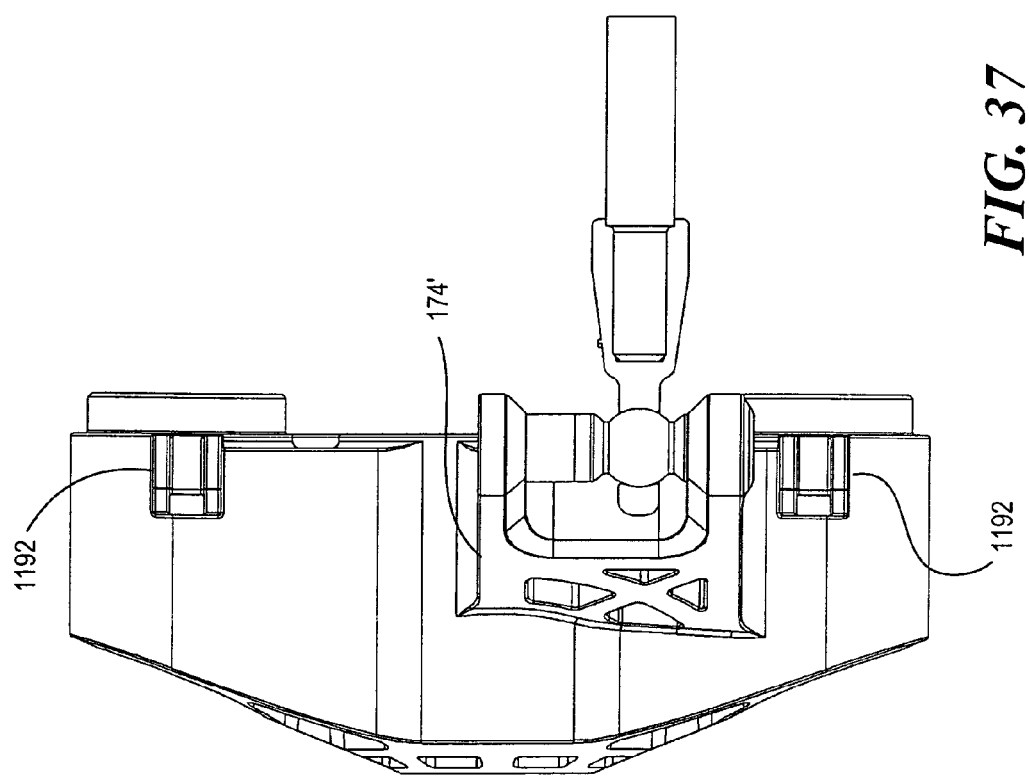
FIG. 37 is a side view of the axle carrier shown in FIG. 36.
Figure 38:
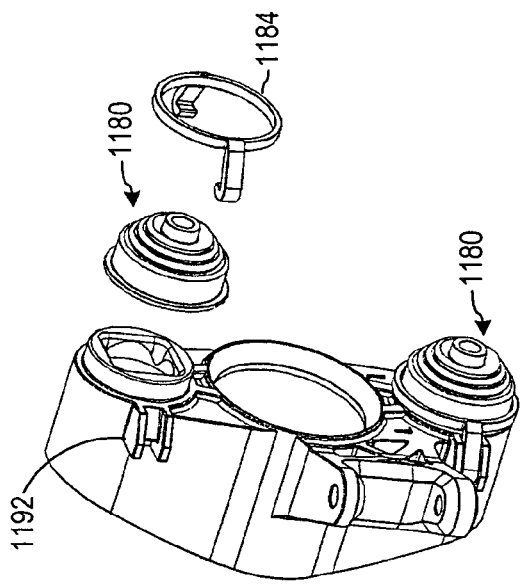
FIG. 38 is a perspective exploded view of the axle carrier showing a sealing boot secured to the carrier.
Figure 39B:
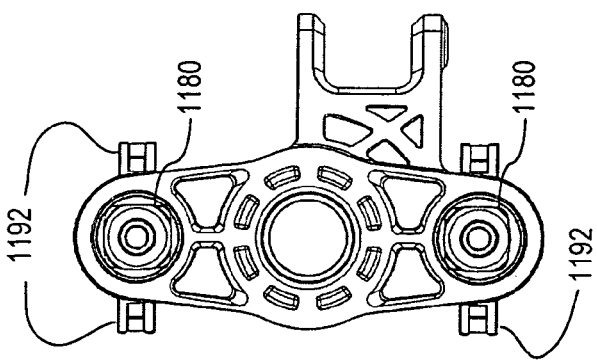
FIGS. 39A through C are front elevation, side and top views of the axle carrier shown in FIG. 38.
Figure 39C:
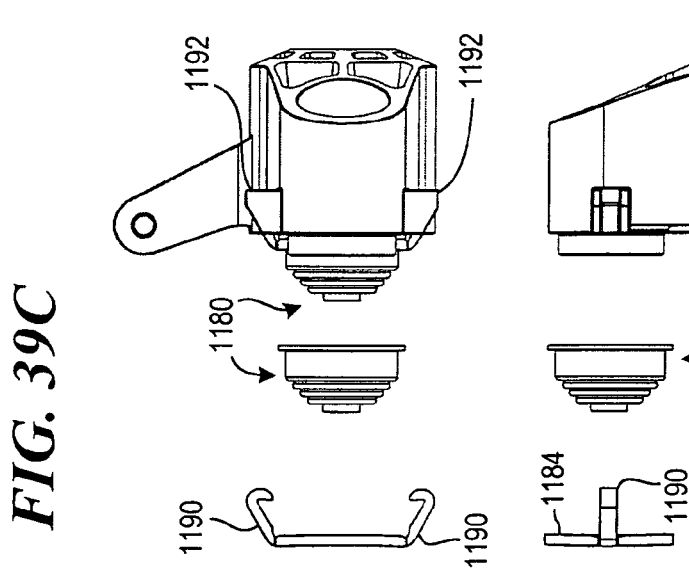
Figure 39A:
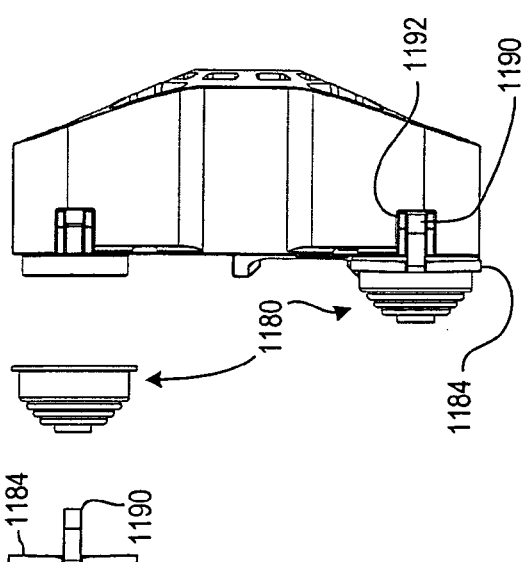
Figure 40A:
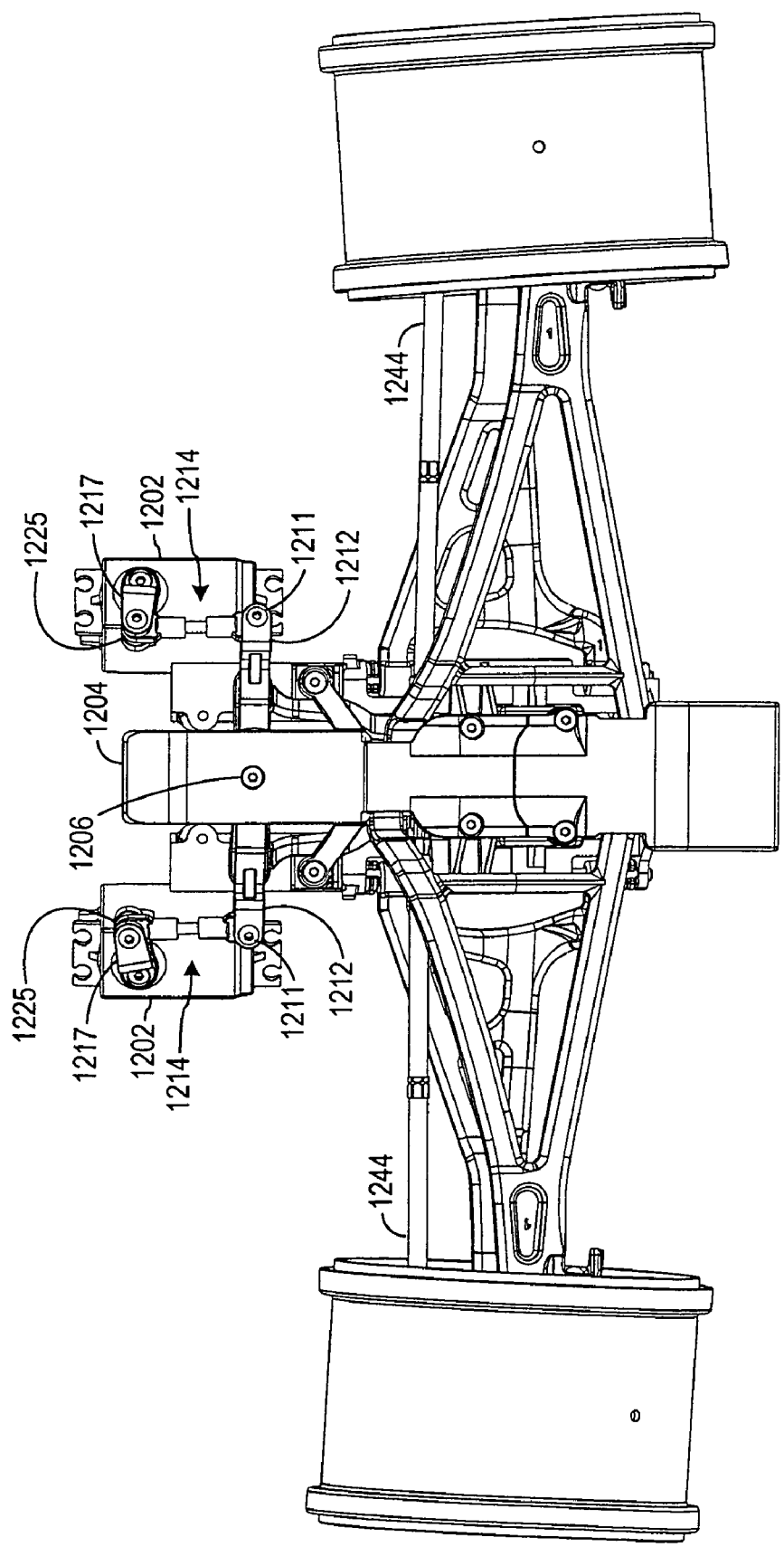
FIG. 40A is view of the front portion of the vehicle, with the chassis removed for clarity, showing the dual servos and center dual arm steering arm, viewed from underneath.
Figure 40B:
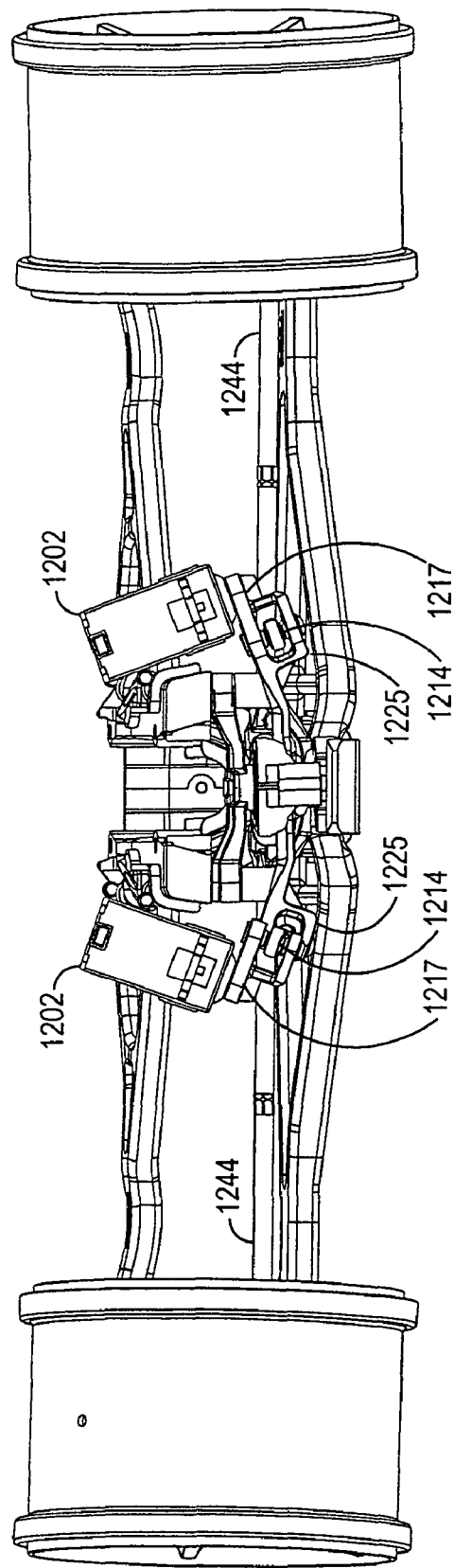
FIG. 40B is view of the front portion of the vehicle, with the chassis removed for clarity, showing the dual servos and center dual arm steering arm, viewed from the front end of the vehicle.
Figure 40C:
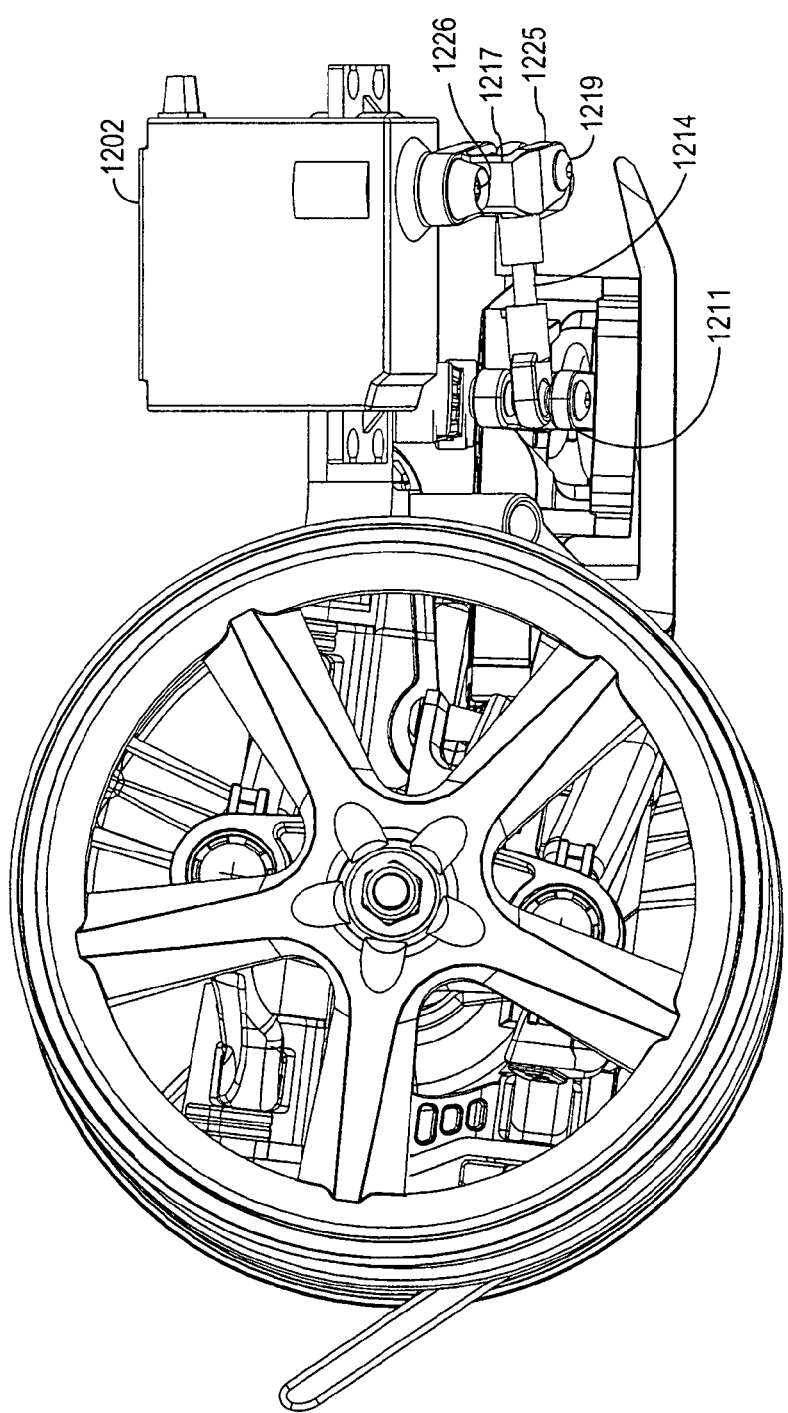
FIG. 40C is view of the front portion of the vehicle, with the chassis removed for clarity, showing the left side front wheel and left side servo and the center dual arm steering arm, viewed from the left side of the vehicle.
Figure 40D:
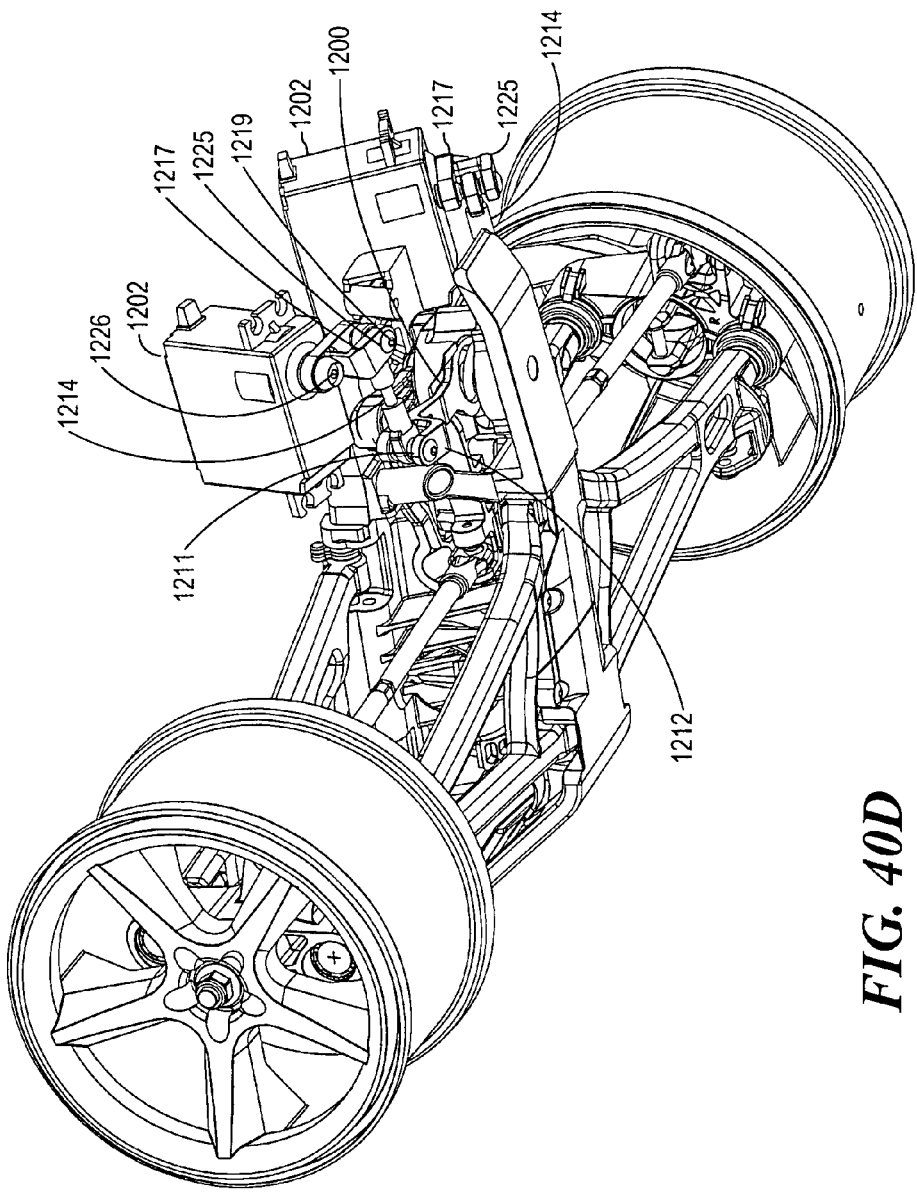
FIG. 40D is a perspective view of the front portion of the vehicle, with the chassis removed for clarity, showing the dual servos and center dual arm steering arm, viewed from underneath the left side of the vehicle.
Figure 41A:
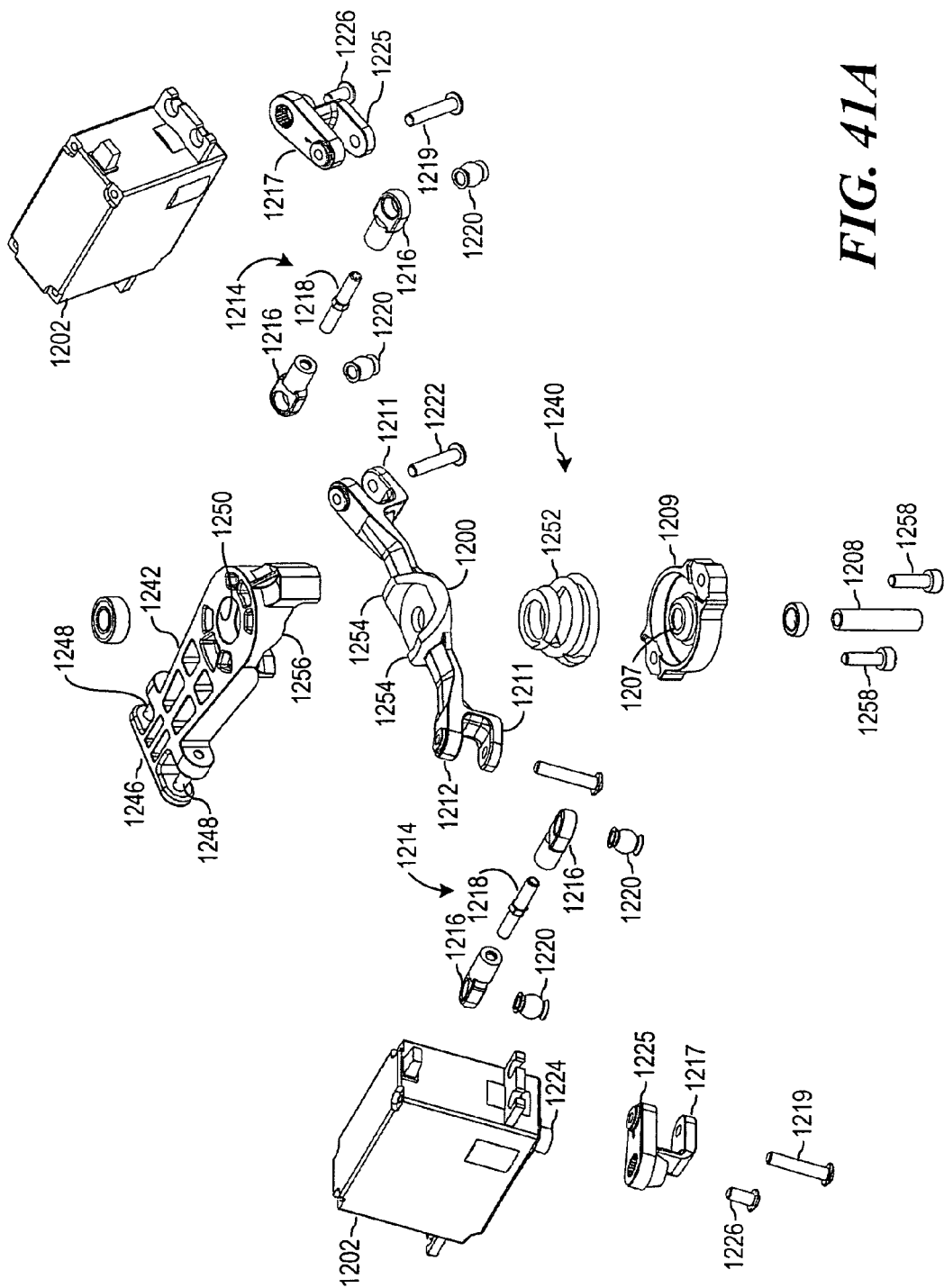
FIG. 41A is an exploded perspective view of the components of the dual servos and center dual arm steering arm assembly, as viewed from above the vehicle.
Figure 41B:
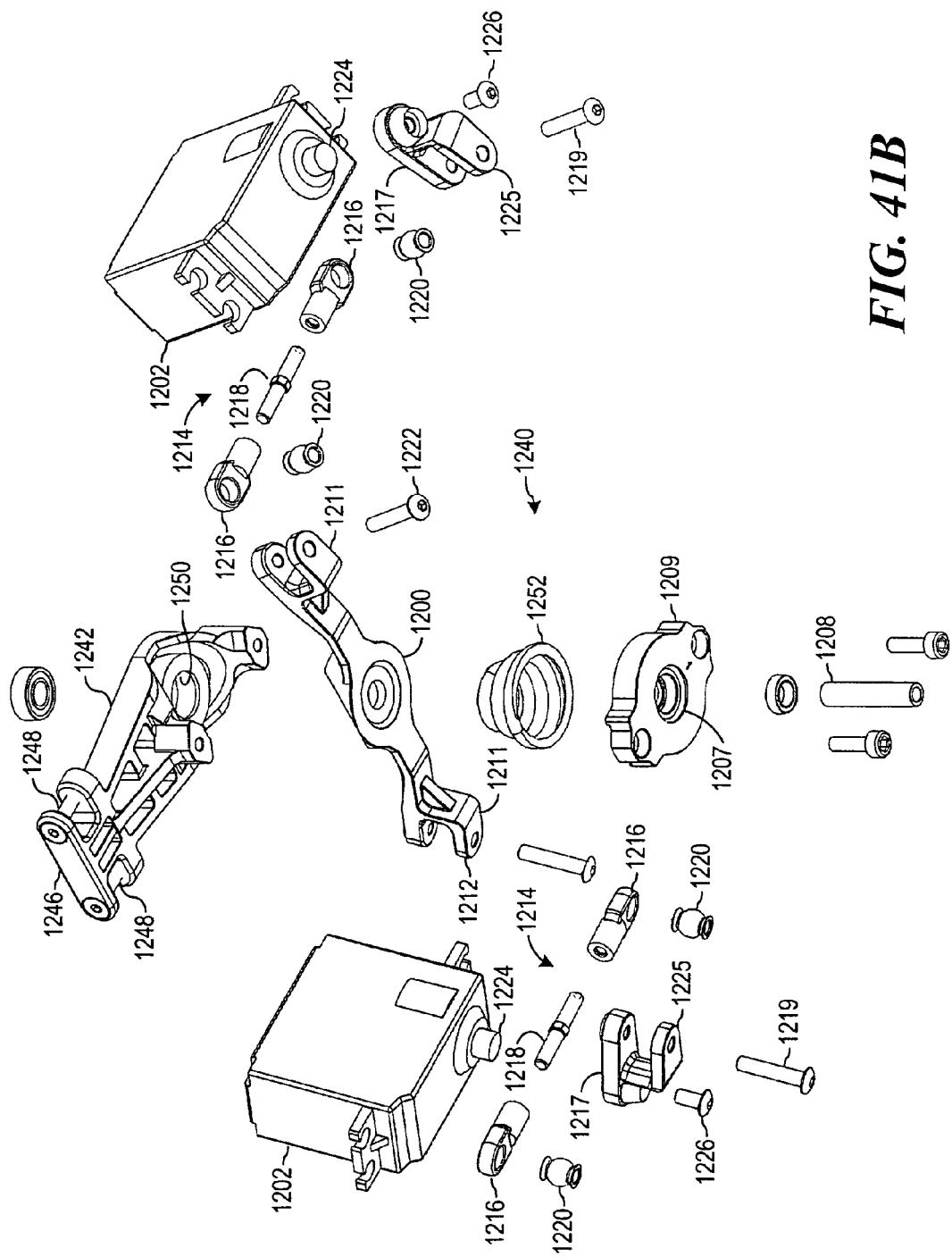
FIG. 41B is an exploded perspective view of the components of the dual servos and center dual arm steering arm assembly, as viewed from below the vehicle.
Figure 42:
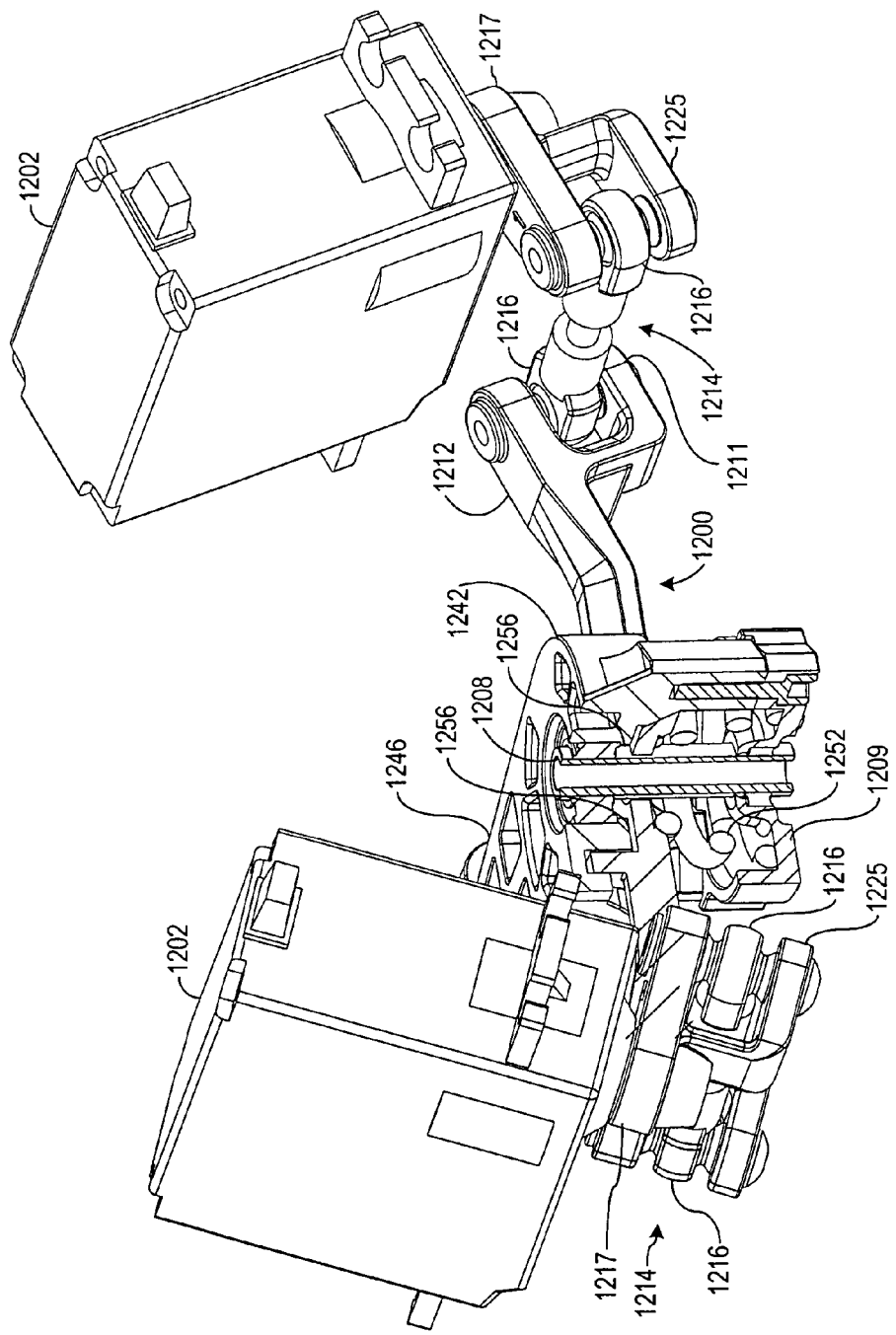
FIG. 42 is a perspective view of the dual servos and center dual arm steering arm assembly, with the other components of the front end of the vehicle removed for clarity, viewed from the rear left side of the vehicle.
Figure 44:
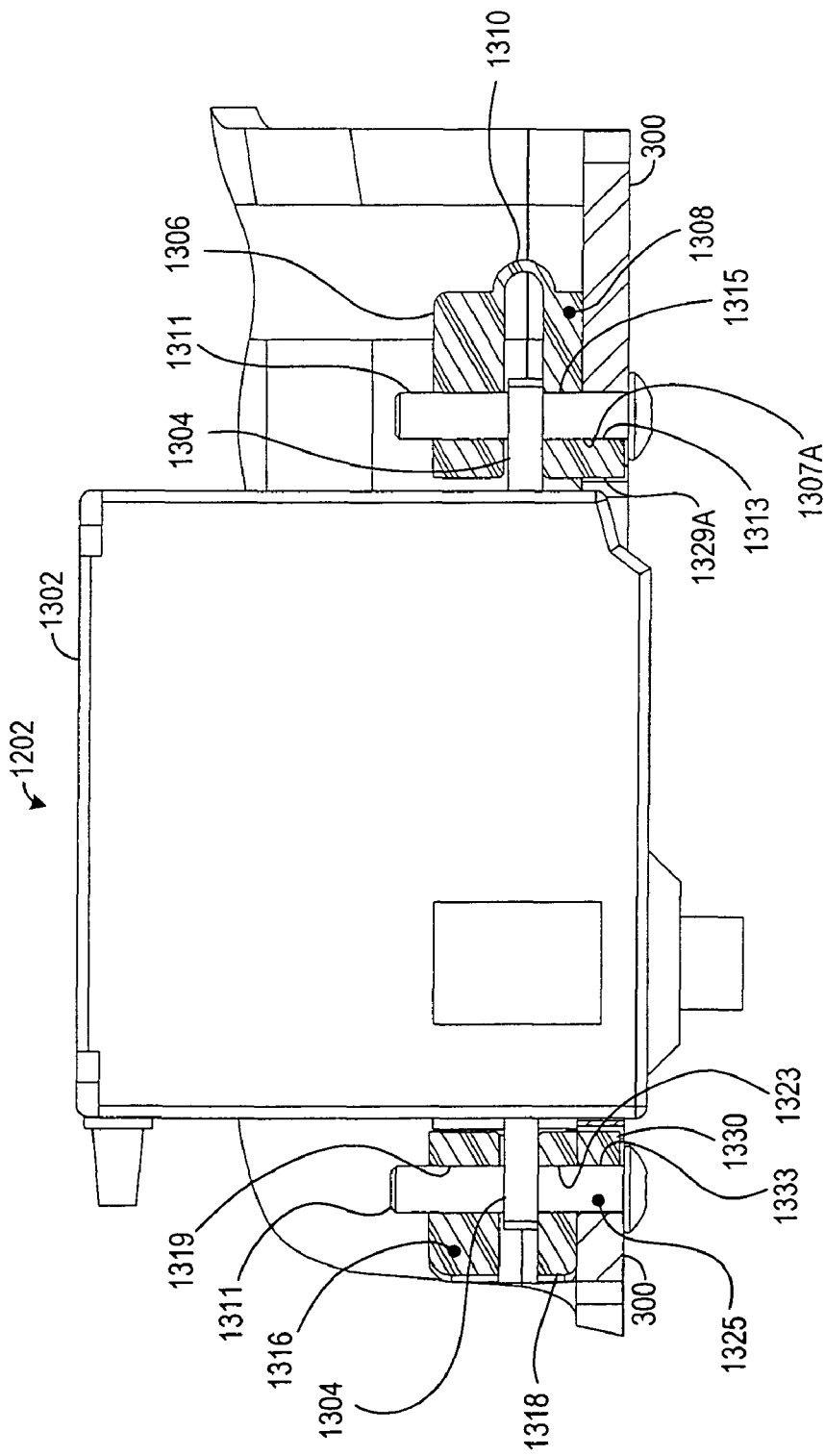
FIG. 44 is a sectional view of the mounted steering servo of FIG. 42A, taken along the line 41A-41A.
Figure 45:
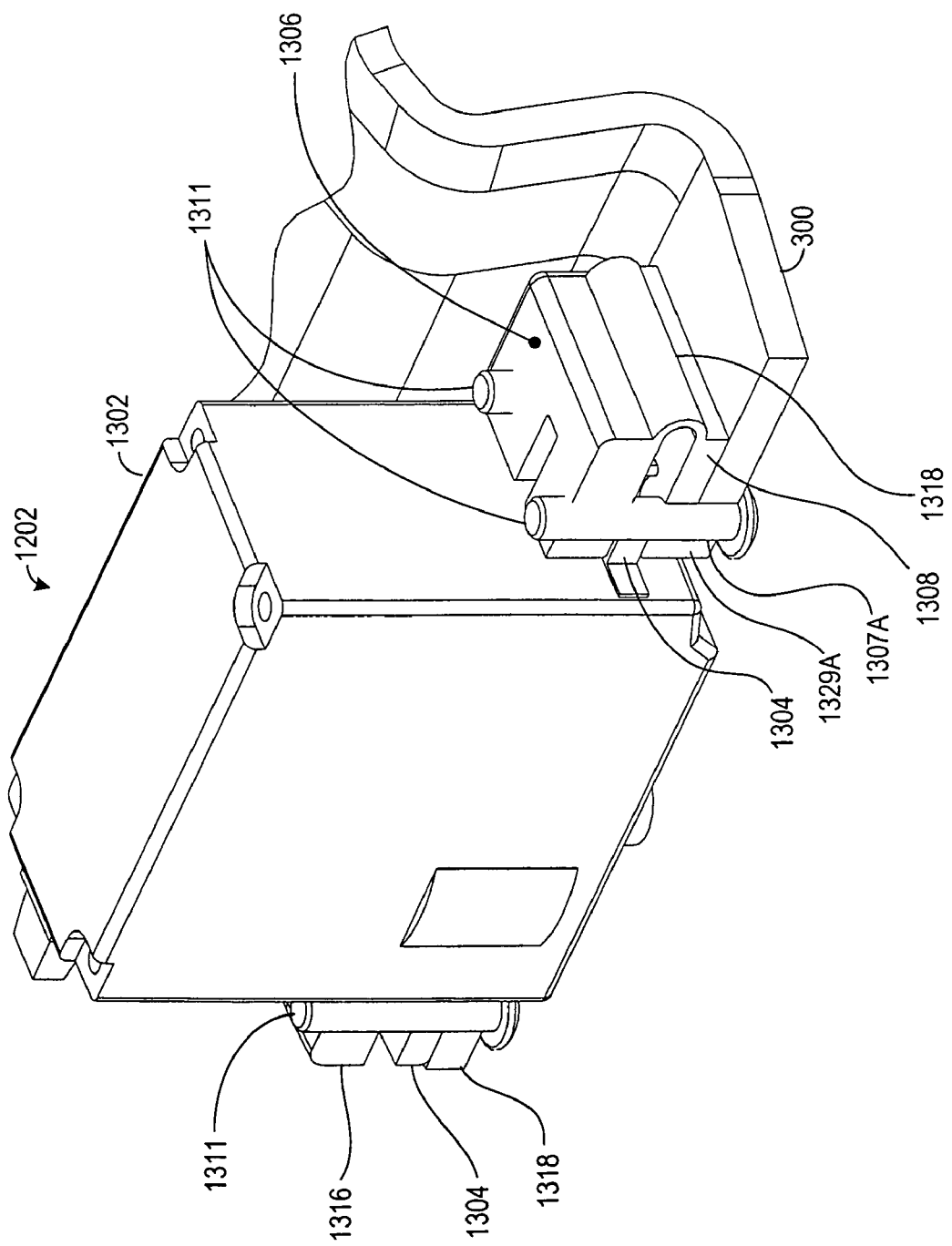
FIG. 45 is a perspective view of a steering servo mounted on the right side of the chassis, and shows a front one of the mounting brackets.
Figure 46:
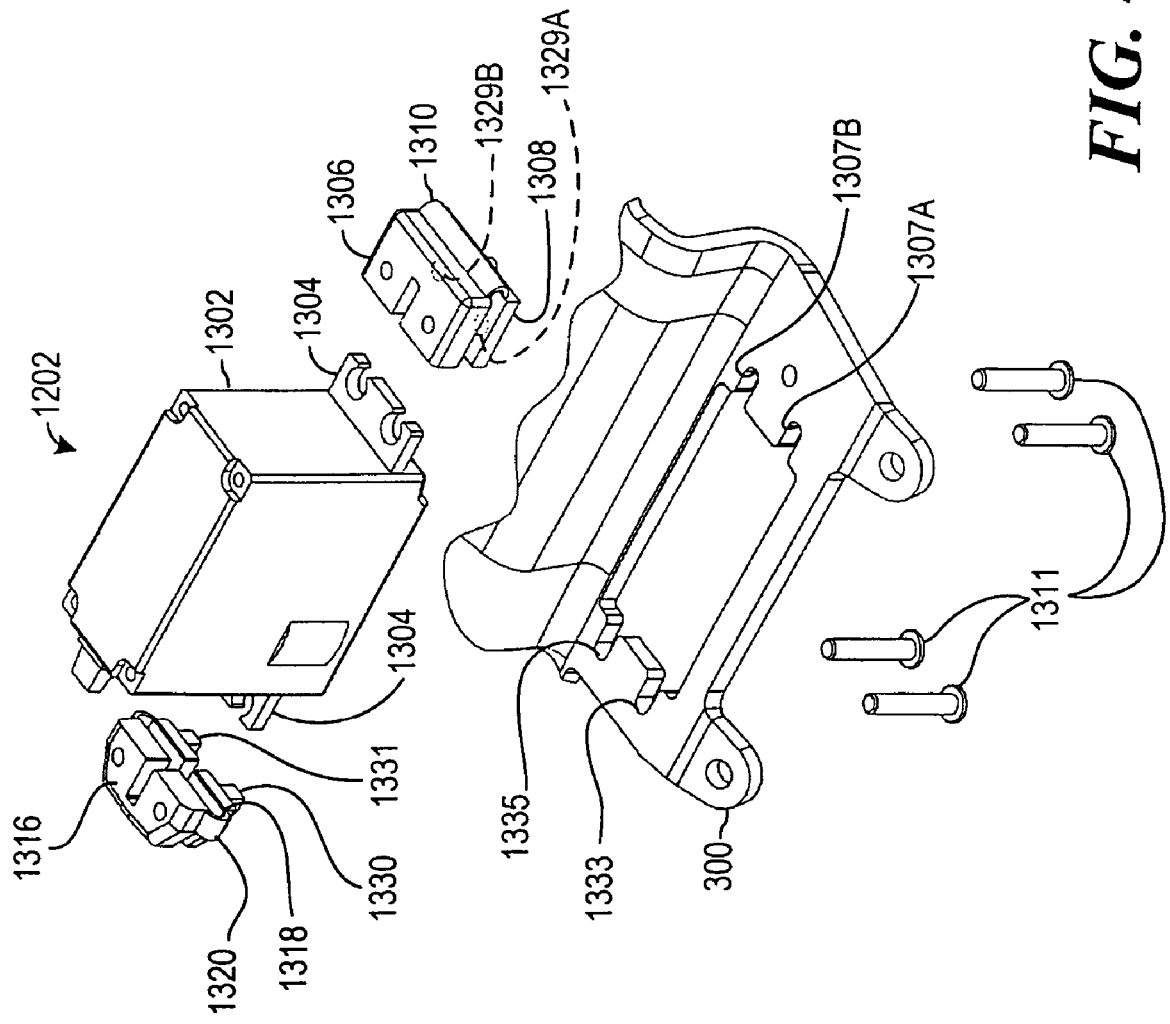
FIG. 46 is an exploded perspective view of a steering servo, front and rear mounting brackets, and the portion of the chassis to which the steering servo is mounted.

The ball bearing assembly 1146 serves the dual purpose of supporting the drive axle yoke 1142 shank for rotation and securing the drive pin 1144 within the shank. This configuration allows replacement of the drive axle yoke 1142, for example, if damaged, without the need to replace the drive axle assembly 1104 as well. Various manufacturing steps and associated costs are also reduced or eliminated FIG. 36 illustrates substantially identical ball joint assemblies 1150 pivotally supporting the axle carrier 140' on the outboard ends of the upper and lower suspension arms 102', 104'. In FIGS. 36 and 37, the yoke 1142, axle assembly 1104 and related components have been removed. The ball joint assemblies 1150 allow universal movement of the axle carrier 140' relative to the suspension arms 102', 104' to allow steering, wheel alignment and suspension travel.

The ball joint assemblies 1150 each include a substantially spherical ball 1152 having a threaded shank 1154 securing each of the balls 1152 to one of the suspension arms 102', 104'. Formed into each of the balls 1152 is a socket 1156, preferably hexagonal, substantially aligned with the central axis of the threaded shank 1154. The socket is used to secure the shanks 1154 to the suspension arms 102', 104' and to adjust the distance between the balls 1152 and the suspension arms 102', 104'. Adjustment of the balls 1152, in turn, allows adjustment of the camber of a wheel supported by the suspension arms 102', 104', in particular. Removal of the balls 1152 from their respective suspension arms 102', 104' facilitates maintenance and replacement of parts.

An inboard portion of each of the balls 1152 slides into a correspondingly shaped inboard end of a ball housing 1158. Each ball housing 1158 is generally cylindrical and extends from the outboard surface of the axle carrier 140', beginning with a diameter large enough to accommodate insertion of the ball 1152 and forming a substantially a spherical surface ending in an inboard aperture through which the ball shank 1154 extends. Formed in the surfaces of each housing 1158 are threads 1160 for receiving and securing a pivot ball cap 1162 for retaining each ball 1152 within the respective housing 1158.

Each pivot ball cap 1162 is generally tubular, having external threads 1164 mating with housing threads 1160 and an inboard bearing surface 1166 for securing a ball 1152 within the respective housing 1158. The bearing surface 1166 is formed about the open, inboard end of each cap 1162 and is substantially flush with the spherical surface of the associated ball 1152. The pivot ball caps 1162 are tightened to just take up excess clearance with the balls 1152, the threads have a mild interference fit with the housing threads 1160 to prevent loosening of the caps 1162. Removal of the caps 1162 allows the balls 1152 to be removed from the housings 1158 for maintenance, repair and replacement. Extending from the perimeter of the outboard end of each of the caps 1162 are a number of fingers 1167, forming a castle gear that is used to thread and unthread each of the caps 1162. It will be apparent that the number of fingers 1167 and their configuration may be varied, as desired.

Seated in each cap 1162 is a self-healing cap seal 1168 to prevent dust, debris, dirt and other contaminants from entering the housings 1158. Each cap seal 1168 includes a head portion 1170 having a radial lip extending to the fingers 1167 of the cap 1162. The head portions 1170 rest on and form a seal against the throat portions 1172 of the caps 1162 extending inwardly and inboard of the fingers 1167, forming a landing for the head portions 1170. Extending from the head portion 1170 of each cap seal 1168 is a neck 1174 extending through and contacting the surfaces of the cap throat portion 1172, forming a further seal. Each cap seal 1168 includes a retaining lip 1176 extending radially from the neck 1174 to assist in retaining the seal within the respective cap 1162. The cap seals 1168 are preferably manufactured from a pliable nitrile rubber that can be deformed, but will elastically return to the original shape.

Formed in the head portion 1170 of each cap seal 1168 is a self-healing aperture 1178. The self-healing aperture 1178 is preferably formed by a pair of slits cut through the head portion 1170 intersecting at substantially 90°. The slits normally abut to maintain a seal. However, a hexagonal wrench, lubricating nozzle or other tool can be inserted through the self-healing aperture 1178, parting the lips of the slits, to adjust, remove, maintain or lubricate the associated ball 1152. When the tool is removed, the self-healing aperture 1178 elastically returns to the original, sealed position.

The inboard end of each housing 1158 is sealed by an elastic boot 1180 that extends between the shank 1154 of each ball 1152 and a landing 1182 formed on the axle carrier 140' about the inboard aperture of the ball joint housing 1158. Each boot 1180 is generally conical in shape, extending from a wider opening adjacent the axle carrier 140', to a smaller opening that surrounds the associated shank 1154. Each boot is preferably manufactured from a material similar to that of the cap seals 1168. The walls of each boot preferably form a number of folds, allowing the boot 1180 to flex easily with movement of the axle carrier 140', and without tearing or binding.

Referring now to FIGS. 37, 38 and 39A through C, each boot 1180 is secured to the landing 1182 by a ring 1184 which fits over and compresses a cylindrical portion of the boot 1180 into sealing engagement with the landing 1182. A lip 1186 extends radially from the cylindrical portion of the boot 1180 and is compressed against a shoulder 1188 formed on the surface of the axle carrier 140'. Each ring 1184 is held in this position by a pair of clips 1190 extending substantially perpendicularly from and on diametrically opposed points on the ring. The clips 1190 are pressed over a pair of clip receptacles 1192 positioned on opposite sides of the associated ball housing 1158. The rings 1184 and clips 1190 are preferably manufactured from a strong, impact-resistant plastic.

The inboard ends of the boots 1180 are each secured to the associated shanks 1150 by an elastic collar 1194 integrally formed at the narrower opening of each of the boots 1180. The elastic collars 1194 are substantially thicker than the walls of their respective boots 1180 and form a compression seal against the underlying surface of the associated shank 1154. Each collar 1194 is retained by an annular insert 1196 formed about the circumference of the associated shank 1154 at a location preferably outboard of the respective suspension arms 102', 104'. The shoulders of the annular inserts 1196 retain the collars 1194 from sliding over the associated shanks 1154

Turning now to FIGS. 40A-D, 41A-B and 42, a dual arm centrally mounted steering arm 1200 driven by a pair of servos 1202 is depicted. The centrally mounted steering arm 1200 is pivotally mounted to a mounting bracket 1204 by means of a mounting screw 1206, which passes through a bushing 1208, a center hole 1207 in a retainer 1209, and a center hole 1210 in steering arm 1200.

At each of the ends 1211 of steering arm 1200 are yokes 1212, to which can be attached a rod assembly 1214. Each rod assembly 1214 includes two ball joint ends 1216 and a center rod portion 1218. In one embodiment, the ball joint ends 1216 employ hollow ball bushings 1220. One of the ball joint ends 1216 is pivotally connected to one of the yokes 1212 by means of screw 1222, which passes through the yoke 1212 and through the hole in the hollow ball bushing 1220. The other of the ball joint ends 1216 is pivotally connected to an actuator arm 1217 of one of the pair of servos 1202 by means of screw 1219 through yoke 1225 at the end of actuator arm 1217. Actuator arm 1217 is, in turn, attached to the output shaft 1224 of the servo by means of attachment screw 1226.

In operation, when the operator desires to turn the vehicle, a signal is sent to both of the servos 1202 at substantially the same time. Each of the servos 1202 will cause their output shafts 1224 to pivot in opposite directions, at about the same time. This will cause rod assembly 1214 to extend and retract, applying force to the yokes 1212 of the steering arm, respectively, pivoting the centrally mounted steering arm 1200.

In order to minimize the potential for damage to the servos or their connecting rods and arms, a spring and cam servo saver 1240 assembly is used to connect to a driven steering arm 1242. Driven steering arm 1242 is, in turn, connected to a pair of hollow ball end steering control tie rods 1244, one of which controls the steering position of one of the two front wheels 120', and the other of which controls the steering position of the other of the two front wheels. The ball end of each of the tie rods 1244 is attached to an end 1246 of driven steering arm 1242 by means of screws 1248. Driven steering arm 1242 pivots about bushing 1208, which passes through a hole 1250 in driven steering arm 1242.

The servo saver assembly includes retainer 1209, spring 1252, centrally mounted steering arm 1200 and driven steering arm 1242. Centrally mounted steering arm 1200 includes a pair of axially rotable arcuate lugs 1254, which act as cam surfaces, which fit into cooperatively designed hollows 1256 in the facing surface of driven steering arm 1242, which act as mating cam surfaces. Retainer 1209 is then secured to driven steering arm 1242 by means of screws 1258, with conical spring 1252 resiliently urging centrally mounted steering arm 1200 against driven steering arm 1242 so that lugs 1254 center themselves into hollows 1256.

Under normal steering, the resilient force of spring 1252 is sufficient to keep lugs 1254 in place in hollows 1256 so that pivoting of centrally mounted steering arm 1200 by driving it with servos 1202 will cause driven steering arm 1242 to simultaneously pivot, ultimately resulting in steering of the wheels through steering control links 1244. However, when the vehicle wheel strikes an obstruction during rough driving for example, excessive forces can be imposed on the steering components that might cause damage to the components. When this occurs, the driven steering arm 1242 will pivot relative to centrally mounted steering arm 1200, causing lugs 1254 to rise out of the hollows 1256 against the resilient force of spring 1252. This relative pivoting limits transmission of force from driven steering arm 1242 to the rest of the steering components, thus minimizing the potential for damage. However, immediately upon removal of the excessive force, the lugs 1254 will "pop" back into hollows 1256 under the resilient force of spring 1252, thus returning the steering assembly to normal operation.

By use of a pair of servos 1202 mounted on the left and right side of the chassis 300, a symmetrical torque is applied to the steering arm 1200. This results in a huge benefit to performance minded users due to crisp break away, strong centering and less looseness and/or hysteresis in the system. Furthermore, use of a centrally mounted steering arm permits use of a single, central servo saver, instead of a separate servo saver for each servo, eliminating additional parts and looseness and/or hysteresis in the system Turning now to FIGS. 43A-D and 44-46, a mounting system for securely mounting a servo 1202 to the chassis 300 by means of a clamp style bracket 1300 and a clamp style bracket 1301 is depicted. Servo 1202 includes a housing 1302, which can conveniently be molded of plastic. Housing 1302 includes attachment ears 1304 extending from the ends thereof, which can conveniently be molded integrally with the ends of housing 1302.

Rather than attach the attachment ears 1304 directly to the chassis 300 by means of screws, for example, as is conventional, in accordance with the present invention, a clamp style forward bracket 1300 and a clamp style aft bracket 1301 are employed to secure the attachment ears to the chassis 300. Forward bracket 1300 has an upper flange 1306 and a lower flange 1308. Upper flange 1306 has a pair of threaded holes 1309 which are adapted to receive the threaded end of a screw 1311. Upper flange 1306 and lower flange 1308 are connected at one end by an arcuate live hinge 1310, which can conveniently be molded integrally with upper flange 1306 and lower flange 1308 from plastic material. In addition, lower flange 1308 can includes one or more downwardly extending boss portions 1329A and 1329B, which extend below the upper surface of chassis 300, into the openings 1307A and 1307B of the chassis, to fix the forward bracket 1300 against forward/aft movement. Lower flange 1308 has a hole 1313 disposed through it for accepting the shaft 1315 of screw 1311. Hole 1313 need not be threaded.

Aft bracket 1301 has an upper flange 1316 and a lower flange 1318. Upper flange 1316 has a pair of threaded holes 1319 which are adapted to receive the threaded end of a screw 1311. Upper flange 1316 threaded and lower flange 1318 are connected at each of their sides by an arcuate live hinge 1320, which can conveniently be molded integrally with upper flange 1316 and lower flange 1318 from plastic material. Lower flange 1318 can have one or more downwardly extending lateral bosses 1330 and 1331, which extend below the upper surface of chassis 300, into respective openings 1333 and 1335 of the chassis, to fix the aft bracket 1300 against forward/aft movement. Lower flange 1318 has a hole 1323 disposed through it for accepting the shaft 1325 of screw 1311. Hole 1323 need not be threaded.

To secure the body 1302 of servo 1202, forward bracket 1300 is put onto the end of one of the attachment ears 1304, and bracket 1301 is put onto the end of the other of the attachment ears 1304. Then, screws 1311 are secured, securely clamping one of the ears 1304 between upper flange 1306 and lower flange 1308, and the other of the ears between upper flange 1316 and lower flange 1318.

Brackets 1300 and 1301 can be manufactured from Zytel 70 G 33 (33% Glass) available from DuPont, which retains shape and grips screw threads better than plastics without a glass reinforcing fill.

Figure 47A:
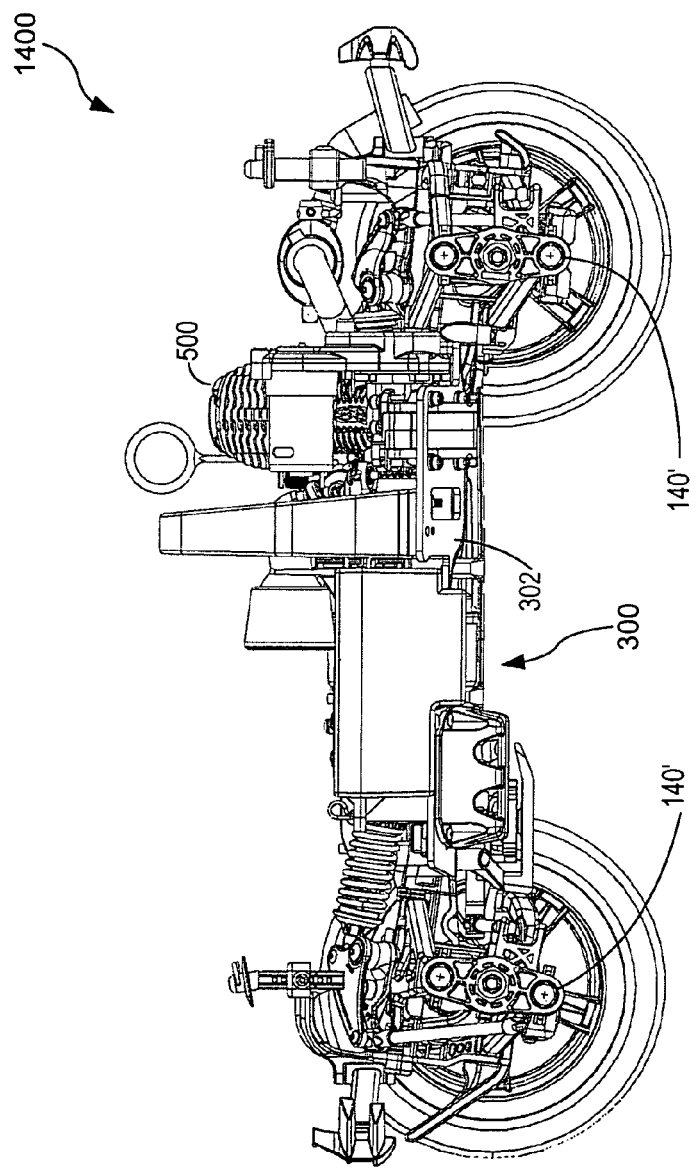
FIGS. 47A and B are side and top plan views showing the layout of various components supported by the vehicle chassis.
Figure 47B:
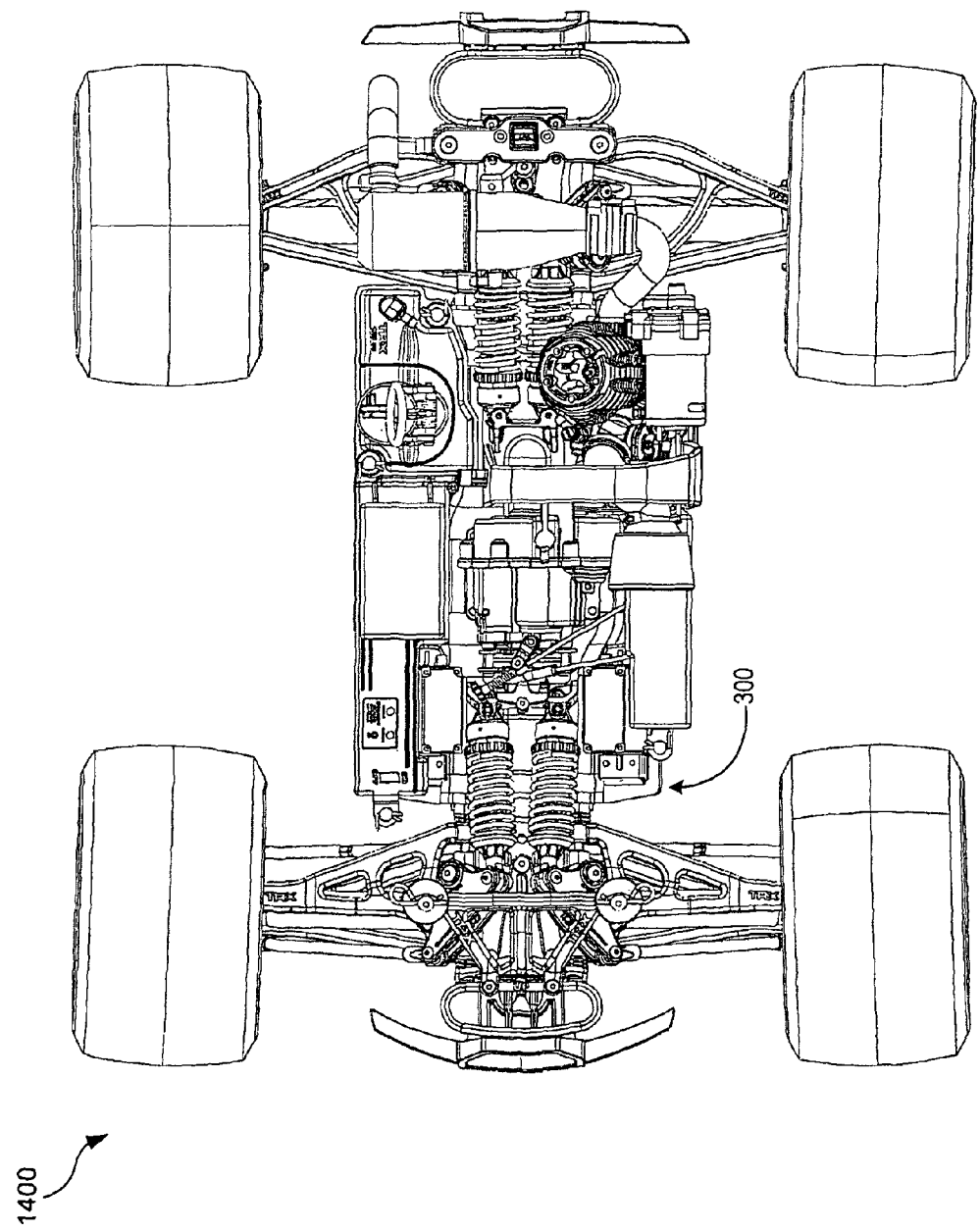
Figure 48:
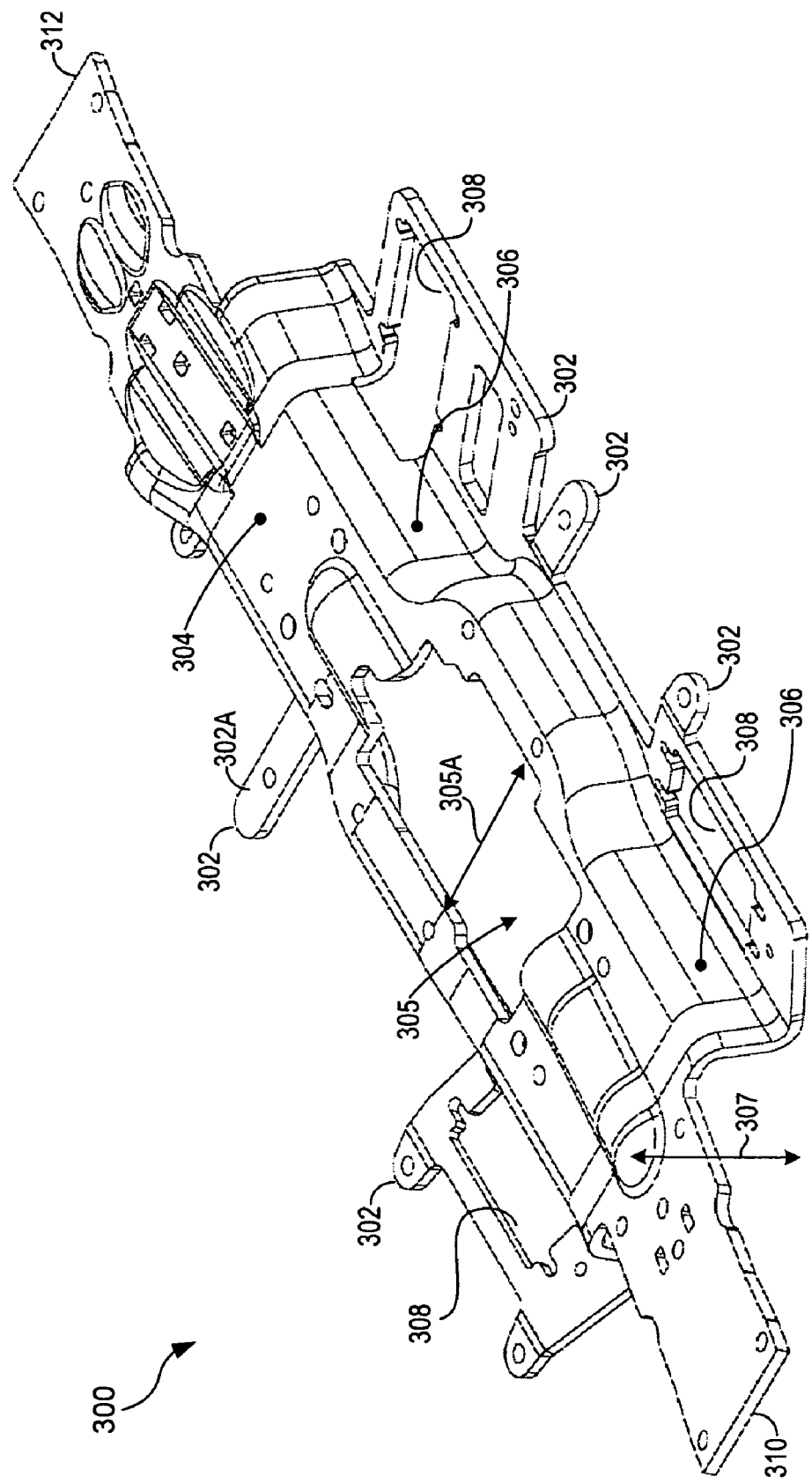
FIG. 48 is a perspective view of a vehicle chassis alone.
Figure 50A:
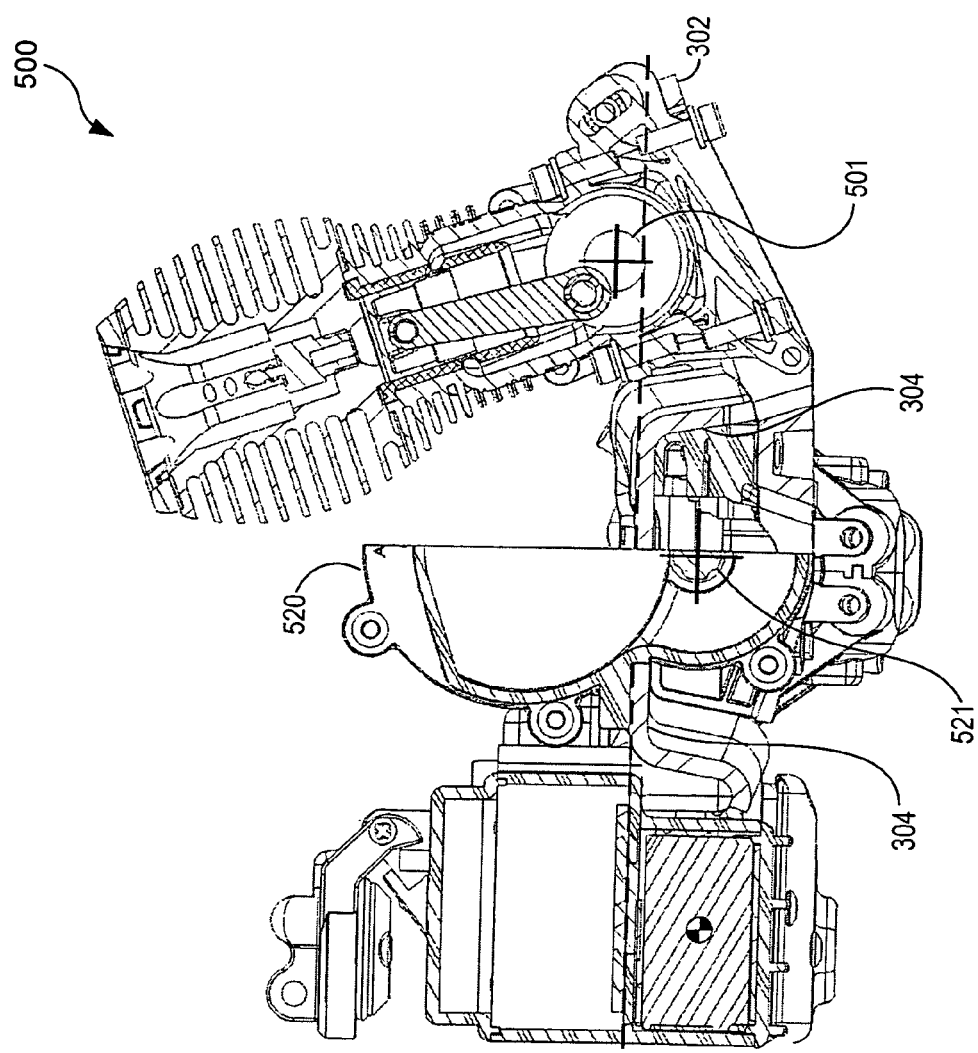
FIGS. 50A and B are section and perspective section views, taken along section lines of FIG. 49C, illustrating the shape of the chassis and relative location of certain components supported by the chassis.
Figure 50B:
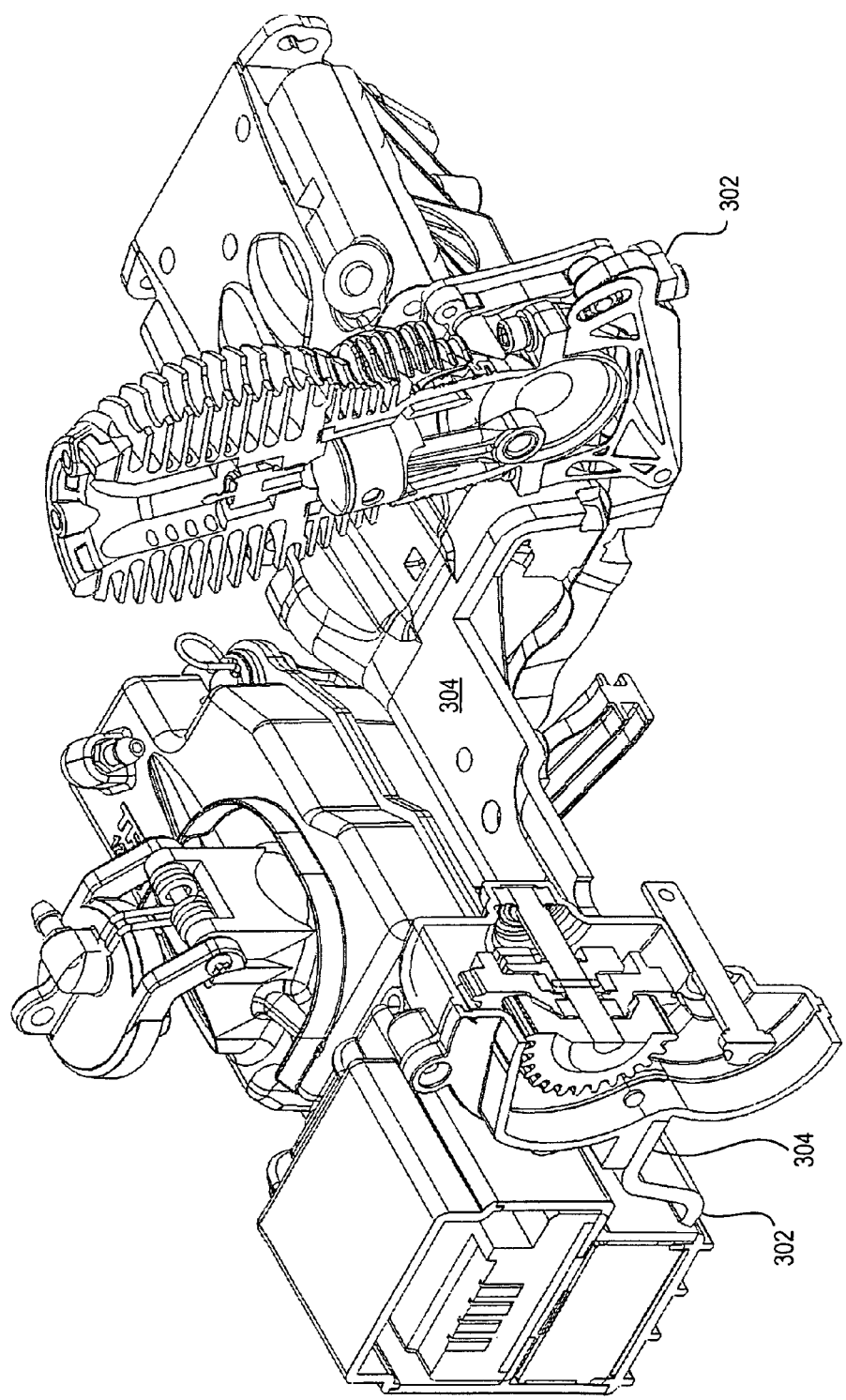
Figure 51A:
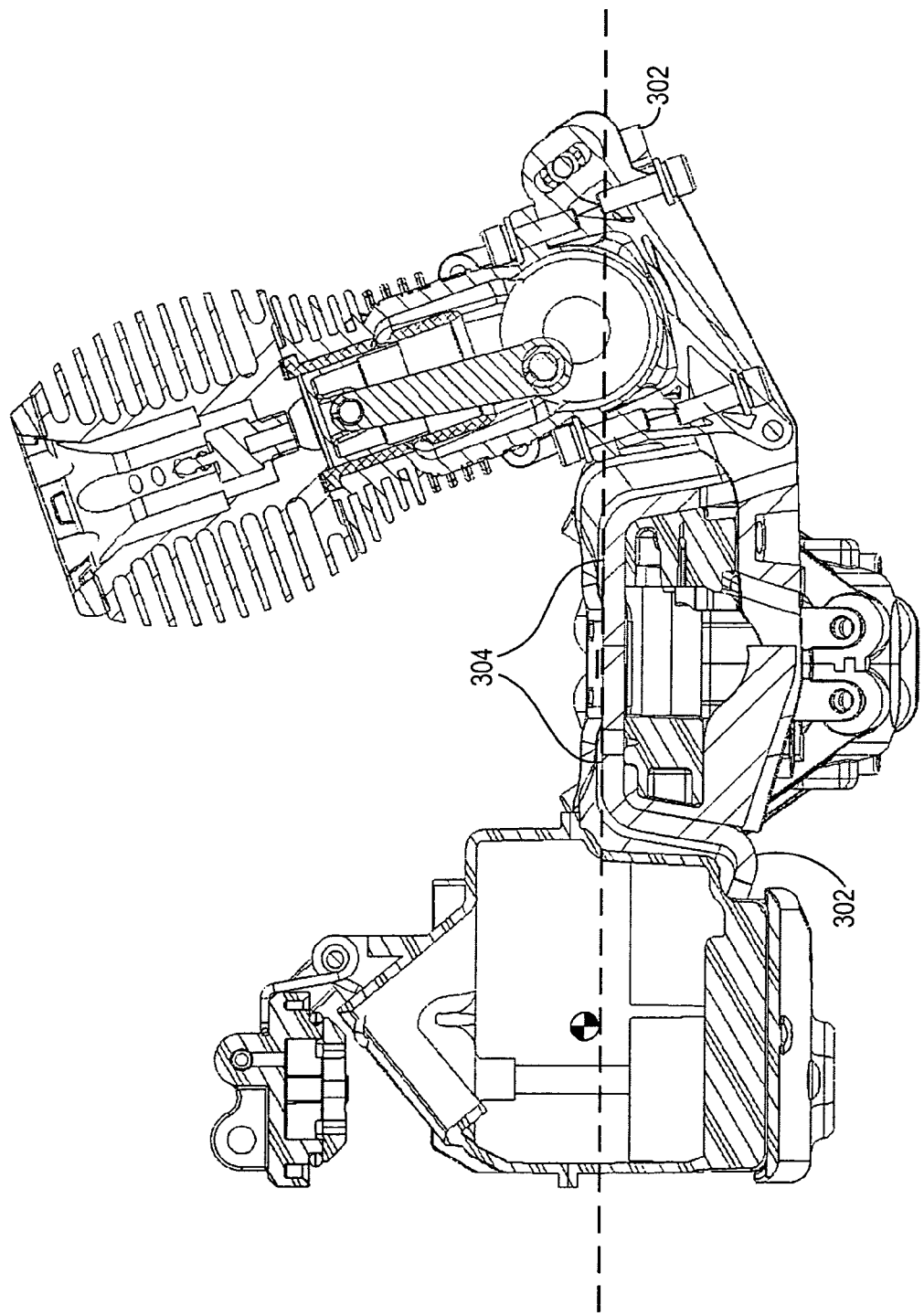
FIGS. 51A and B are section and perspective section views, taken along section lines of FIG. 49C, illustrating the shape of the chassis and relative location of certain components supported by the chassis.
Figure 51B:
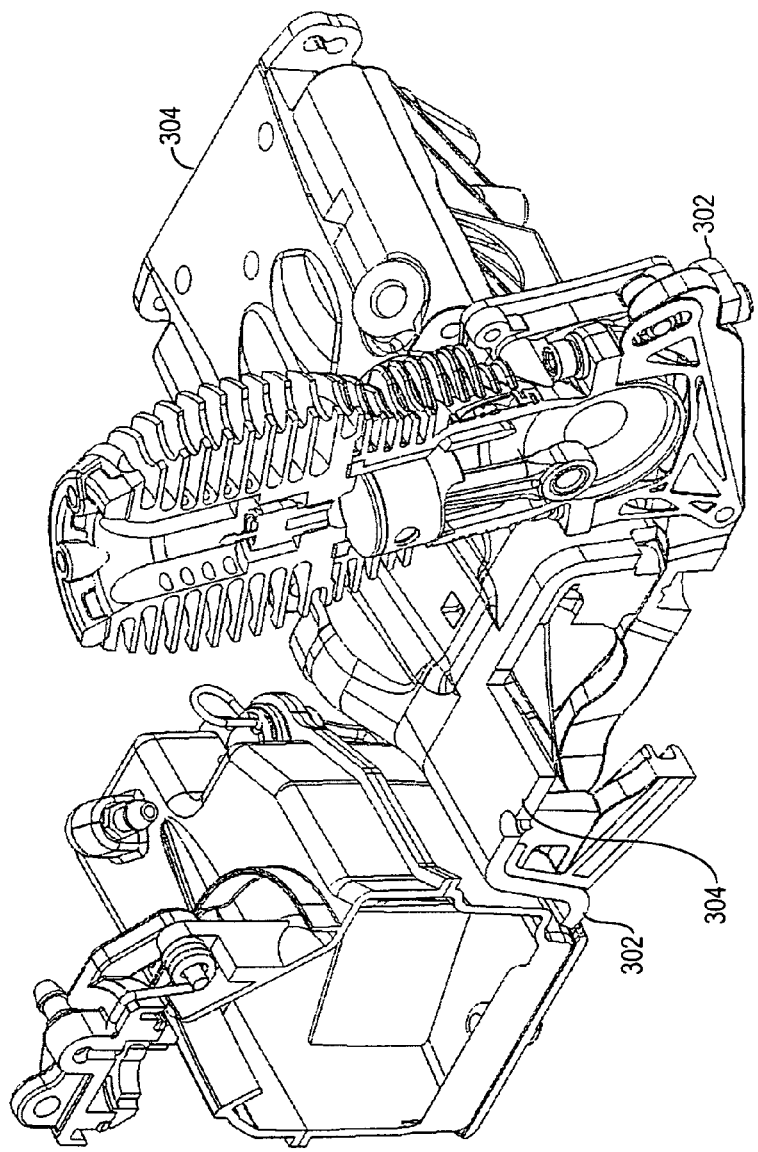
Figure 52:
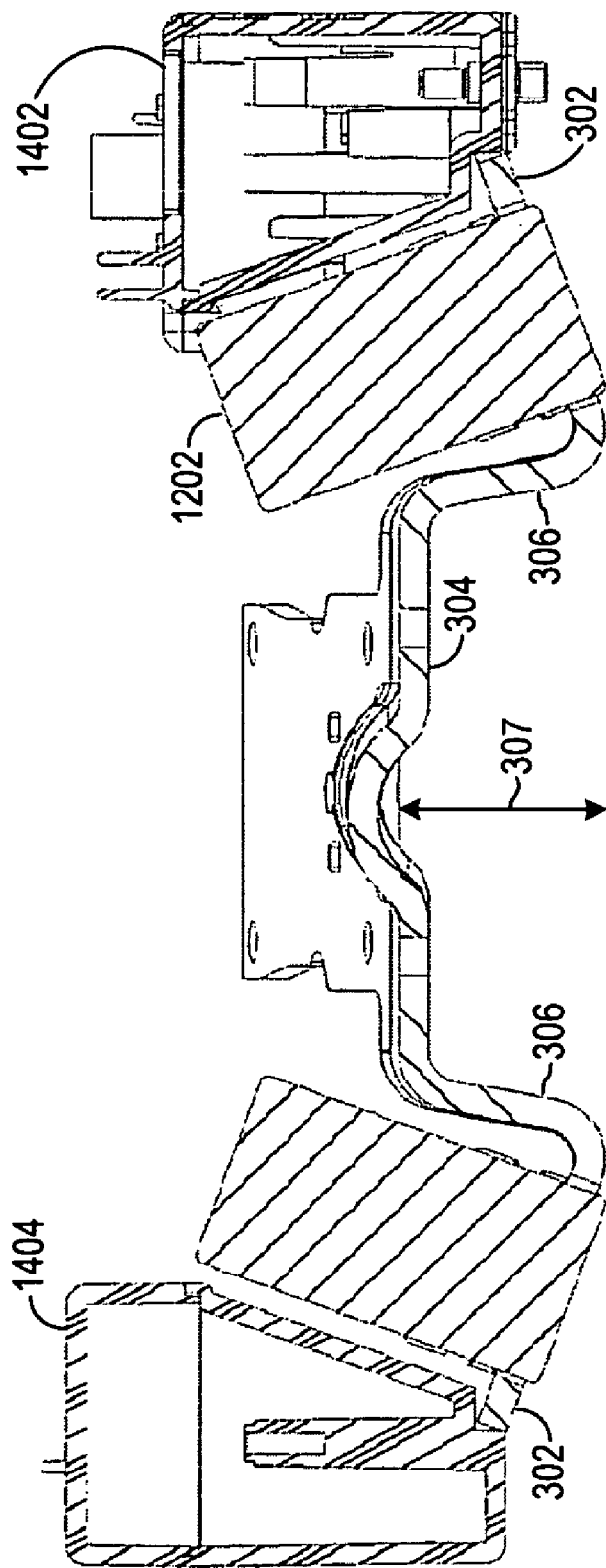
FIG. 52 he is a section view, taken along section lines of FIG. 49C, illustrating the shape of the chassis and relative location of certain components supported by the chassis.

By use of the clamping type brackets of an embodiment of the present invention, a wide range of aftermarket dimensions of servos can be accommodated without requiring additional parts and without compromise in the mounting integrity. Furthermore, the clamp style interface distributes loads over the entire mounting ear thereby reducing breakage/distortion of the mounting ears, overall improvement in durability. In addition, the clamp style mounting type brackets also improve control performance by increasing the stiffness of the servo-vehicle interface. Of course, the forward and aft brackets could be reversed, if desired FIGS. 47A and B illustrate a vehicle 1400 incorporating the various features described herein, including in Appendices A, B, C and D hereto, which are incorporated herein by reference.

Referring now also to FIGS. 1 and 47A through 52, illustrated is a chassis 300, which is also described elsewhere in connection with other features and components comprising portions of the vehicle 1400. The chassis 300 is configured to provide a lower center of gravity than can typically be provided by conventional chasses resembling a relatively flat surface or plate. This is accomplished by providing chassis 300 with flanges 302 extending laterally from a central channel area 304. The central channel area 304 may have an opening 305 for the transmission assembly 520. The opening 305 may have a lateral width 305A extending across a majority of the lateral width of the central channel area 304. The lateral flanges 302 extend from downwardly sloping lateral walls 306 of the central channel area 304 at a substantially lower level relative to an underlying surface. The lateral flanges 302 provide support for relatively heavy components that do not require placement near or in alignment with the drive train of the vehicle 1400. In general, the flanges 302 lower the mounting points of various components' on the chassis 300, at least relative to the transmission assembly 520 and transmission output shaft 521. In addition, the flanges 302 preferably incline gradually as they extend laterally from the channel area 304. Upward sloping of the flanges 302 causes the components supported on the flanges 302 to extend both upwardly and inwardly toward the center of the vehicle 1400, more tightly packaging the components on the chassis 300.

The flanges 302 preferably include openings 308, for example, through which the lower portions of components can extend, in addition to being secured to the flanges 302 at a lower level than the central channel area 304. Where convenient, chassis 300 weight is reduced by configuring one or more flanges 302 as a support arm, such as arms 302A, that cooperates with other flanges 302 to support components on the chassis 300. Further, the flanges 302 may preferably extend laterally and substantially without upward inclination, if desired to enhance performance of the component or to satisfy structural or packaging preferences.

The flanges 302 are capable of supporting numerous components of the vehicle 1400 at a level substantially lower than the central channel area 304. In the embodiment shown, the flanges 302 support at a lower level, an electronics and battery package 1402, a fuel tank, the engine assembly 500, a servo and battery package 1404 and steering servos 1202. Of these components, the flanges 302 tilt inwardly the engine assembly 500 and the steering servos 1202.

An advantage of the configuration of the chassis 300 is the ability to mount the engine assembly 500 lower with respect to the transmission assembly 520. Preferably, the transmission assembly 520 is centrally mounted on the central channel area 304, while the engine assembly 500 is mounted to the chassis 300 at a lower point on one or more of the flanges 302.

The transmission assembly 520 may extend through the opening 305 in the central channel area 304. The chassis 300 is configured in this manner to preferably position the drive shaft 501 of the engine assembly 500 within the range of about 3 mm to 13 mm vertically above (of relative to the ground) the level of the transmission output shaft 521. The chassis 300 is preferably press-formed and cut from a sheet of anodized aluminum. It will be apparent that the flanges 302 and a central channel area 304 may be configured in other the variations and configurations to achieve a lower center of gravity overall for the vehicle 1400.

The chassis 300 may be formed from a single sheet of material, and may have no closed spaces. Accordingly, the chassis 300 may have a vertical gap 307 beneath the central channel area 304 due to the elevation of the central channel area 304 above the flanges 302. The gap may extend from immediately below the central channel area 304 to below the lowermost point of the flanges 302.

In addition to providing a lower center of gravity for the vehicle 1400, the chassis 300 includes forward and rearward extension plates 310, 312 positioned at substantially the same vertical level as the central channel area 304. The forward and rearward extension plates 310, 312 are preferably formed integrally with the upper surface of the central channel area 304 and support various components of the front suspension, steering and rear suspension assemblies of a vehicle 1400 at a higher vertical level than if those assemblies were secured to the flanges 302. Thus, the chassis 300 maintains desirable ground clearance beneath the suspension and drive assemblies, while providing a relatively low center of gravity.

In steering systems, for optimum performance, it is important to maintain geometric parameters within certain desired ranges. Some of these well-known parameters are toe-in, camber, caster and roll center. Toe-in is the angle that the wheels make with respect to a line through the centerline the vehicle, when viewed from above.

Camber is the inclination of the wheel, from vertical, as viewed from the front of the vehicle. It is usually designed to vary with wheel travel in order to help keep the tire squarely on the ground. As described elsewhere in this application, camber is adjustable on the vehicle.

Caster is defined as the inclination, from vertical, of the wheel's steering axis as viewed from the side of the vehicle. That is, generally speaking, caster is a tilt of the steering axis toward the front or back of the vehicle. Basically viewing from the side of the vehicle, draw a line through the upper and lower ball joint of the axle carrier. The angle off of vertical is the caster. The caster angle is adjusted by moving the mounting point of the upper arm (effectively the upper ball joint) generally fore and aft with the spacers on the hinge pin of the upper arm. Adjusting caster changes the steering characteristics of the vehicle.

Roll center is adjusted by moving the inner mounting point of the upper arm up and down. This changes the front view Instant Center (IC) of the suspension. The IC partially defines the roll center.

"Bump steer" can be defined as undesirable steering (toeing in or toeing out) of the wheel/tire during travel (vertical) of the suspensions, assuming that the steering wheel or actuation mechanism is being held fixed. Bump steer occurs because the toe change is caused by geometric differences in the motion arc of the steering control link (toe control link) and the suspension arms during bump travel of the suspension. Basically, if the vehicle is going straight and then hits a bump with a wheel, the raising of the wheel due to the bump changes the toe, causing the vehicle to tend to veer off without any movement of the steering wheel/steering actuator. Bump steer tends to be more sensitive to caster and roll center changes than other parameters.

Bump steer is usually impossible to eliminate due to packaging and design limitations. Generally, a compromise setting is made to optimally minimize at the standard suspensions settings. However, having a way to adjust bump steer is desirable due to the range of caster and roll center adjustments available in the suspension.

It is known to attempt to minimize bump steer by varying the vertical position of the mounting points (front view) of the steering control link on the axle carrier 140' of the front wheels. Thus, minimizing bump steer while adjusting caster and roll center is difficult and complicated, requiring extensive trial and error on the part of the operator. For example, once an adjustment to caster and/or roll center is made, bump steer is reintroduced by the new settings unless there is a provision for "tuning" it back out.

An embodiment of the present invention incorporates an adjustment feature that allows the bump steer to be optimized (minimized) for a substantially complete set of possible combinations of suspension settings; i.e., from 5 degrees to 15 degrees of caster, in 2.5 degree increments and for either an "upper" or "lower" roll center position. Referring to FIGS. 53, 54A-E and 55, this is accomplished by providing the attachment pin of the axle carrier 140', to which the pivot link 154 at the end of the control link is attached, with clearance for permitting movement of the pivot link 154 up and down on the attachment pin 1390. Ring-shaped spacers A, B or C, taken from a predetermined set of spacers having predetermined thickness are disposed on the pin 1390 above and/or below the pivot link 154 to take up the clearance and position the pivot link 154 at the optimum position on the pin. The predetermined thicknesses for the spacers A, B and C are predetermined for each combination of caster and roll center adjustments by geometric calculations and spacers having the appropriate thicknesses are in a kit, along with a table indicating which spacers to use and where to position them on the pin.

Figure 53:
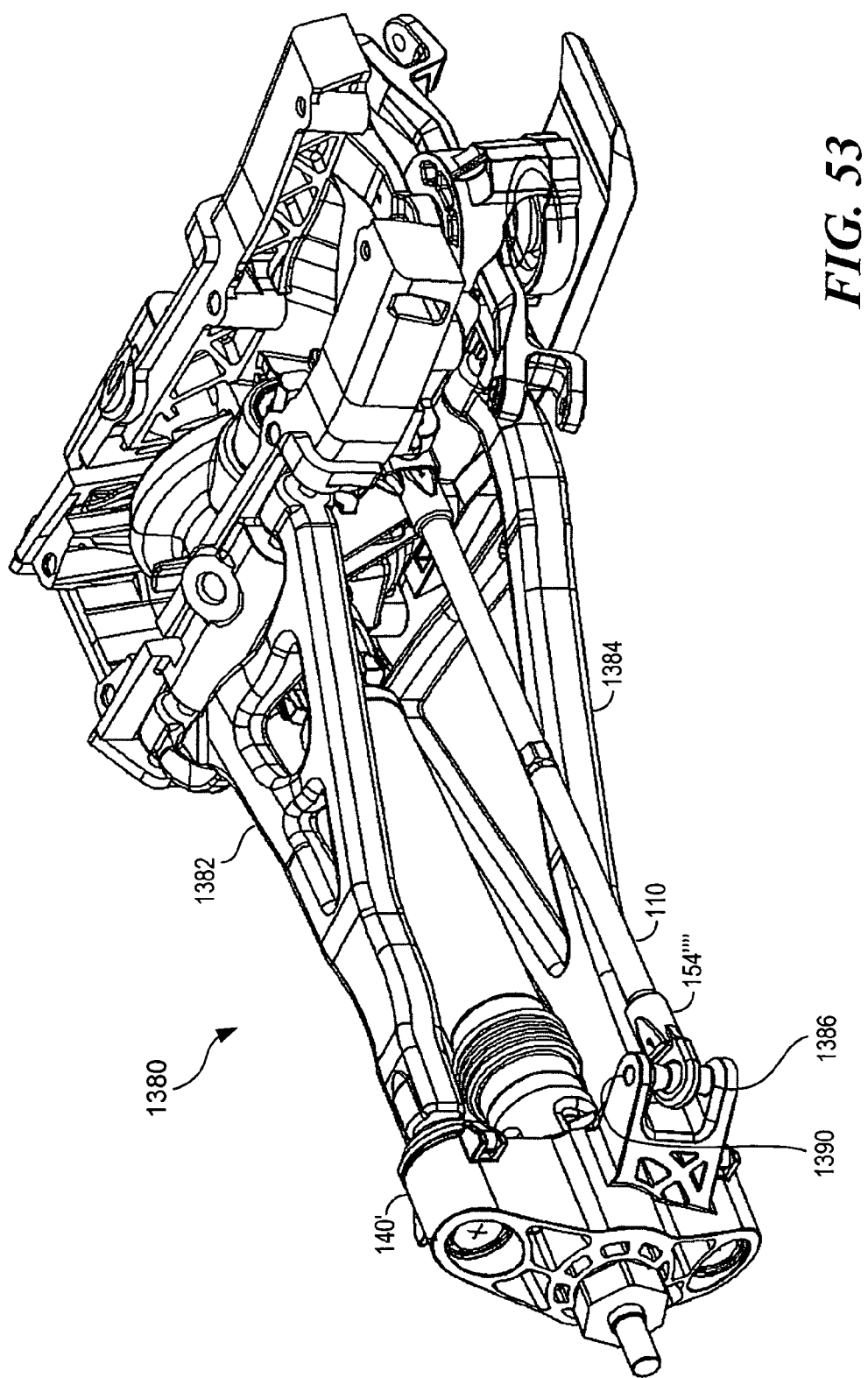
FIG. 53, depicts a perspective view of the front suspension assembly for the left front wheel.

Referring to FIGS. 53, 54A-E and 55, and initially to FIG. 53 thereof, a perspective view of the suspension assembly 1380 for the left front wheel is depicted. Suspension assembly 1380 includes upper and lower suspension arms 1382 and 1384, to which is attached an axle carrier 140'. Axle carrier 140' has an arm 1386 having generally vertical pin 1390 thereon. Control link 110, which extends from a driven steering arm 1242 (not shown) includes a pivot link 154 pivotably attached to pin 1390.

FIGS. 54A-E show detailed views of the axle carrier 140', pin 1390 and pivot link 154 with various predetermined combinations of ring-shaped spacers A-B positioned on the pin, above and/or below the pivot link 154. It should be noted that, to replace the spacers, pin 1390 is first removed, the spacers and pivot link 154 (or 154'''') placed onto it, and then the pin is replaced.

In FIG. 53A, a thick spacer of thickness A is disposed above pivot link 154 and a thin spacer of thickness B is disposed below the pivot link 154. As shown in FIG. 55, this combination is used where there is a 5 degree caster and the roll center setting is at the "lower" setting. This combination is also used where there is a 7.5 degree caster and the roll center setting is at the "lower" setting.

Figure 54A:
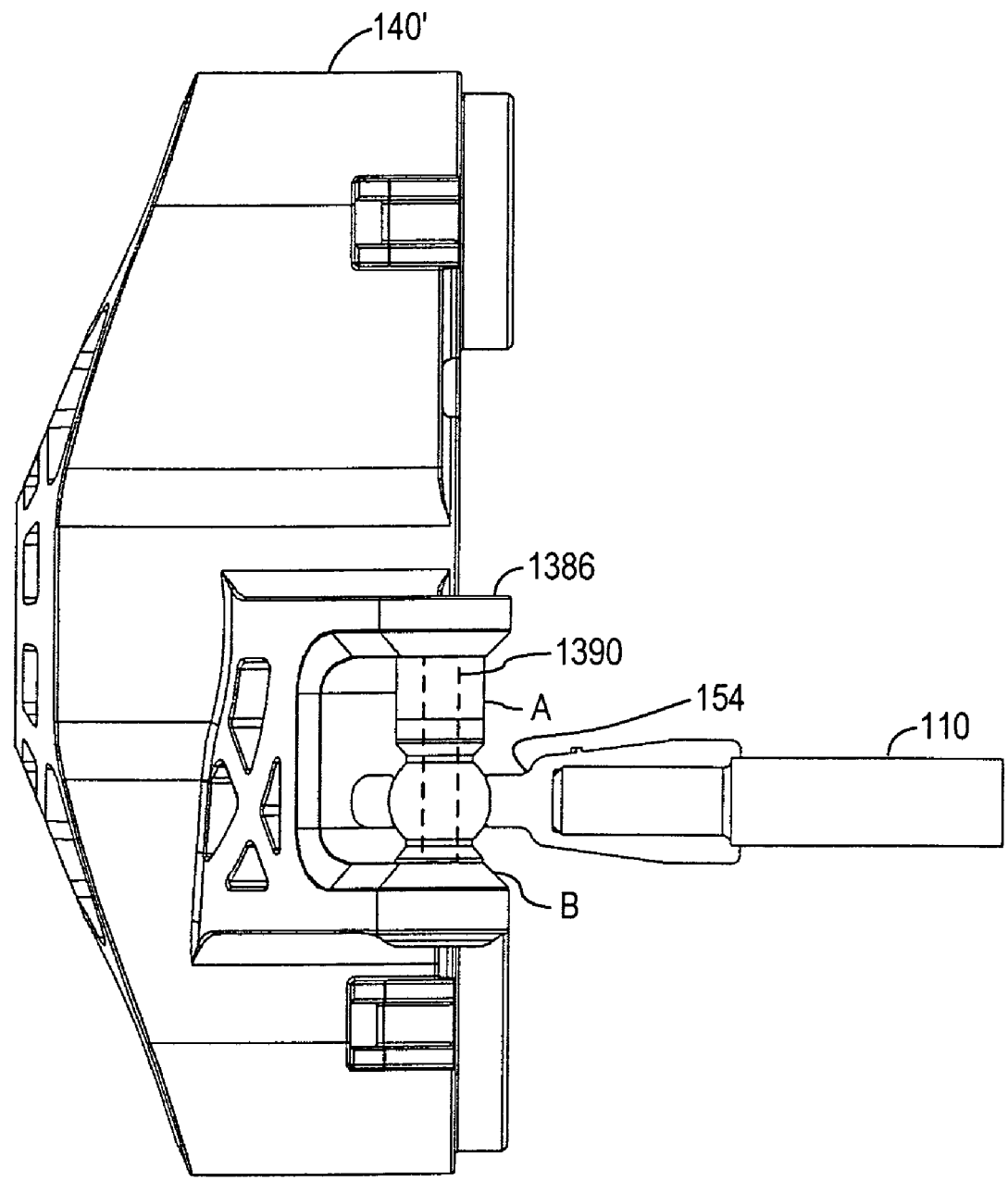
FIGS. 54A-E show detailed views of the axle carrier, pin and pivot link with various predetermined combinations of ring-shaped spacers.
Figure 54B:
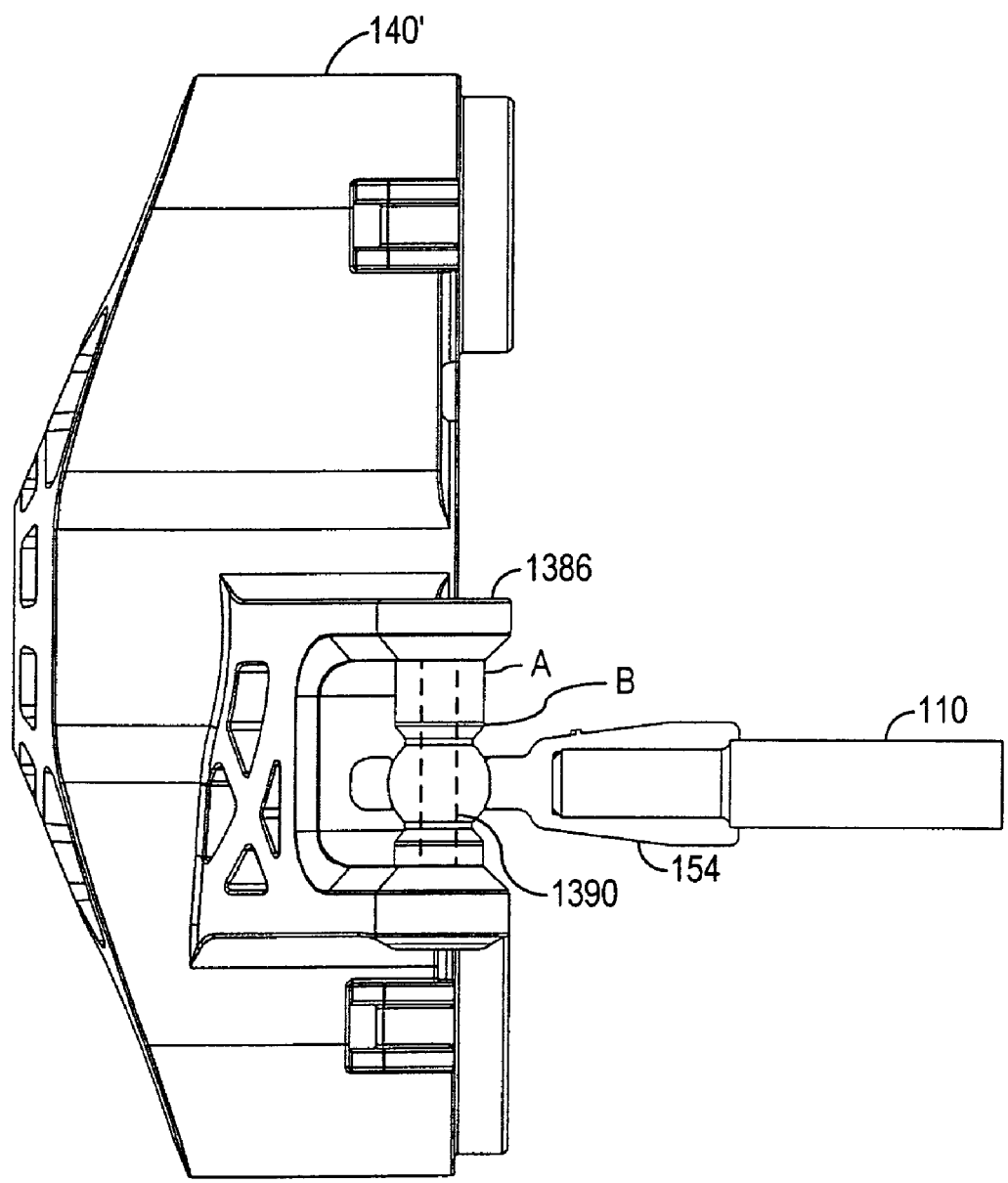

In FIG. 54B, a thick spacer of thickness A is disposed above pivot link 154 and a thin spacer of thickness B is also disposed above the pivot link 154. As shown in FIG. 55, this combination is used where there is a 5 degree caster and the roll center setting is at the "upper" setting.

Figure 54C:
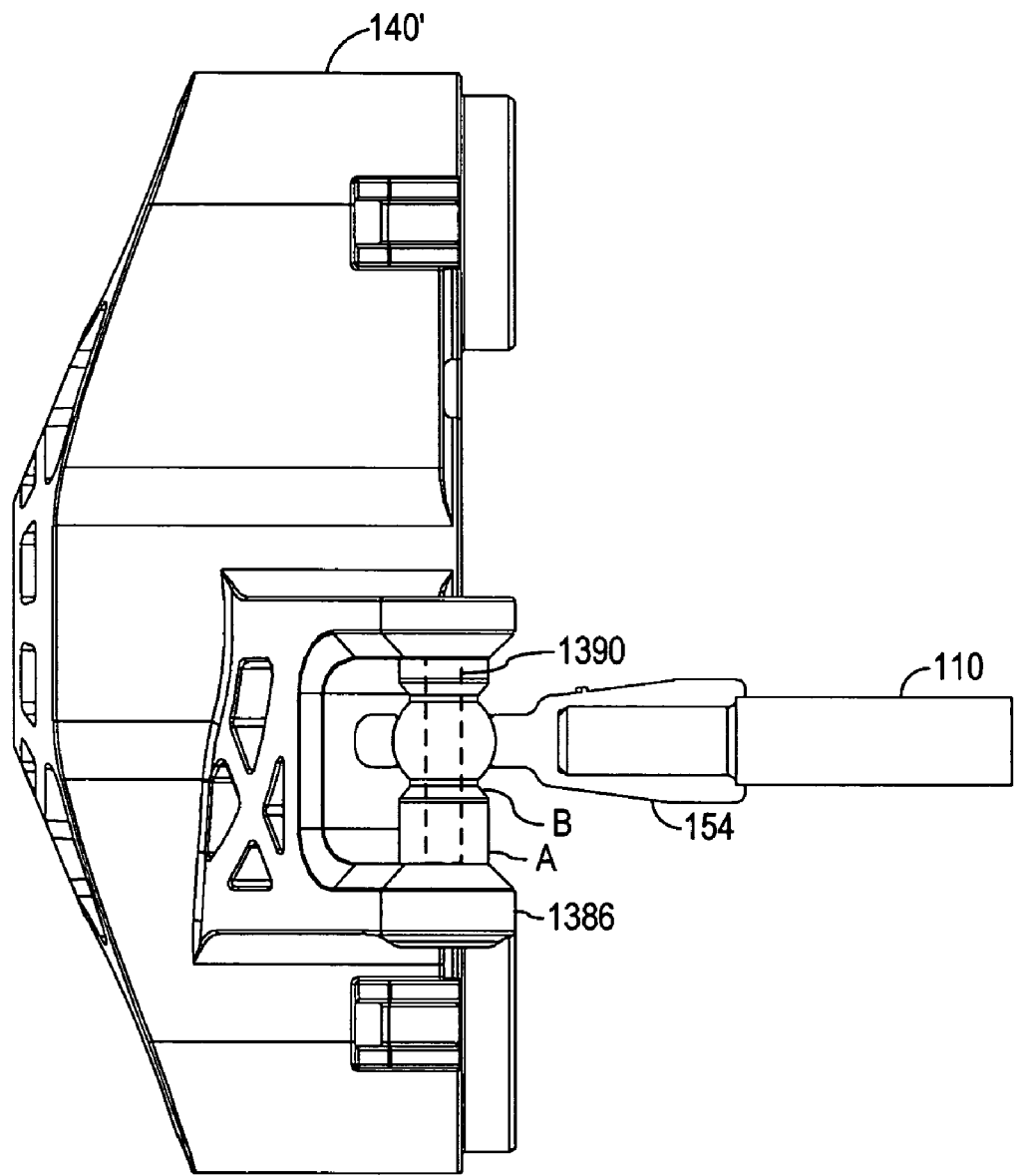

In FIG. 54C, a thick spacer of thickness A is disposed below pivot link 154 and a thin spacer of thickness B is also disposed below the pivot link 154. As shown in FIG. 55, this combination is used where there is a 10 degree caster and the roll center setting is at the "lower" setting. This combination is also used where there is a 12.5 degree caster and the roll center setting is at the "upper" setting.

Figure 54D:
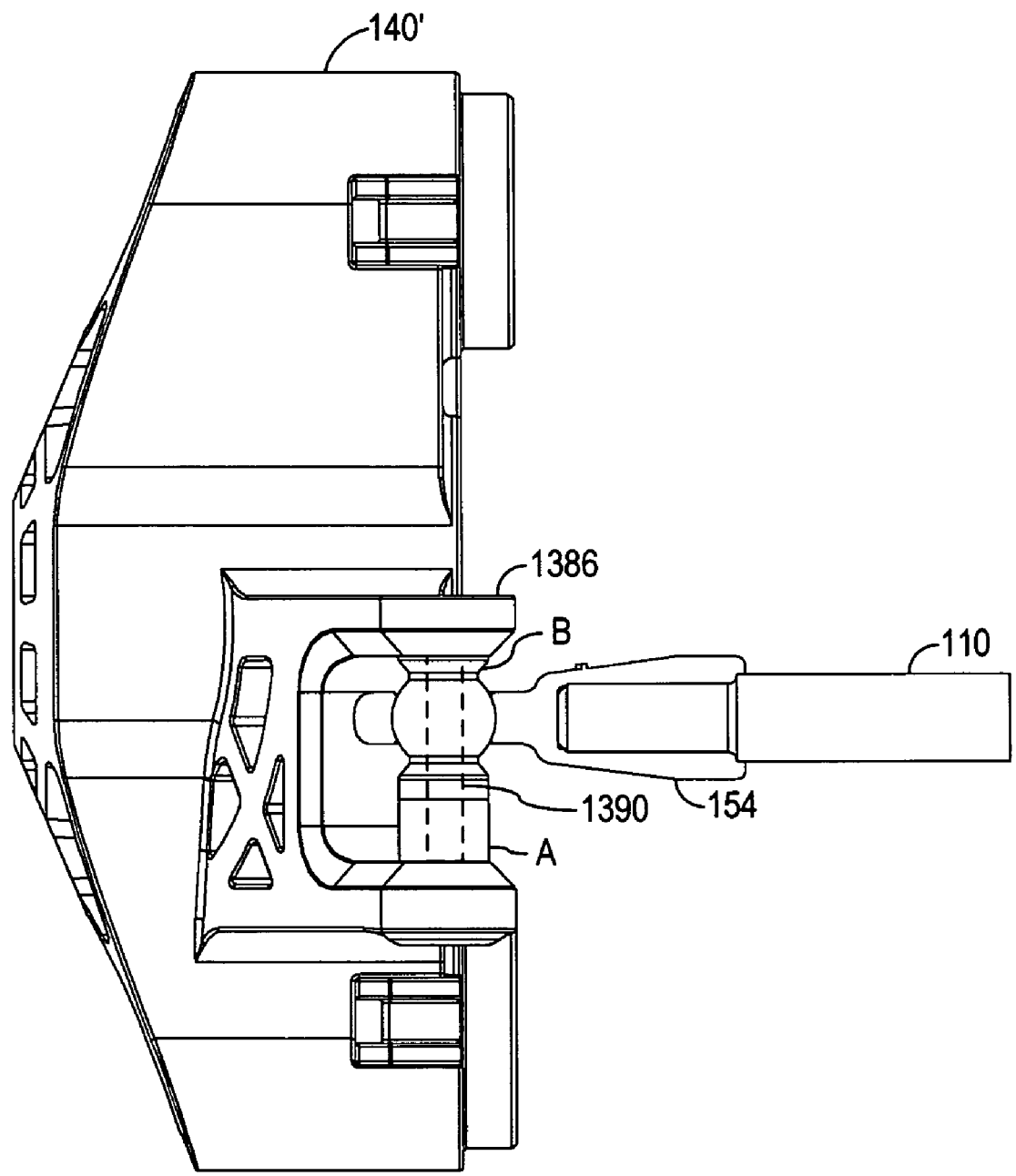

In FIG. 54D, a thick spacer of thickness A is disposed below pivot link 154 and a thin spacer of thickness B is disposed above the pivot link 154. As shown in FIG. 55, this combination is used where there is a 10 degree caster and the roll center setting is at the "lower" setting. This combination is also used where there is a 12.5 degree caster and the roll center setting is at the "upper" setting.

Figure 54E:
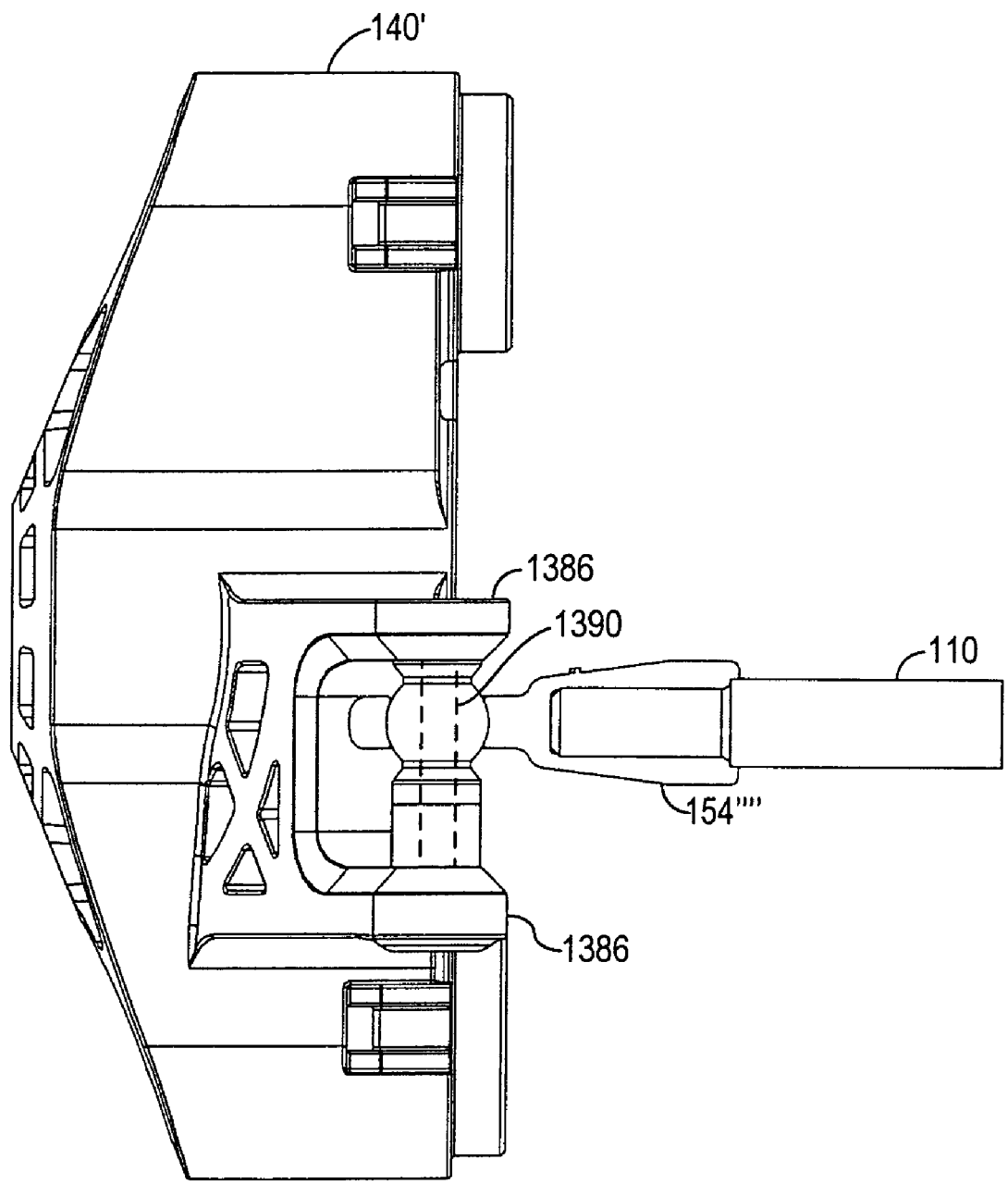
Figure 56:
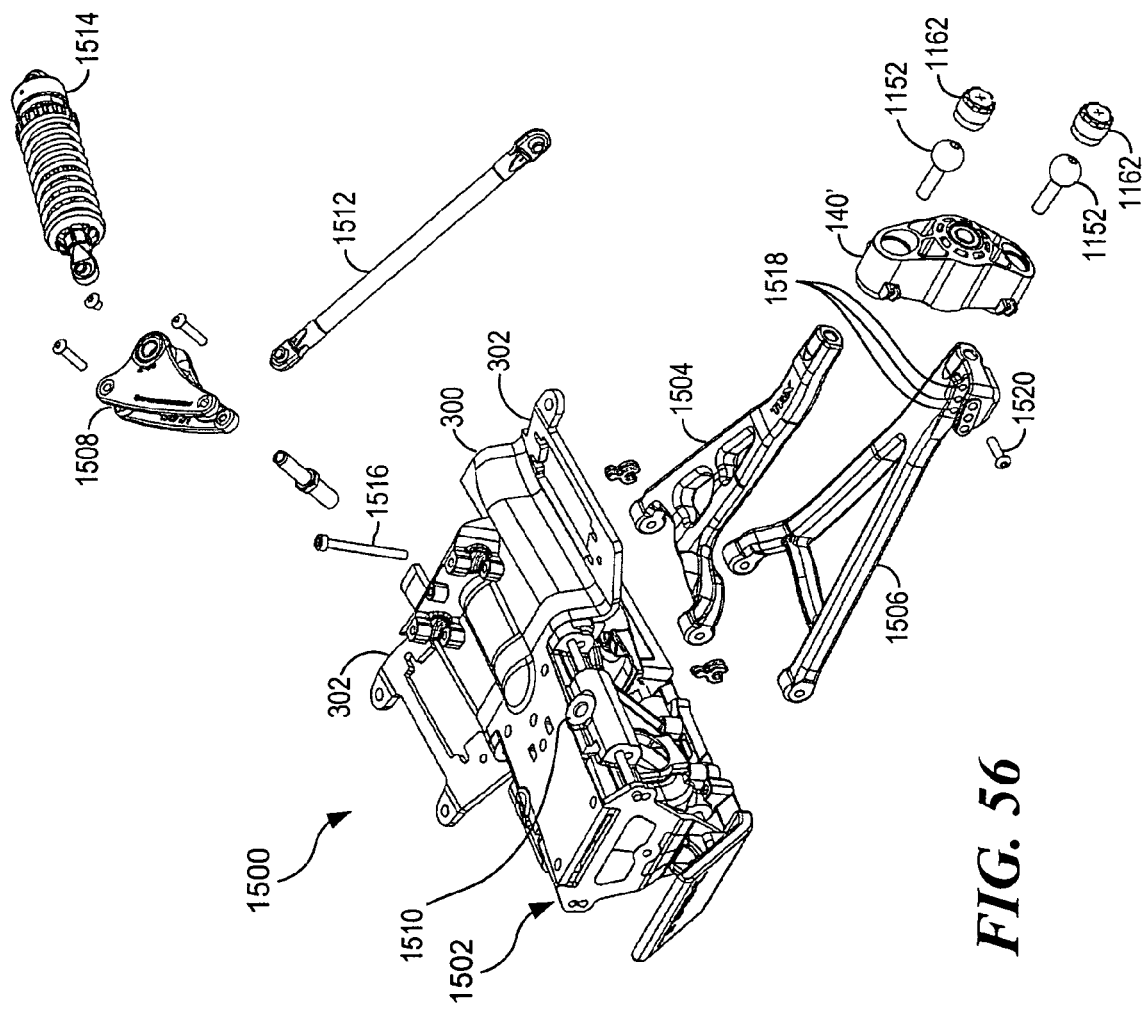
FIG. 56 is an exploded perspective view of the front left suspension assembly of the vehicle.
Figure 57D:
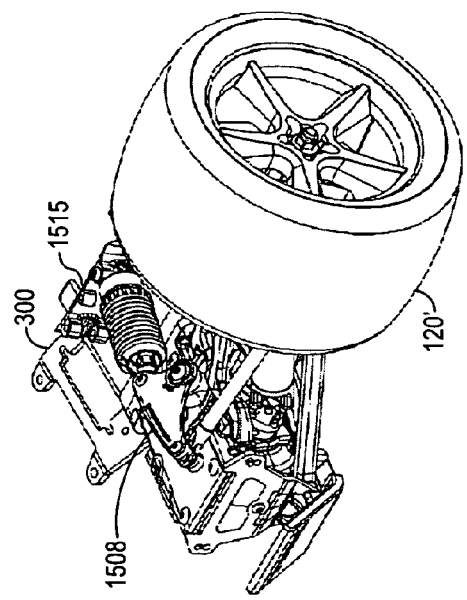
FIGS. 57A through D are front elevation, side, top and perspective views of the front left suspension assembly of the vehicle in a full bump position.
Figure 57B:
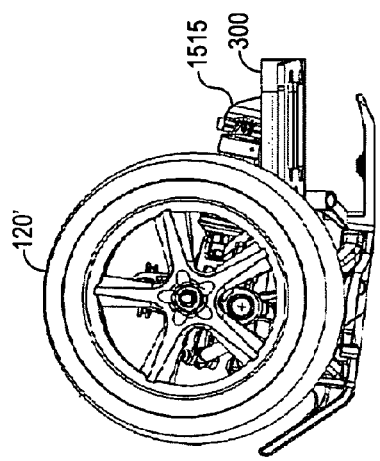
Figure 57C:
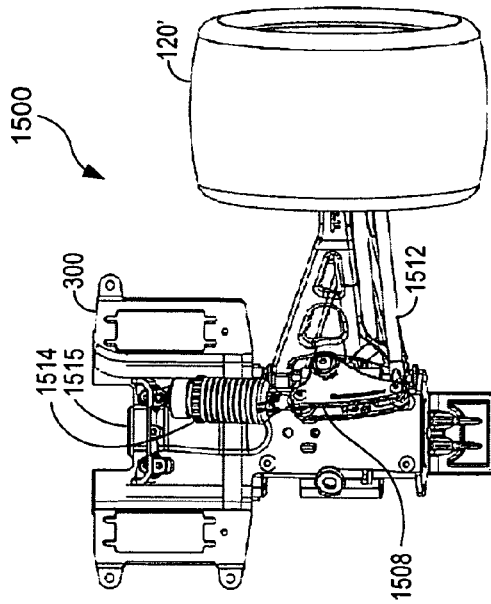
Figure 57A:
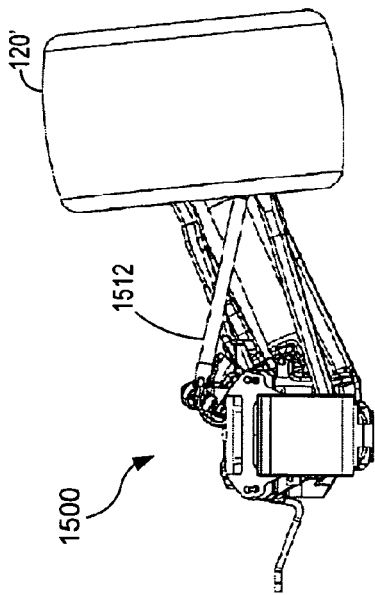

In FIG. 54E, a "standard" configuration can be employed, where a standard hollow ball pivot link 154'''' is used that has approximately equal length collars 155 and 157 at its upper and lower sides that form part of the pivot link 154''''. Alternatively, spacers can be used that have the same, medium thickness "C," thus, positioning the pivot link at the approximate midpoint of pin 1390. Such a medium positioning is listed in the table of FIG. 55 as "tall center hollow ball." This centered combination is used where there is a 7.5 degree caster and the roll center setting is at the "lower" setting. This combination is also used where there is a 10 degree caster and the roll center setting is at the "upper" setting.

Of course, because the caster angles and roll center settings will vary by vehicle geometry, weight and other parameters, the above caster angles and roll center settings are only examples for a particular vehicle of a particular geometry, weight and other parameters. Of course, finer increments (such as 1 degree increments for caster and more increments for the roll center setting) could be employed, resulting in more spacer thicknesses and combinations thereof.

FIGS. 56, 57A through D and 58A through D, illustrate one configuration of a front suspension assembly 1500 secured to a front bulkhead assembly 1502 of the vehicle 1400. The suspension assembly 1500 comprises upper and lower suspension arms 1504 and 1506 pivotally mounted to the bulkhead assembly 1502. A rocker arm 1508 is pivotally mounted to a post or boss 1510 extending at an angle into the bulkhead assembly 1502, inboard and above the point of connection of the upper suspension arm 1504 to the bulkhead assembly 1502. The rocker arm 1508 is pivotally coupled to a push rod 1512 and a damper assembly 1514. The damper assembly 1514 may be mounted on the central channel area 304 by bracket 1515. The outboard end of the push rod 1512 is pivotally secured to the outboard end of the lower suspension arm 1506, urging the suspension arm 1506 outwardly and downwardly. Upward movement of the suspension arm 1506 displaces the push rod 1512 inwardly toward the rocker arm 1508, which in turn pivots to compress the damper 1514 against a pivot pin 1516. Downward movement of the suspension arm 1506 displaces the push rod 1512 outwardly, which in turn pivots the rocker arm 1508 to release the damper 1514. The rocker arm 1508 is generally triangular in shape. The portion of the rocker arm 1508 pivotally connected to the push rod 1512 is referred to as the input arm. A portion of the rocker arm 1508 pivotally connected to the damper assembly 1514 is referred to as the output arm.

The damper 1514 is generally aligned with the longitudinal axis of the vehicle 1400 and a substantially horizontal position, with a slight upward inclination from the point of connection to the bulkhead assembly 1502 toward the point of pivotal connection to the rocker arm 1508. The substantially horizontal position of the damper 1514, mounted adjacent the points of connection of the suspension arms 1504, 1506 to the bulkhead assembly 1502, reduces vertical space requirements and protects the damper 1514 from damage.

The rocker arm 1508 pivots about an axis substantially perpendicular to the axis of the push rod 1512 at some point during operation of the suspension assembly 1500. The rocker arm 1508 pivotal axis is oriented to translate movement of the damper assembly 1514 into substantial alignment with the push rod 1512 as the rocker arm 1508 pivots. The push rod 1512 is mounted to the rocker arm 1508 for pivotal movement along vertical and horizontal axes relative to the rocker arm 1508. As the suspension assembly 1500 moves, the push rod 1512 pivots upwardly and downwardly relative to its point of connection to the rocker arm 1508, following vertical movement of the outboard end of the suspension arm 1506.

Referring now to FIGS. 57A through D, the suspension assembly 1500 is shown in the full bump position, with the suspension arms 1504, 1506 displaced to their uppermost extent. This position corresponds with the vehicle 1400 reaching a lowermost position relative to an underlying surface. In this position, the push rod 1512 rotates the rocker arm 1508 toward a damper 1514, substantially fully compressing the damper 1514.

Referring now to FIGS. 58A through D, the suspension assembly 1500 and is shown in the full droop position, with the suspension arms 1504, 1506 extended to their lowermost extent. This position corresponds with the vehicle 1400 reaching its highest position relative to an underlying surface. In this position, the damper 1514 rotates the rocker arm 1508 to fully extend the push rod 1512.

A position intermediate to the full bump and full droop positions is the ride height position. In the ride height position, the suspension assembly 1500 reaches an equilibrium position in which the force exerted by the push rod 1512 counteracts the vehicle weight placed on the suspension arms 1504, 1506. In general, relative proportions of total travel distance of the outboard ends of the suspension arms 1504, 1506 at the axle carrier 140' (i) from ride height to full bump and (ii) from the ride height to full droop is referred to as the up/down travel distribution. The travel distribution of the suspension assembly 1500 is approximately two-thirds to one third. A ride height of the vehicle 1400 can be adjusted by changing the point of connection of the outboard end of the push rod 1512 to the outboard and of the suspension arm 1506. This is accomplished by movement of the push rod 1512 outboard end between a number of positioning apertures 1518 to which the push rod is secured by a pin 1520.

The suspension assembly configuration of FIGS. 56 through 64 provides numerous advantages. Amongst many advantages too numerous to list, but that will nevertheless be apparent to those skilled in the art, the configuration of the suspension assembly 1500 is capable of providing relatively large motion ratios (MR), a relatively large range of travel between full bump and full droop positions, enhanced progressiveness of the suspension, as well as the ability to relatively accurately adjust the suspension progressiveness over the range of movement. The motion ratio (MR) is generally described as the ratio of vertical displacement of the wheel to displacement of a corresponding suspension spring member. Depending on the suspension design, motion ratios often vary over the range of suspension travel. Accordingly, it is often useful to define the motion ratio at various points in the suspension travel. The motion ratio at a particular point in the travel range is referred to as the instantaneous motion ratio. A progressive suspension is generally one in which the suspension spring force at the wheel increases non-linearly as the suspension spring member is displaced by vertical wheel travel. Progressiveness can be defined as a change in motion ratio (MR) of the suspension over some range of travel.

Furthermore, a variety of performance characteristics can be independently adjusted in the assembly 1500, without substantially affecting other performance characteristics. For example, the ride height of the assembly 1500 can be adjusted without significantly affecting the travel distribution or the wheel rate. This is because adjustment of the ride height has a relatively insignificant effect on a motion ratio of the suspension assembly 1500.

Figure 64:
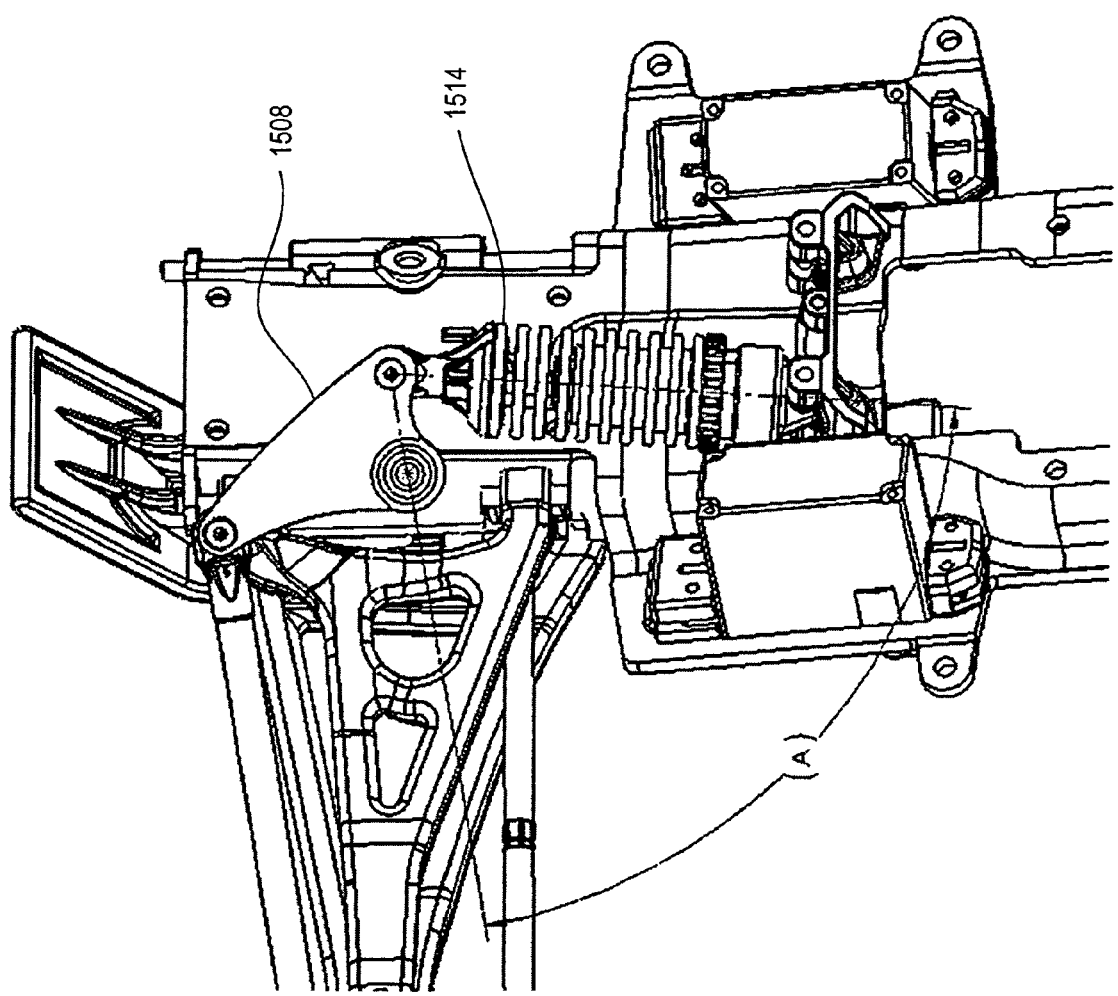
FIG. 64 is top view of a portion of the front left suspension assembly of the vehicle showing the damper and rocker arm employed therein.

For example, progression of the suspension assembly 1500 is primarily affected by the angle between the input and output arms of the rocker arm 1508, along with the starting angle between the damper 1514 and the output arm, as shown by angle A in FIG. 64. The progression rate can be relatively easily varied accurately by substitution of rocker arms having appropriate dimensions.

As described in pages 42 through 43 of the REVO Owners Manual, appended hereto as Appendix A and incorporated herein by reference for all purposes, and on pages 42-43 thereof, the progression rate (or progressiveness) of the suspension determines the extent to which the spring force produced at the wheel by one or more suspension spring members being displaced will vary with suspension travel, or vertical travel of the wheel. A suspension configuration functions progressively when the spring force at the wheel (or suspension force) increases with movement toward the full bump position, at a progressively increasing, non-linear rate. The non-linearly increasing suspension force of a progressively functioning suspension can be achieved using one or more associated suspension spring members that become progressively stiffer (i.e., the spring rate increases, as does the perceived stiffness of the spring member) with displacement. By comparison, a suspension configuration functions linearly or at constant-rate when the spring force at the wheel (or suspension force) increases with movement toward the full bump position, at a substantially steadily increasing, linear rate. This linearly increasing suspension force can be achieved using one or more associated suspension spring members that do not become substantially stiffer with displacement and an associated suspension assembly linkage that substantially does not function progressively.

It will be apparent to those skilled in the art, that a suspension can be configured to function progressively through one or more segments of wheel travel or throughout the entire range of wheel travel. Moreover, the degree of progressiveness can be varied as desired with wheel travel. The configuration of the suspension and/or variation in the stiffness of the one or more associated spring members can be employed to produce the degree of progressiveness associated with suspension wheel travel desired.

FIGS. 62A and B and 63A and B illustrate, respectively, rear suspension assembly and front suspension assembly rocker arms. Variation of the dimensions A, B, C, D and E, as well as the lengths of associated pushrods will vary the progressiveness of the suspension assemblies. Dimensions associated with a variety of progressiveness and suspension travel are listed in Table 1. The dimension values listed in Table 1, except for dimension C (in degrees), can be for millimeters in an embodiment, or for centimeters in another embodiment, or for other units of measure in yet other embodiments, depending upon the desired scale or size of the vehicle. Further, the values presented illustrate the relative proportions of the various components of corresponding embodiments; however, it will be apparent to those skilled in the art that other dimension values can be substituted, if desired and that the suspension disclosed is not limited to the dimension values provided.

Figure 59:
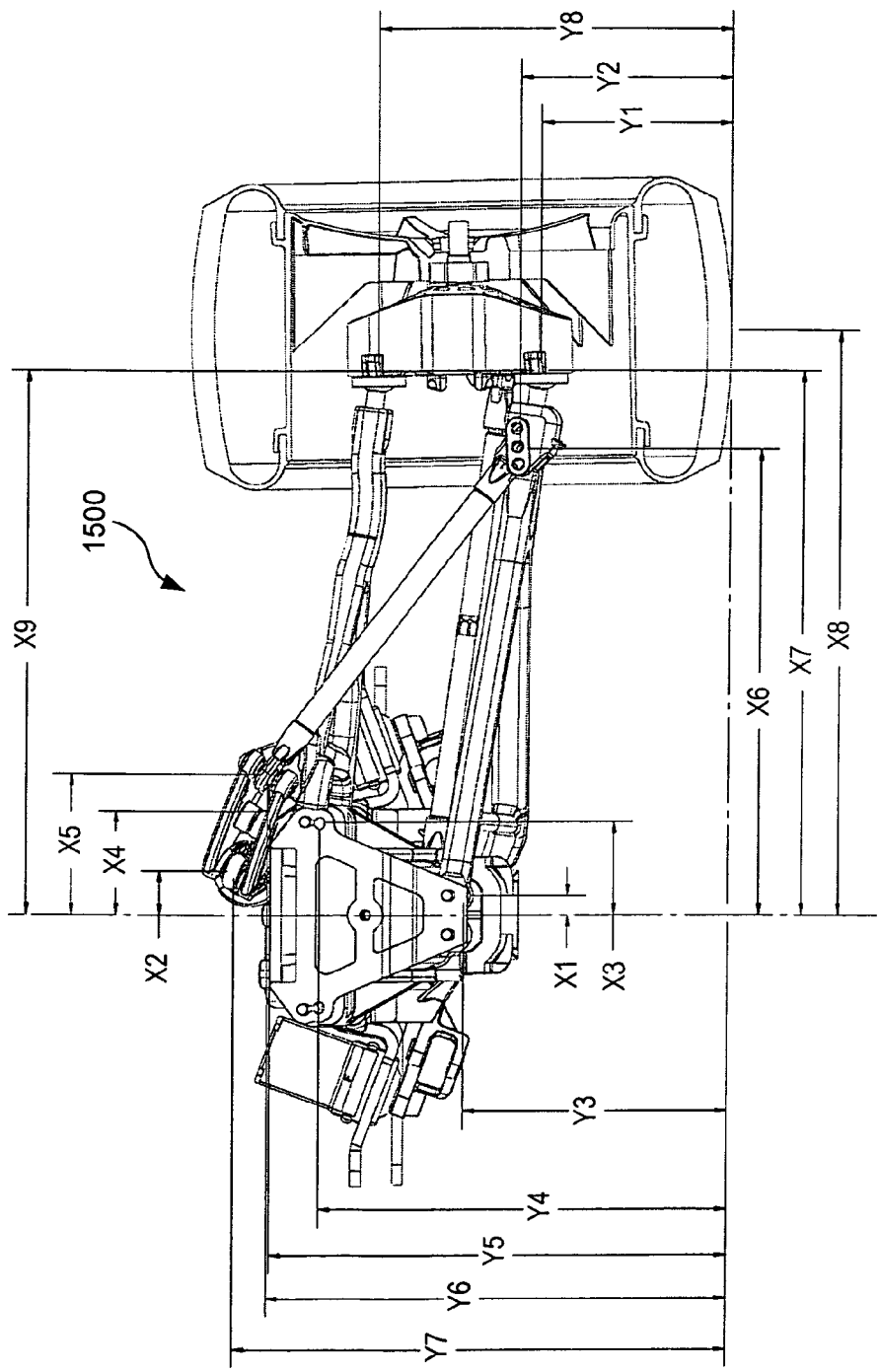
FIG. 59 is a dimensioned front elevation of the front left suspension assembly of the vehicle, shown at ride height.
Figure 60:
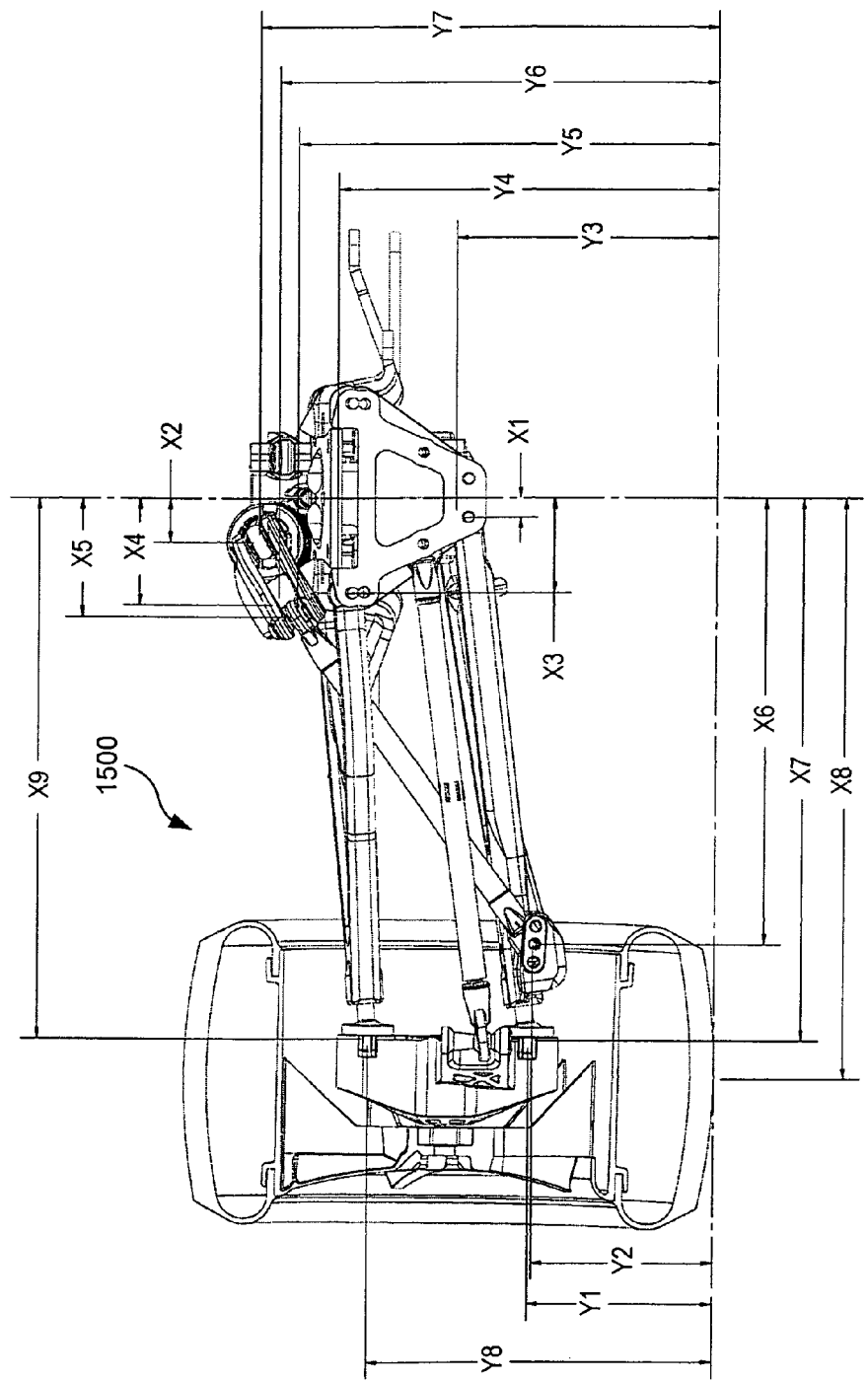
FIG. 60 is a dimensioned rear elevation of the rear left suspension assembly of the vehicle, shown at ride height.
Figure 61:
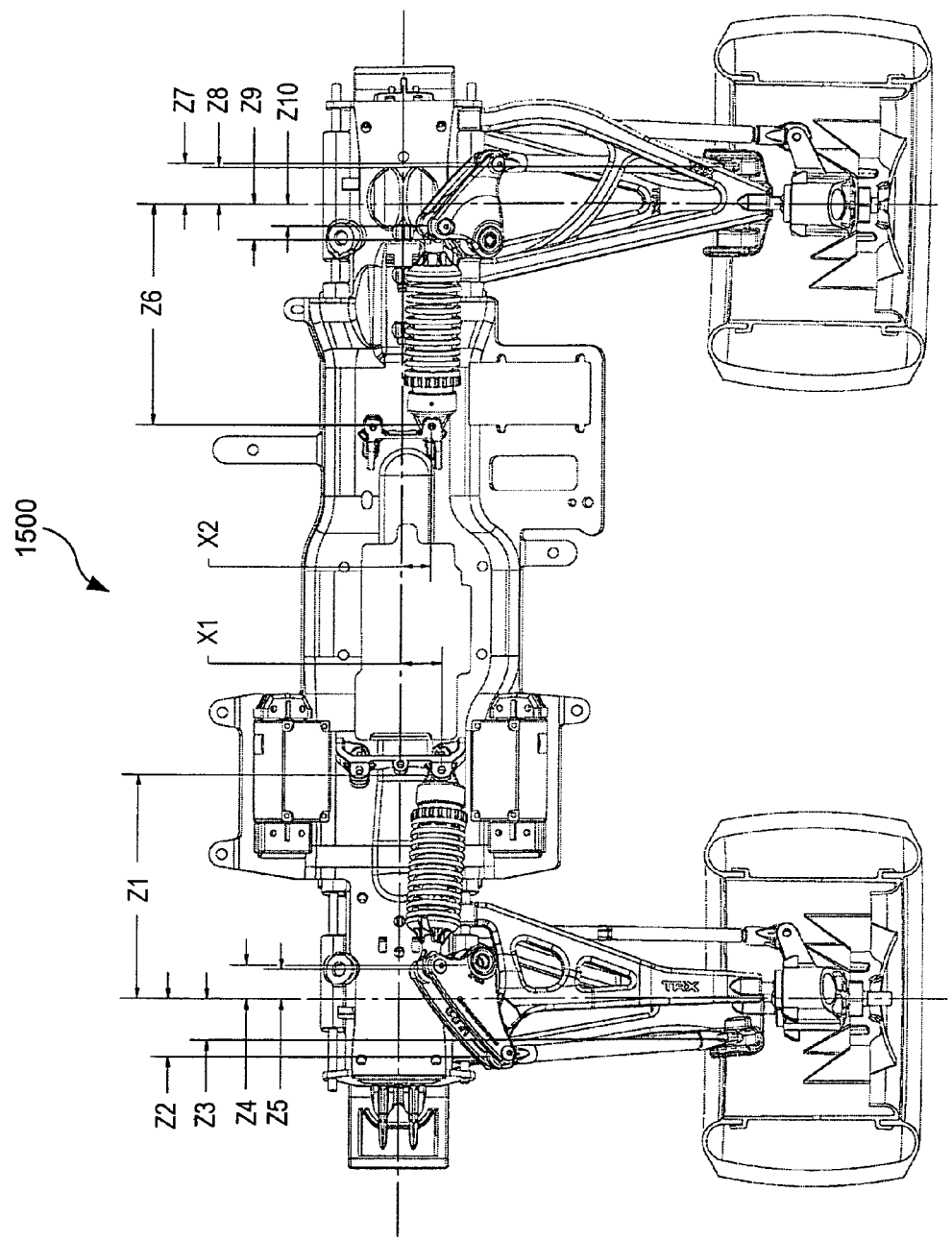
FIG. 61 is a dimensioned top view of the chassis of the vehicle showing the front and rear left suspension assemblies of the vehicle.

FIGS. 59 through 61 identify dimensions of the left front and rear suspension assemblies having motion ratios of approximately 4.5 to 1 and high-performance progressiveness curves. The numerical values of the dimensions identified in FIGS. 59 through 61 are shown in Tables 2 through 5 below. The dimensions listed in Tables 2 through 5 can be for millimeters in an embodiment, or for centimeters in another embodiment, or for other units of measure in yet other embodiments, depending upon the desired scale or size of the vehicle. Further, the values presented illustrate the relative proportions of the various components of corresponding embodiments; however, it will be apparent to those skilled in the art that other dimension values can be substituted, if desired, and that the suspension disclosed is not limited to the dimension values provided. Variations of these dimensions will yield various motion ratios and progressiveness curves in the suspension assembly 1500.

TABLE 1

Dimensions of Front and Rear Suspension Assembly Rocker Arms

| End | Rocker | Pushrod Length | A | B | C | D | E |
| --- | --- | --- | --- | --- | --- | --- | --- |
| Front | Progressive 1 | 115.55 | 38.20 | 20.00 | 98.00 | 8.10 | 16.20 |
|  | Progressive 2 | 120.50 | 38.40 | 20.00 | 88.65 | 8.10 | 16.20 |
|  | Progressive 3 | 125.25 | 39.45 | 20.00 | 80.50 | 8.10 | 16.20 |
|  | Long travel | 115.55 | 40.00 | 15.20 | 92.50 | 8.10 | 16.20 |
| Rear | Progressive 1 | 115.55 | 30.60 | 19.00 | 85.00 | 3.60 | 16.70 |
|  | Progressive 2 | 120.50 | 30.90 | 19.00 | 72.80 | 3.60 | 16.70 |
|  | Progressive 3 | 125.25 | 32.00 | 19.00 | 63.00 | 3.60 | 16.70 |
|  | Long travel | 115.55 | 43.40 | 19.00 | 81.00 | 3.60 | 16.70 |

Referring now to FIG. 59, values of the dimensions x1-x9 and y1-y8 appear in the first part of Tables 2 through 5 below. Table 2 lists the values of various dimensions of the suspension utilizing P1 (Progressive 1) rocker arms. Table 3 lists the values of various dimensions of the suspension utilizing P2 (Progressive 2) rocker arms. Table 4 lists the values of various dimensions of the suspension utilizing P3 (Progressive 3) rocker arms. Table 5 lists the values of various dimensions of the suspension utilizing LT (Long Travel) rocker arms.

Referring now to FIG. 60, values of dimensions x1-x9 and dimensions y1-y8 appear in the second part of Tables 2 through 5 below. Table 2 lists the values of various dimensions of the suspension utilizing P1 (Progressive 1) rocker arms. Table 3 lists the values of various dimensions of the suspension utilizing P2 (Progressive 2) rocker arms. Table 4 lists the values of various dimensions of the suspension utilizing P3 (Progressive 3) rocker arms. Table 5 lists the values of various dimensions of the suspension utilizing LT (Long Travel) rocker arms.

Referring now to FIG. 61, values of dimensions x1-x2 and z1-z10 appear in the third part of Tables 2 through 5 below. Table 2 lists the values of various dimensions of the suspension utilizing P1 (Progressive 1) rocker arms. Table 3 lists the values of various dimensions of the suspension utilizing P2 (Progressive 2) rocker arms. Table 4 lists the values of dimensions of the suspension utilizing P3 (Progressive 3) rocker arms. Table 5 lists the values of various dimensions of the suspension utilizing LT (Long Travel) rocker arms.

TABLE 2

Suspension Dimensions with P1 Rocker Arms

| Name | Value | What | Name | Value | What |
|---|---|---|---|---|---|
| *Front suspension, view from front, P1 rocker arms* | | | | | |
| x1 | 5.5 | LCA pivot | y1 | 52.3 | Lower ball joint/pivot ball |
| x2 | 12.5 | Damper on rocker | y2 | 58.0 | Pushrod on LCA |
| x3 | 26.5 | UCA pivot | y3 | 73.0 | LCA pivot |
| x4 | 29.5 | Rocker pivot | y4 | 113.3 | UCA pivot |
| x5 | 39.9 | Pushrod on rocker | y5 | 127.8 | Pushrod on rocker |
| x6 | 131.8 | Pushrod on LCA | y6 | 127.0 | Rocker pivot |
| x7 | 154.0 | Lower ball joint/pivot ball | y7 | 137.3 | Damper on rocker |
| x8 | 165.5 | Center of tire contact patch | y8 | 97.3 | Upper ball joint |
| x9 | 153.3 | Upper ball joint | | | |
| *Rear suspension, view from rear, P1 rocker arms* | | | | | |
| x1 | 5.5 | LCA pivot | y1 | 52.0 | Lower ball joint/pivot ball |
| x2 | 11.8 | Damper on rocker | y2 | 50.8 | Pushrod on LCA |
| x3 | 27.1 | UCA pivot | y3 | 73.1 | LCA pivot |
| x4 | 30.5 | Rocker pivot | y4 | 106.8 | UCA pivot |
| x5 | 33.9 | Pushrod on rocker | y5 | 118.1 | Pushrod on rocker |
| x6 | 127.8 | Pushrod on LCA | y6 | 123.5 | Rocker pivot |
| x7 | 155.3 | Lower ball joint/pivot ball | y7 | 122.8 | Damper on rocker |
| x8 | 166.2 | Center of tire contact patch | y8 | 97.7 | Upper ball joint |
| x9 | 154.5 | Upper ball joint | | | |
| *Top view, P1 rocker arms* | | | | | |
| x1 | 16.5 | Front Damper Mount | z1 | 90.0 | Front Damper Mount |
| x2 | 11.8 | Rear Damper Mount | z2 | 23.2 | Pushrod on Front Rocker |
| | | | z3 | 16.4 | Front Pushrod on LCA |
| | | | z4 | 11.9 | Front Damper on rocker |
| | | | z5 | 13.6 | Front Rocker pivot |
| | | | z6 | 88.5 | Rear Damper Mount |
| | | | z7 | 16.2 | Pushrod on Rear Rocker |
| | | | z8 | 14.7 | Rear Pushrod on LCA |
| | | | z9 | 14.2 | Rear Rocker pivot |
| | | | z10 | 8.6 | Rear Damper on rocker |

LCA Lower control arm
UCA Upper control arm

TABLE 3

Suspension Dimensions with P2 Rocker Arms

| Name | Value | What | Name | Value | What |
|---|---|---|---|---|---|
| *Front suspension, view from front, P2 rocker arms* | | | | | |
| x1 | 5.5 | LCA pivot | y1 | 52.3 | Lower ball joint/pivot ball |
| x2 | 12.6 | Damper on rocker | y2 | 58.0 | Pushrod on LCA |
| x3 | 26.5 | UCA pivot | y3 | 73.0 | LCA pivot |
| x4 | 29.5 | Rocker pivot | y4 | 113.3 | UCA pivot |
| x5 | 35.7 | Pushrod on rocker | y5 | 130.4 | Pushrod on rocker |
| x6 | 131.8 | Pushrod on LCA | y6 | 127.0 | Rocker pivot |
| x7 | 154.0 | Lower ball joint/pivot ball | y7 | 137.3 | Damper on rocker |
| x8 | 165.5 | Center of tire contact patch | y8 | 97.3 | Upper ball joint |
| x9 | 153.3 | Upper ball joint | | | |
| *Rear suspension, view from rear, P2 rocker arms* | | | | | |
| x1 | 5.5 | LCA pivot | y1 | 52.0 | Lower ball joint/pivot ball |
| x2 | 12.8 | Damper on rocker | y2 | 50.8 | Pushrod on LCA |
| x3 | 27.1 | UCA pivot | y3 | 73.1 | LCA pivot |
| x4 | 30.5 | Rocker pivot | y4 | 106.8 | UCA pivot |
| x5 | 29.7 | Pushrod on rocker | y5 | 120.7 | Pushrod on rocker |
| x6 | 127.8 | Pushrod on LCA | y6 | 123.5 | Rocker pivot |
| x7 | 155.3 | Lower ball joint/pivot ball | y7 | 129.1 | Damper on rocker |
| x8 | 166.2 | Center of tire contact patch | y8 | 97.7 | Upper ball joint |
| x9 | 154.5 | Upper ball joint | | | |
| *Top view, P2 rocker arms* | | | | | |
| x1 | 16.5 | Front Damper Mount | z1 | 90.0 | Front Damper Mount |
| x2 | 11.8 | Rear Damper Mount | z2 | 24.1 | Pushrod on Front Rocker |
| | | | z3 | 16.4 | Front Pushrod on LCA |
| | | | z4 | 10.9 | Front Damper on rocker |
| | | | z5 | 11.3 | Front Rocker pivot |

TABLE 3-continued

Suspension Dimensions with P2 Rocker Arms

| Name | Value | What | Name | Value | What |
|---|---|---|---|---|---|
| | | | z6 | 88.5 | Rear Damper Mount |
| | | | z7 | 17.0 | Pushrod on Rear Rocker |
| | | | z8 | 14.7 | Rear Pushrod on LCA |
| | | | z9 | 14.2 | Rear Rocker pivot |
| | | | z10 | 7.7 | Rear Damper on rocker |

LCA Lower control arm
UCA Upper control arm

TABLE 4

Suspension Dimensions with P3 Rocker Arms

| Name | Value | What | Name | Value | What |
|---|---|---|---|---|---|
| \multicolumn{6}{c}{Front suspension, view from front, P3 rocker arms} |
| x1 | 5.5 | LCA pivot | y1 | 52.3 | Lower ball joint/pivot ball |
| x2 | 12.7 | Damper on rocker | y2 | 58.0 | Pushrod on LCA |
| x3 | 26.5 | UCA pivot | y3 | 73.0 | LCA pivot |
| x4 | 29.5 | Rocker pivot | y4 | 113.3 | UCA pivot |
| x5 | 31.8 | Pushrod on rocker | y5 | 133.0 | Pushrod on rocker |
| x6 | 131.8 | Pushrod on LCA | y6 | 127.0 | Rocker pivot |
| x7 | 154.0 | Lower ball joint/pivot ball | y7 | 137.4 | Damper on rocker |
| x8 | 165.5 | Center of tire contact patch | y8 | 97.3 | Upper ball joint |
| x9 | 153.3 | Upper ball joint | | | |
| \multicolumn{6}{c}{Rear suspension, view from rear, P3 rocker arms} |
| x1 | 5.5 | LCA pivot | y1 | 52.0 | Lower ball joint/pivot ball |
| x2 | 12.9 | Damper on rocker | y2 | 50.8 | Pushrod on LCA |
| x3 | 27.1 | UCA pivot | y3 | 73.1 | LCA pivot |
| x4 | 30.5 | Rocker pivot | y4 | 106.8 | UCA pivot |
| x5 | 25.7 | Pushrod on rocker | y5 | 123.3 | Pushrod on rocker |
| x6 | 127.8 | Pushrod on LCA | y6 | 123.5 | Rocker pivot |
| x7 | 155.3 | Lower ball joint/pivot ball | y7 | 129.0 | Damper on rocker |
| x8 | 166.2 | Center of tire contact patch | y8 | 97.7 | Upper ball joint |
| x9 | 154.5 | Upper ball joint | | | |
| \multicolumn{6}{c}{Top view, P3 rocker arms} |
| x1 | 16.5 | Front Damper Mount | z1 | 90.0 | Front Damper Mount |
| x2 | 11.8 | Rear Damper Mount | z2 | 25.3 | Pushrod on Front Rocker |
| | | | z3 | 16.4 | Front Pushrod on LCA |
| | | | z4 | 10.9 | Front Damper on rocker |
| | | | z5 | 13.6 | Front Rocker pivot |
| | | | z6 | 88.5 | Rear Damper Mount |
| | | | z7 | 17.9 | Pushrod on Rear Rocker |
| | | | z8 | 14.7 | Rear Pushrod on LCA |
| | | | z9 | 14.2 | Rear Rocker pivot |
| | | | z10 | 7.3 | Rear Damper on rocker |

LCA Lower control arm
UCA Upper control arm

TABLE 5

Suspension Dimensions with LT Rocker Arms

| Name | Value | What | Name | Value | What |
|---|---|---|---|---|---|
| \multicolumn{6}{c}{Front suspension, view from front, LT rocker arms} |
| x1 | 5.5 | LCA pivot | y1 | 52.3 | Lower ball joint/pivot ball |
| x2 | 16.8 | Damper on rocker | y2 | 58.0 | Pushrod on LCA |
| x3 | 26.5 | UCA pivot | y3 | 73.0 | LCA pivot |
| x4 | 29.5 | Rocker pivot | y4 | 113.3 | UCA pivot |
| x5 | 40.2 | Pushrod on rocker | y5 | 128.0 | Pushrod on rocker |
| x6 | 131.8 | Pushrod on LCA | y6 | 127.0 | Rocker pivot |
| x7 | 154.0 | Lower ball joint/pivot ball | y7 | 134.9 | Damper on rocker |
| x8 | 165.5 | Center of tire contact patch | y8 | 97.3 | Upper ball joint |
| x9 | 153.3 | Upper ball joint | | | |

TABLE 5-continued

Suspension Dimensions with LT Rocker Arms

| Name | Value | What | Name | Value | What |
|---|---|---|---|---|---|
| Rear suspension, view from rear, LT rocker arms | | | | | |
| x1 | 5.5 | LCA pivot | y1 | 52.0 | Lower ball joint/pivot ball |
| x2 | 12.7 | Damper on rocker | y2 | 50.8 | Pushrod on LCA |
| x3 | 27.1 | UCA pivot | y3 | 73.1 | LCA pivot |
| x4 | 30.5 | Rocker pivot | y4 | 106.8 | UCA pivot |
| x5 | 35.2 | Pushrod on rocker | y5 | 118.4 | Pushrod on rocker |
| x6 | 127.8 | Pushrod on LCA | y6 | 123.5 | Rocker pivot |
| x7 | 155.3 | Lower ball joint/pivot ball | y7 | 129.1 | Damper on rocker |
| x8 | 166.2 | Center of tire contact patch | y8 | 97.7 | Upper ball joint |
| x9 | 154.5 | Upper ball joint | | | |
| Top view, LT rocker arms | | | | | |
| x1 | 16.5 | Front Damper Mount | z1 | 90.0 | Front Damper Mount |
| x2 | 11.8 | Rear Damper Mount | z2 | 25.0 | Pushrod on Front Rocker |
| | | | z3 | 16.4 | Front Pushrod on LCA |
| | | | z4 | 10.9 | Front Damper on rocker |
| | | | z5 | 11.0 | Front Rocker pivot |
| | | | z6 | 88.5 | Rear Damper Mount |
| | | | z7 | 29.0 | Pushrod on Rear Rocker |
| | | | z8 | 14.7 | Rear Pushrod on LCA |
| | | | z9 | 14.2 | Rear Rocker pivot |
| | | | z10 | 8.0 | Rear Damper on rocker |

LCA Lower control arm
UCA Upper control arm

Progressiveness can be defined as the change in motion ratio of the suspension over some range of travel, as described in Appendix C, "Revo Suspension Claims." Two or more different ranges of travel can be considered. Moreover, at each point along any range of travel there is an instantaneous motion ratio (MR). Over a first range of travel, from fully extended (full droop) to fully compressed (full bump), the change in motion ratio is $\Delta MR1$. Over a second range of travel, from ride height to fully compressed (full bump), the change in motion ratio is $\Delta MR2$. Additionally, there is an average motion ratio ($MR_{ave}$), which is the ratio of the full range of wheel travel to the full range of damper (including one or more spring members) travel. The average motion ratio ($MR_{ave}$) is the ratio of vertical displacement of the wheel over its full range of travel to displacement of one or more corresponding suspension spring members (or associated damper) over its entire range of travel. It will be apparent to those skilled in the art that a measure of progressiveness can then be defined as a ratio of $\Delta MRn/MR_{ave}$, or the ratio of one change in motion ratio over a particular range of travel ($\Delta MRn$) to the average motion ratio over an entire range of travel ($MR_{ave}$), where "n" signifies a particular range of motion. For example, if $\Delta MR2$ has a value of 0.49 and $MR_{ave}$ has a value of 4.5:1, then the measure of progressiveness $\Delta MR2=0.49/4.5=11\%$.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A model vehicle chassis, comprising:
a chassis for supporting a number of components operating the vehicle;
a raised channel formed by the chassis for housing at least a portion of the drive train components beneath the chassis; and
one or more portions of the chassis extending outboard from the channel formed by the chassis for supporting one or more components of the vehicle at a substantially lower position than the uppermost surface of the channel, thereby lowering the overall center of gravity of the vehicle;
wherein the one or more portions of the chassis extending outboard from the channel slope upwardly from the channel, to position the upper ends of one or more components supported by the sloped chassis portions toward the channel.

2. A model vehicle chassis, comprising:
a chassis for supporting a number of components operating the vehicle;
a raised channel formed by the chassis for housing at least a portion of the drive train components beneath the chassis; and
one or more portions of the chassis extending outboard from the channel formed by the chassis for supporting one or more components of the vehicle at a substantially lower position than the uppermost surface of the channel, thereby lowering the overall center of gravity of the vehicle;
wherein the chassis further comprises at least two portions extending outboard from the channel in opposite directions, wherein each of the chassis portions supports one or more components of the vehicle at a substantially lower position than the uppermost surface of the channel; and
wherein each of the at least two portions of the chassis extending outboard from the channel slope upwardly from the channel, to position the upper ends of one or more components supported by the sloped chassis portions inboard with respect to the location on which the component is supported on the chassis.

3. The model vehicle chassis of claim 2, further comprising:
   an engine mounted on one of the chassis portions extending in one direction outboard from the channel; and
   a fuel tank mounted on one of the chassis portions extending in the opposite direction outboard from the channel.

4. A model vehicle chassis, comprising:
   a chassis for supporting at least one suspension assembly and one or more vehicle components, the chassis further comprising:
   a centrally located portion extending upwardly relative to a surface underlying the chassis; and
   one or more flanges extending outwardly from the centrally located portion for supporting one or more components at a position lower than the centrally located portion;
   wherein at least one of the one or more flanges forms an opening through which at least a portion of the lower end of a component supported by the flange extends, thereby lowering the center of gravity of the vehicle.

5. The vehicle chassis of claim 4, further comprising:
   a component at least partially supported by at least one of the one or more flanges forming an opening, wherein at least a portion of the lowermost portion of the component extends through the opening, to reduce the center of gravity of the vehicle.

6. The vehicle chassis of claim 5, wherein the component comprises an engine.

7. A model vehicle chassis, comprising:
   a chassis for supporting at least one suspension assembly and one or more vehicle components, the chassis further comprising:
   a centrally located portion extending upwardly relative to a surface underlying the chassis;
   one or more flanges extending outwardly from the centrally located portion for supporting one or more components at a position lower than the centrally located portion; and
   a front portion extending from the upwardly extending forward portion, for supporting at least a portion of a suspension assembly of the vehicle at a level higher than the position of the one or more flanges.

* * * * *